(12) United States Patent
Angevine et al.

(10) Patent No.: US 12,462,505 B2
(45) Date of Patent: Nov. 4, 2025

(54) SYSTEM AND METHOD TO PROCESS AND DISPLAY INFORMATION RELATED TO REAL ESTATE BY DEVELOPING AND PRESENTING A PHOTOGRAMMETRIC REALITY MESH

(71) Applicant: Propsee LLC, Wakefield, RI (US)

(72) Inventors: Gregory Scott Angevine, Calgary (CA); Scott Latham, Wakefield, RI (US); Swapnil Kharche, Maharashtra (IN)

(73) Assignee: PROPSEE LLC, Wakefield, RI (US)

( * ) Notice: Subject to any disclaimer, the term of this patent is extended or adjusted under 35 U.S.C. 154(b) by 155 days.

(21) Appl. No.: 18/027,477

(22) PCT Filed: Dec. 30, 2021

(86) PCT No.: PCT/US2021/065618
§ 371 (c)(1),
(2) Date: Mar. 21, 2023

(87) PCT Pub. No.: WO2022/147202
PCT Pub. Date: Jul. 7, 2022

(65) Prior Publication Data
US 2023/0377295 A1    Nov. 23, 2023

Related U.S. Application Data

(63) Continuation of application No. 17/565,108, filed on Dec. 29, 2021, now abandoned.
(Continued)

(51) Int. Cl.
*G06T 19/20* (2011.01)
*G06F 16/23* (2019.01)
(Continued)

(52) U.S. Cl.
CPC .......... *G06T 19/20* (2013.01); *G06F 16/2365* (2019.01); *G06F 16/24575* (2019.01);
(Continued)

(58) Field of Classification Search
CPC ....... G06T 19/20; G06T 17/20; G06T 19/006; G06T 2200/24; G06T 2219/016;
(Continued)

(56) References Cited

U.S. PATENT DOCUMENTS 8,666,771 B2 * 3/2014 Roesch ................. G16H 40/20
705/2
11,069,145 B1  7/2021 Pearson et al.
(Continued)

FOREIGN PATENT DOCUMENTS

| CN | 111930853 | 11/2020 | |
|---|---|---|---|
| KR | 102290132 | 8/2021 | |
| WO | WO-2020097025 A1 * | 5/2020 | ........... G06T 19/006 |

OTHER PUBLICATIONS

Search Report, PCT/US2021/065618, Apr. 1, 2022, 2 pages.
(Continued)

*Primary Examiner* — Xin Sheng
(74) *Attorney, Agent, or Firm* — Gottlieb Rackman & Reisman, P.C.

(57) ABSTRACT

Systems and methods are disclosed for multidimensional visualization of data and using the visualization in any of a number of applications to result in visualization configurations usable for a variety of purposes. The system includes one or more processors, one or more databases, at least one graphical user interface (GUI), and control technology for a user to control a display, where the display typically is visualizable through the GUI.

20 Claims, 35 Drawing Sheets
(25 of 35 Drawing Sheet(s) Filed in Color)

Related U.S. Application Data

(60) Provisional application No. 63/199,458, filed on Dec. 30, 2020.

(51) Int. Cl.
*G06F 16/2457* (2019.01)
*G06F 16/29* (2019.01)
*G06Q 50/16* (2024.01)
*G06T 17/20* (2006.01)
*G06T 19/00* (2011.01)

(52) U.S. Cl.
CPC .............. *G06F 16/29* (2019.01); *G06Q 50/16* (2013.01); *G06T 17/20* (2013.01); *G06T 19/006* (2013.01); *G06T 2200/24* (2013.01); *G06T 2219/016* (2013.01); *G06T 2219/2012* (2013.01); *G06T 2219/2016* (2013.01)

(58) Field of Classification Search
CPC ..... G06T 2219/2012; G06T 2219/2016; G06F 16/24575; G06F 16/2365; G06F 16/29; G06Q 50/16
See application file for complete search history.

(56) References Cited

U.S. PATENT DOCUMENTS

| | | |
|---|---|---|
| 11,521,357 B1 | 12/2022 | Cote et al. |
| 2004/0030616 A1 | 2/2004 | Florence et al. |
| 2009/0040370 A1 | 2/2009 | Varanasi |
| 2011/0007962 A1 | 1/2011 | Johnson et al. |
| 2013/0339255 A1 | 12/2013 | Talbird et al. |
| 2014/0122462 A1 | 5/2014 | Snellman et al. |
| 2016/0063633 A1* | 3/2016 | Ross ..................... G06Q 40/06 705/36 T |
| 2017/0074675 A1* | 3/2017 | Waldman ........... G01C 21/3682 |
| 2018/0130254 A1 | 5/2018 | Crawley et al. |
| 2018/0322123 A1 | 11/2018 | Cousins et al. |
| 2019/0129435 A1 | 5/2019 | Madsen et al. |
| 2019/0286921 A1 | 9/2019 | Liang et al. |
| 2020/0193700 A1 | 6/2020 | Vandenbrouck et al. |
| 2020/0258174 A1* | 8/2020 | Rodriguez ........... G06Q 50/163 |
| 2021/0149930 A1 | 5/2021 | Alvarez et al. |
| 2021/0279968 A1 | 9/2021 | Eathakota et al. |
| 2022/0121784 A1 | 4/2022 | Demchak et al. |

OTHER PUBLICATIONS

Written Opinion, PCT/US2021/065618, Apr. 1, 2022, 5 pages.
Advisory Action in U.S. Appl. No. 17/565,108, mailed on Jan. 13, 2023, 7 pages.
Final Office Action in U.S. Appl. No. 17/565,108, mailed on Nov. 2, 2022, 41 pages.
Non-Final Office Action in U.S. Appl. No. 17/565,108, mailed on Jul. 15, 2022, 37 pages.

\* cited by examiner

FIG. 11

| Complaint Number | Date Entered | Category | Status |
|---|---|---|---|
| 1535485 | 02/05/2020 | ELEVATOR - MULTIPLE DEVICES ON PROPERTY | ACTIVE |
| 1535485 | 02/05/2020 | ELEVATOR - MULTIPLE DEVICES ON PROPERTY | ACTIVE |
| 1535485 | 02/05/2020 | ELEVATOR - MULTIPLE DEVICES ON PROPERTY | ACTIVE |
| 1535485 | 02/05/2020 | ELEVATOR - MULTIPLE DEVICES ON PROPERTY | ACTIVE |
| 1528720 | 11/25/2019 | PERMIT - NONE (INCLUDING PA/DEMO ETC.) | ACTIVE |
| 1511825 | 06/13/2018 | SITE CONDITIONS ENDANGERING WORKERS | ACTIVE |
| 1481846 | 06/14/2018 | ILLEGAL HOTEL ROOMS IN RESIDENTIAL BUILDINGS | ACTIVE |
| 1481846 | 06/14/2018 | ILLEGAL HOTEL ROOMS IN RESIDENTIAL BUILDINGS | ACTIVE |

DOB Complaint Data
Building Name: 56 LEONARD STREET
ACTIVE Complaints: 8

CLOSE

FIG. 20

| Simplified Example | | | | | | |
|---|---|---|---|---|---|---|
| In Place Rent | | | Market Rent | | | |
| Floor | Rent $/sqft | | Rent $/sqft | # | Area | Rent Difference ($) | $ |
| 1-10 | 50 | | 57 | 10 | 20,000 | 7 | $1,400,000 |
| 11-15 | 56 | | 59 | 5 | 16,000 | 3 | $240,000 |
| 15-20 | 60 | | 66 | 5 | 12,000 | 6 | $72,000 |
| 21-23 | 65 | | 70 | 3 | 10,000 | 5 | $150,000 |
| | | | | | | | $1,862,000 |
| $1.862 Million ÷ 0.04 = $46.550 Million | | | | | | | |
| Rent or revenue difference, divided by a 4% capitalization rate equals the value difference | | | | | | | |

SYSTEM AND METHOD TO PROCESS AND DISPLAY INFORMATION RELATED TO REAL ESTATE BY DEVELOPING AND PRESENTING A PHOTOGRAMMETRIC REALITY MESH

This application is a National Stage application claiming priority to PCT Application No. PCT/US2021/065618 filed on Dec. 30, 2021, which claims priority to U.S. patent application Ser. No. 17/565,108 filed on Dec. 29, 2021, all of which claims priority to U.S. Provisional Patent Application No. 63/199,458, filed Dec. 30, 2020, the entirety of which is incorporated by reference.

BACKGROUND OF THE PRESENT INVENTION

At present, determining attributes of a particular living or commercial unit is both labor intensive and unreliable. A user needs to arduously look up details about a unit of interest and, for example, in order to determine a fair market value for the unit, a user must properly compare dozens of attributes across many parameters to make that decision. For example, what is the general value of a neighborhood or submarket? How do the number of bedrooms or bathrooms influence price? What fixtures are in a unit and how does that influence price? Are there issues with the building itself, such as a rat problem? Is there pending litigation about the building? What were previous sale prices? How much of a building consists of rental units? How does the location of the apartment within a building influence its price? Is the present owner current on taxes? If I make selected changes to my unit, how do those changes influence market value?

When all data is obtained, algorithms can be used for pricing. However, the data changes often, seemingly hourly for a particular area or building, so obtaining real time fair pricing (in one example) can be arduous or impossible.

The present invention is intended to overcome this issue by streamlining and automating the data collection and analysis process, allowing users to make selections of parameters, and the present invention uses an augmented reality approach to forming and utilizing a visualization of an area, a building, or even an apartment.

BRIEF DESCRIPTION OF THE PRESENT INVENTION

The present invention is directed to systems and methods for multidimensional visualization of data and using the visualization in any of a number of applications to result in visualization configurations usable for a variety of purposes. The system includes one or more processors, one or more databases, at least one graphical user interface (GUI), and control technology for a user to control a display, where the display typically is visualizable through the GUI. The processor(s) of the present invention may include engines for performing select functions, such as for processing certain data or certain types of data. In addition or alternatively, the processor(s) of the present invention may be pre-programmed to perform such functions. In one example of the present invention, data regarding a particular building in a particular locale can be used to configure a two-, three-, or multi-dimensional visual array of the building, including fixtures and appliances, which can be used (1) in comparison to other buildings (such as in the neighborhood), unit-by-unit, (2) including additional dimensions of data, such as pricing, (3) to determine a comparative fair value for the building or unit, or (4) other desired results as identified herein below. In at least some embodiments, the value and/or other parameters can be determined automatically, with users afforded the opportunity for additional or alternative parameter selection.

That is, the present invention amasses data from numerous public and private sources, does so on an ongoing basis, and uses the data to create multi-layered visualizations, typically using augmented reality and/or 3D image texture mapping (reality mesh), and uses color-coding, shading, fogging, and highlighting, included automatically by a system processor processing data, and user adjustable parameters, to convey detailed information about a geography, where the data is used to draw conclusions and formulate trends.

A primary goal of the approach of the present invention is to create a reality or augmented reality mesh visualization of a particular geography which can be used for any of a variety of purposes, at least some of which may be concurrent, many of which are described herein. This geography may be selectable as broadly as an entire city or state or as narrowly as a portion of a single building. The selected area can be considered an augmented reality mesh. This reality mesh is an augmented reality type of visual depiction of a particular geographic area, neighborhood, or real estate submarket which can be further augmented based on attributes, such as those of particular interest to a particular user. In the present invention, with a Graphical User Interface (GUI), the reality mesh can be displayed, interacted with, and acted upon by a user or automatically.

The reality mesh of the present invention is a 3D computer file potentially executable and containing metadata for uses such as but not limited to control, created through photogrammetric processing of many aerial images of a geography area usable to generate a virtual representation in 3D. Reality mesh files can be viewed with a Geographic Information System (GIS), such as virtual globe software like Google Earth and positioned in-situ to match a two-dimensional map. This serves to augment the geographic details with vertical extrusions and help understand a city, sub-market, neighborhood, city block, or building. A problem encountered by the real estate industry is that reality mesh files before this invention do not contain any metadata about the legal properties they contain and can provide no additional insights beyond aesthetics. The present invention solves this gap by formulating a data model for a relational database, corresponding to the reality mesh, augmentable as the data are collected and stored, where the data include data regarding a variety of attributes of each property, unit, or real estate market or submarket, and includes a user interface for displaying selected attributes of the property both in an augmented reality sense as well as being further selectable. The attributes may be user selectable or processor selectable or both, and may include the user's ability to expand or contract the geography of view, including selecting the area of interest across three dimensions. The database of the present invention is configured for on-going adjustment based on introduction of new data and new data sources, and is further configured for rapid delivery of selected content. Rapid delivery is important because of the large file sizes of high-resolution reality mesh files. The database of the present invention is further created by normalizing received data to allow for this rapid turnaround.

In another example, sales or rental data can be used to highlight residential (or commercial) units which show pricing in certain ranges (such as using differentiated colors by range) or time frames of sales or both so as to provide fair market estimates for a particular property and can do so relative to other properties. In other words, a person with graphical user interface access and a need can see or determine how to price or improve pricing for a property, or understand market forces in general.

A reality mesh more generally, also known as a photogrammetric model, is a precisely scaled, high-resolution image texture-mapped model of a geographic area. Typically one or more images are captured by aircraft or spacecraft and processed with sophisticated photogrammetry software that outputs a homogenous polygon model that can be viewed using a Graphical User Interface (GUI) using a Geographic Information System (GIS) or 3D model viewing software such as a mainstream web browser that supports common 3D graphic file display standards such as WebGL. Reality mesh models can be prepared with varying degrees of resolution and fidelity. An objective when creating a reality mesh is to find a balance between image quality and file size to maximize system performance while considering the delivery method, such as web (low fidelity) or traditional local desktop GIS (high fidelity). In the system of the present invention's modeling of Manhattan, as an example, the system uses a 2 cm resolution reality mesh, which is extremely detailed and performs adequately in web delivered applications. This level of detail is advantageous over prior art in being able to both (1) display in an augmented reality way (thereby providing life-like information to a viewer) and (2) overlay the display with content such as informative coloring, highlighting, and/or text with precision to the actual submarkets, properties, building floors or building architectural elements embedded within the reality mesh.

A further goal of the present invention is to provide visualization for a user based on any combination of selectable parameters, including combination of the parameters, and to display the applicable portion of the geography in a modified way, exposing or highlighting areas of best fit or fitting certain combinations of parameters. Such visualization may include but not be limited to color, size, shading displays, fogging or labels in context with the subject sub-market, property or neighborhood. In one such example, because the data are regularly updated, a geographic augmented reality view can show present locations of scaffolding and can be used to identify to a user a walking path based on current or anticipated weather. In another example, the augmented reality visualization can represent a change in available space (e.g., an apartment or retail space) for rent or available space that meets a certain search criteria such as area size, rental rate, building class, building operating costs, etc.

The system of the present invention includes a relational database and a GUI, in combination with an at least x86 consumer central processing units (CPU) and consumer graphics processing units (GPUs) for handling GUI display on an external monitor, command input from a touch screen or external mouse and keyboard, database queries and display on an external display.

The technology of the present invention identifies, stores, and visualizes real estate information by curating and storing the coordinates of parcels, buildings, floors, units, building elements and infrastructure (cooling towers, water tanks, cellular towers, etc.) with a process that involves manipulating property footprints to match buildings at various elevations and creating a coordinate bed (FIG. 1) of possible coordinate options for a user to trap in order to identify and organize regions of the reality mesh.

Conventional smart city GIS systems use shapefiles or unique 3D models of buildings with graduating levels of detail (LOD) aggregated into a virtual city model. The advantage of the solution in this invention is that it allows for a reality mesh to be used for communicating unique building and floor data, which is otherwise impossible without the underlying coordinate association knowledge on a per-property basis.

The visualizations of the present invention are comprehensibly clickable so as to allow a user to zoom in, zoom out, or obtain additional overlay data. In other words any spatial area of the real estate market, sub-market, building, floor, window, or architectural element, as examples, can be clicked by the user or highlighted by the system to display more information.

The present invention uses a plurality of data sources, such as but not limited to government records of properties and real estate listings of properties, among others, is potentially including both public and private sources. One such data source is actual images taken from overhead airborne or satellite devices which provide a structural starting point for the visualization. These initial images, which could be of varying radii to be limited to a building or extend to a city, are preferably high resolution images, usable by the present invention to create the beginnings of an augmented reality approach to visualizing the selected area. In the methods of the present invention, the images are processed, at least in part, to more precisely identify edges and other attributes of buildings. These edges are then used in combination with other data obtained from additional sources, to form an augmented reality visual display building by building which can be further augmented based on factors such as but not limited to user or system selection. In addition, the scale of the visualization may be adjustable based on user or system selection.

The listings in these data sources may include images of buildings and units, together with dimensional information among other data. All the data from the sources, which may include public and private sources, obtained by the system of the present invention are preferably regularly updated and comparison is regularly made to prior received data (or a normalized version) to recognize which updates are appropriately new and which, for example, might be temporary or an error. Various types of error control checking exist in the system. In one example, floor-level error checking may be used and includes determining the correct spatial location of a floor in a building or a unit on a floor. This can be done for several units on a floor, but becomes more complicated when working with spatial representations of units with a 3D building model. Floor-level checking is conducted by:

A) Examining units by using available data regarding similar type units on neighboring floors or similar buildings. In modern buildings, residential floors typically have the same column spacing and unit distribution between floors and if new data is received that is inconsistent with the known column spacing or divided floor layout, the system of the present invention can identify these anomalies when they are highlighted in the reality mesh, such as but not limited to visual comparisons.

B) Floor-level checking is also performed automatically by preventing the adding of unit coordinates that overlap the same region of the floor. This is done by identifying matching surface areas from a newly added or updated unit and preventing the system from parsing the matching coordinates into the database.

Preferably received images should be of high resolution but need not be. These images may show structural variations, such as elevated or lowered ceilings, potentially together with appliances and fixtures. The system of the present invention takes into account these images together with any available related data which may be stored or later stored in a normalized form in the data base of the present invention, such as dimensional information, and creates a multidimensional model and visualization of the building, floor, unit, land parcel or building architectural element or feature such as rooftop infrastructure such as but not limited to a cooling tower, water tower, HVAC equipment, cellular transmitter, electrical generator or solar panel.

A graphical user interface associated with or a part of the system of the present invention allows a user to interact with the visualization in any number of ways, such as but not limited to rotating the image or replacing elements in the images.

The data sources used by the present invention are extensive and include governmental and non-governmental sources. The system of the present invention includes a processor (which may actually be a plurality of processors distributed such as in a mesh network) which is programmed to poll data sources on a frequent basis, such as a regular basis, to update data previously obtained. A listing of exemplary data sources is included as Appendix 1. Consequently, the system of the present invention includes one or more databases, typically relational in nature, where the databases may be reconfigurable on demand, automatically or otherwise. The processor of the present invention interacts with the databases and also with a specialized graphical user interface, where a user can select any of several parameters to show on a developed image for a desired building, unit, or area. That image may be maneuverable by the system and/or a user, such as being rotatable and/or changing perspective by the user so that attributes of three dimensions can be displayed and/or distinguished, often in high resolution. Such imaging can include specific fixtures and the like.

In summary, the system of the present invention regularly polls data sources to create and update one or more database fields with the found entries and uses these entries in visualizations created and/or recreated by the processor of the present invention.

Selection of attributes to display may be user controlled and/or system controlled and selectable. Users can select using the GUI, either by clicking on a map, an object, selecting from a menu, voice activation, or a combination.

Further, the data sources can be used to overlay the images with one or more additional dimensions, such as but not limited to operating cost or tax data and calculated data, such as rents, common ownership, foreign ownership or market value. Other real estate examples include property transaction details such as the seller name, buyer name, sale price, and percent interest of property transferred, to name a few. Building mechanical examples include elevator inspection dates, boiler make and inspection dates, cooling tower make, capacity, and serial number, to name a few. Health and environmental examples may include the presence and/or duration and/or timeframes of debris, rodents, birds, inside air particulate levels, or biological growth in a building's water tank or air handling equipment, and the like. These overlays can take numerous forms, such as but not limited to expanding/contracting portions of a geographic area or real estate market or submarket, a building or buildings, a building floor or unit on one or a multitude of buildings, changing colors such as to highlight selected market, submarket, building or buildings, or selecting buildings or units for direct comparison. Again, all of these displays preferably are created for display in an augmented reality sense so that a user can see multi-layered reality visualization of particular buildings, units, or areas together with desired and/or related data, where the visualization encompasses the data in some way. The actual visualizations may be user adjustable and may be created/displayed at least in part using augmented reality, such as to customize based on a particular user's expressed or inferred desires.

Some of these data sources may be private sources. For some users, the private source data may be combined with public source data, which may permit for user-specific visualizations. In other cases, the private source data may be filtered through an anonymization routine so as to obscure data which could be used to identify the source or to keep private data specific to a particular lease, property appraisal report or mechanical contract, as examples.

Many cities provide the coordinate boundaries of properties as part of open data initiatives. These coordinates typically originate from legacy/historical GIS systems and provide an association between a parcel and a city's unique identifier code (ID) used for taxing or planning purposes. However, we have observed that such data can be error-laden, and have developed algorithmic-based approaches to "cleaning" the data (e.g., determining which data are errors) before updating or reconfiguring the system's database.

Additionally, because data available from multiple sources are not necessarily structurally consistent with one another, the system of the present invention includes routines for a process to calibrate (or normalize) the data such that it can be stored in a uniform structured way. As one can imagine, calls to the data might be frequent and the scope of such data may require extensive processing so uniformity in storage is vital to the user experience.

Further, because at least some data, such as geographic data, are stored in public systems with appreciable history, the data are not always accurate as they relate to a precise reality mesh depiction of the real world and the calibration process needs to compensate for this lack of accuracy. For example, building coordinates may be slightly off, spatially, in data sources, and it is important to correct for this. It is corrected in the present invention preferably at least in part based on the previously discussed overhead (e.g., aircraft) images used to make manual coordinate adjustments. Further, because data are constantly updated by cities and municipalities, among other sources, these errors can reenter the system of the present invention, so the present invention includes routines to "check" for re-introduction of error and avoid them happening as a part of the calibration process. This is a significant point, because some changes might be accurate—such as new construction, and the present invention includes processing capability to discern re-introduction of errors and temporary changes (e.g., scaffolding) from proper changes.

The system of the present invention's ("system") process uses visual reporting, for example in a virtual globe within a web app (or comparable element or engine), to visualize the status of the system's coordinate fixing process. Visual reporting allows us to load any coordinate set and quickly toggle between original or altered coordinates on or off, revealing differences visually using, as an example, primary colors. For example, if the system's original (government sourced) coordinates are stylized red and altered coordinates are stylized yellow, areas of finished work within the reality mesh may appear in orange and areas requiring coordinate adjustment work may be red. This visual reporting also allows users to adjust the brightness, contrast, hue, saturation and gamma imagery to better expose building coordinates that require calibration. By cycling through different combinations, the regions of the mesh with various real world imagery texture colors can be better surveyed to visually identify alignment problems requiring work to fix.

Original coordinates vs. altered coordinates. FIGS. 2 and 3 show the original footprint coordinates in yellow, overlaid with the system's altered coordinates in red in a manual portion of the process (although this may be automated on a parcel-level as well). This allows the system's algorithm to identify buildings with base coordinate sets is that need to be adjusted to fit the reality mesh.

It is apparent from the distortions along the surfaces of the mesh geometry that the original coordinates (yellow) do not fit the buildings in the reality mesh and need to be adjusted. The adjusted coordinates are acceptable and can be used by the application. This reporting tool also allows both coordinates to be displayed at once to permit manual or automatic checking.

Once calibrated, the coordinates are then "core" to the system and can be used to correctly highlight buildings and legal property boundaries within the reality mesh. Without such calibration there can be unnecessary and confusing distortion and incorrect highlight positioning, especially in dense urban areas such as Lower Manhattan.

Regarding overlay with financial data or other data affords "what if" scenarios which can be achieved by user selectable filtering.

Because of the volume of data and the need to call data in different ways for visualization, file compression technology may be used to compress the data and streamline delivery of results. Briefly, various techniques are usable but they need to be consistent with both the data storage and delivery processes. At present, the system uses a private cloud-based file server that can actively compress reality mesh files before sending them to the client's graphical user interface, but alternative comparable techniques can be used such as virtual hosting services from Amazon AWS or Microsoft Azure. Also, content distribution systems (CDN) are used to improve hosting and file server performance.

Once the database is setup and data are regularly updated, the use of the database in combination with the user interface is extensive. Appendix 2 provides a listing of many example use cases for the core of the present invention. It is believed that every one of these is both novel and differentiable in numerous ways from prior approaches.

Benefits of the present invention:

Increased speed of communication of property and market information to stakeholders.

Improved accurate comparison between real world data and government or private property databases, usable for numerous analyses and improved results and decision making.

New insights from combining multiple datasets in a 3D spatial context, taking advantage of reality mesh transparency, fogging, timespan capabilities and simulation capabilities such as weather, smoke, fire, flooding and precise contextual information callouts.

Instant reflection of new data in a real world representation.

Democratization of data with reduced information arbitrage on assets.

Maximizing property value by comparing performance on peer properties.

Improved pricing based on the most current data to aid in accelerating sales cycles.

Bring transparency to the real estate market by seeing all available space options in a market, not just those spaces presented to a consumer by a broker.

Real time searches for apartments available for rent or sale. Or office space for sale or lease.

All sales transactions for any type of property can be searched and the details for each sale can be examined.

The graphical user interface can present all or a selection of the application's data visualizations as automated slide shows that play with constantly updated data, customized to the industry role of the user, substantially reducing the amount of time necessary to communicate changes in the real estate market.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 11 shows an example of a visualization of complaints as used in the present invention.

FIG. 20 provides an example of Mark to Market Analysis in the present invention.

DETAILED DESCRIPTION OF THE PRESENT INVENTION

Figure 1:
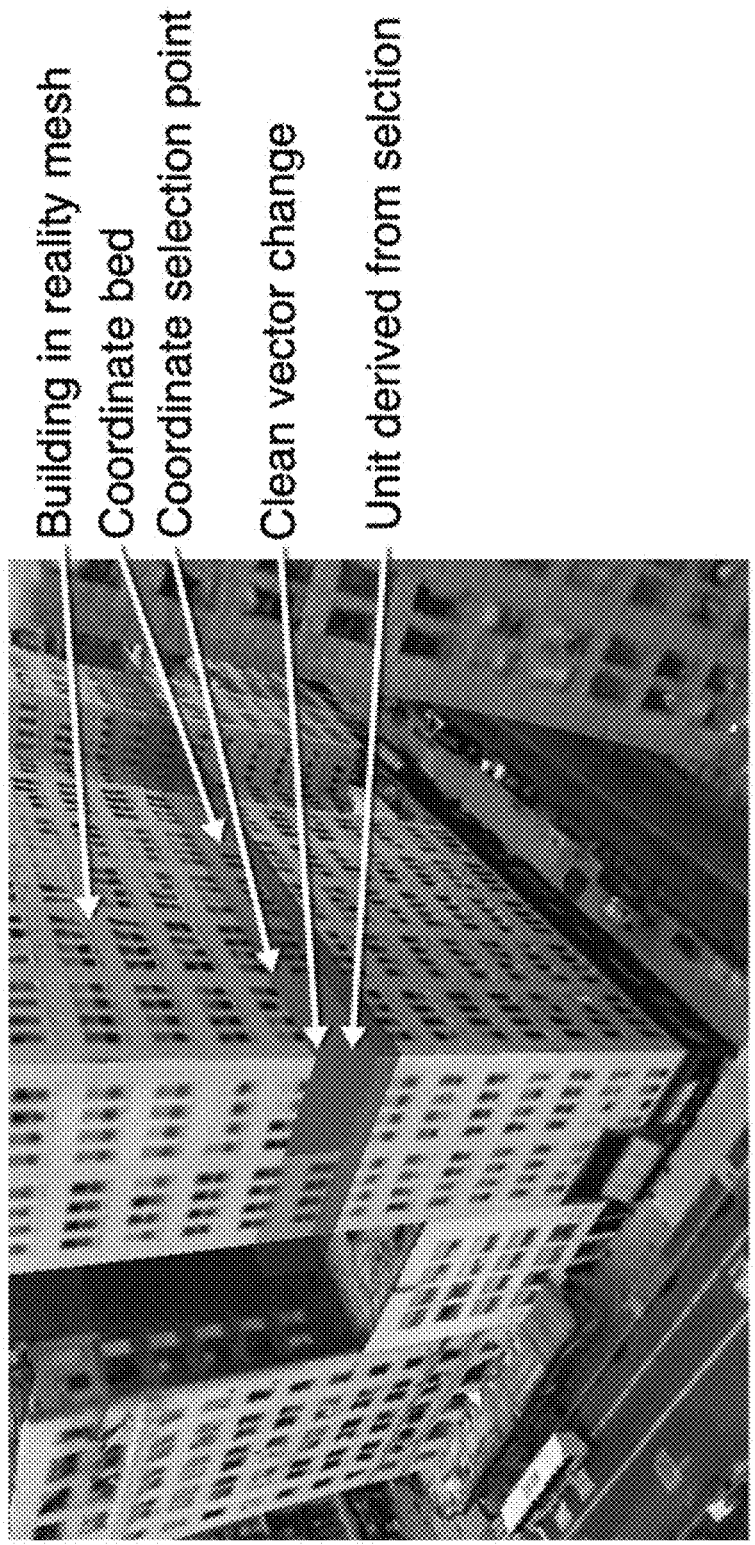
FIG. 1 depicts property footprints to match buildings at various elevations and create a coordinate bed.
Figure 2:
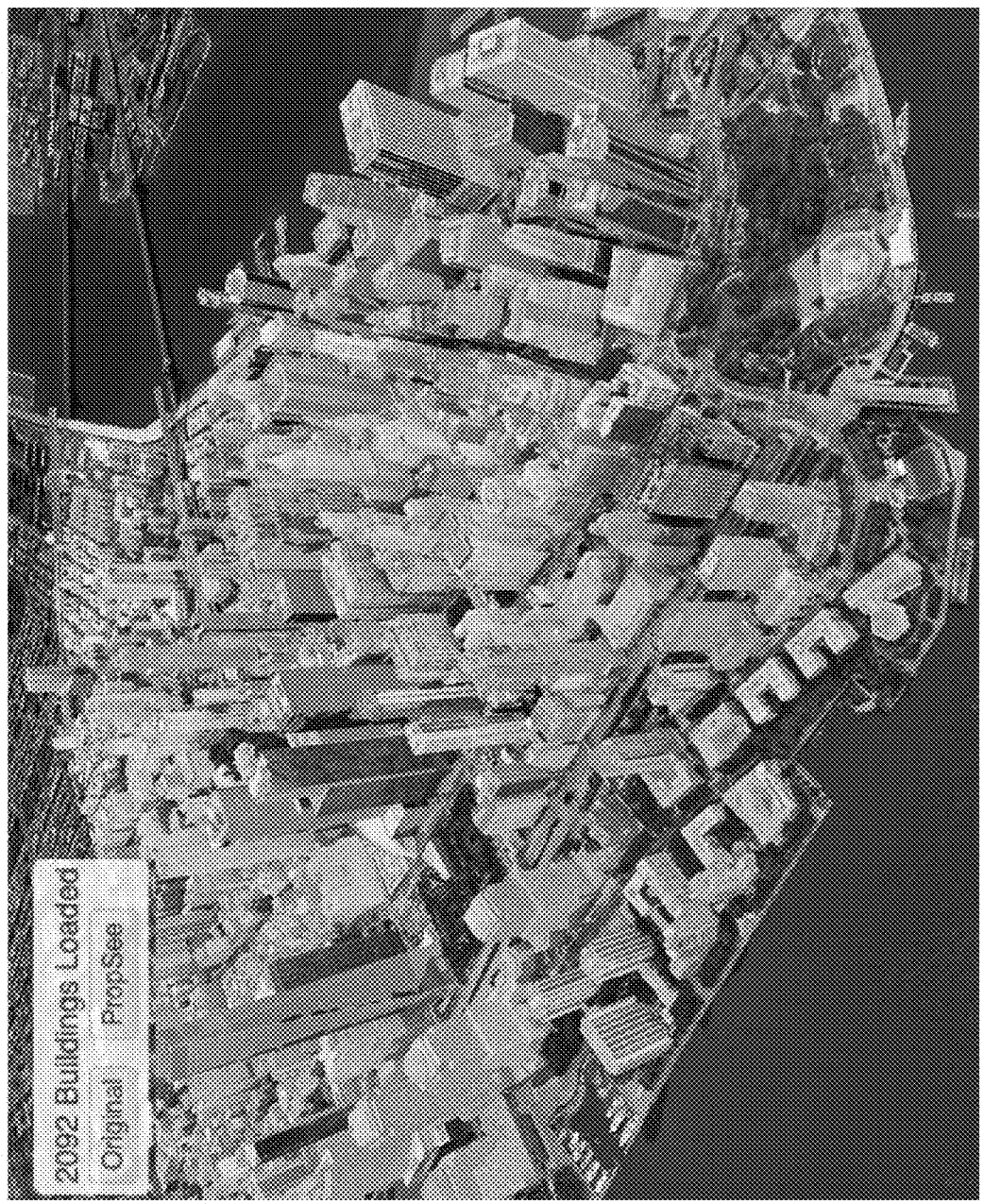
FIG. 2 depicts unadjusted property footprint coordinates projected onto reality mesh in the present invention.
Figure 3:
FIG. 3 depicts adjusted property footprint coordinates projected onto reality mesh in the present invention.

The invention can be thought of as having two core parts: the first part is a system and method to collect, organize, relate, and embed geographic real estate information, related information, and physical building representations, relate them to one another and use some or all of the information to form a photogrammetric reality mesh. The second part comprises a system and method to search, analyze (or to educated with), and display (or present) processed information for purposes including but not limited to market data and statistics and financial analysis and potentially include conclusions based on "what if" scenarios.

The present invention requires consumer grade x86 CPU and 3D graphics accelerated GPU capabilities to operate. Further, the invention requires a sufficiently high resolution display (1080p) to properly fit the GIS and reality mesh inside the GUI while presenting infoboxes with legibly sized text to the user. The invention requires access to a large data storage device containing a relational database that is connected locally or via the internet of at least one gigabyte in size but will operate with more data and more information if the data store is one hundred gigabytes for a municipality on the scale of New York City.

The present invention is further directed to a processor-based use of a relational database in combination with a GUI for allowing a user to select attributes for display or further study or display, such that the GUI and its display are self-adjusting based on the selected parameters. The GUI selection may be based on clicks, voice input prompts, and/or menu selections, as examples. The display itself may be selectable, such as but not limited to clickable, as well.

The present invention is further directed to one or more physical displays with visualizations (referred to herein as visualizations or displays), modified based on system and/or user selection, where the displays embed pertinent information within a presentation, preferably an augmented reality-based presentation, where the displays may include gradients consequential to retrieved relevant data. Color gradients are thoughtfully considered and defined to reveal data outliers and require knowledge of the operational domain (e.g., boiler capacity) or business rules (e.g., tax assessment and abatement), market rents, and expenses, etc. of a dataset being visualized. In other words, the present invention is directed at least in part to providing visualizations of real estate data, overlaid on portions of real estate and/or buildings, such that the appearance conveys information based on at least content, color, fogging and shading and/or highlighting.

The present invention is further directed to a database update and/or reconfiguration methodology based on regular retrieval of data from a wealth of sources, said retrieved data resulting in on-going modification of selectable menu items in the user GUI.

The present invention is further directed to implementation of machine learning techniques usable to do any or all of the database repopulation and/or reconfiguration and GUI reconfiguration, where the GUI reconfiguration can be based on any combination of user roles, selection and attributable fields or entries in the database.

The present invention is also directed to methodology for volumetric mesh highlighting, where the highlighted area may be highlighted in any number of ways including but not limited to, color or opacity/transparency, and highlighting is preferably, based on selectability by either or both of the processor of the present invention and user roles. Examples of user roles include, but are not limited to, real estate brokers, tenants, property owners, lenders, portfolio analysts, property appraisers, architects, equity analysts, mechanical contractors, property developers, investment advisors, bankers, REIT analysts, elevator, air handling and fire-suppression system contractors, filmmakers and video game developers.

In at least some situations, as described herein potentially among others, forms are used in the present invention for data structures and/or input.

Figure 4:
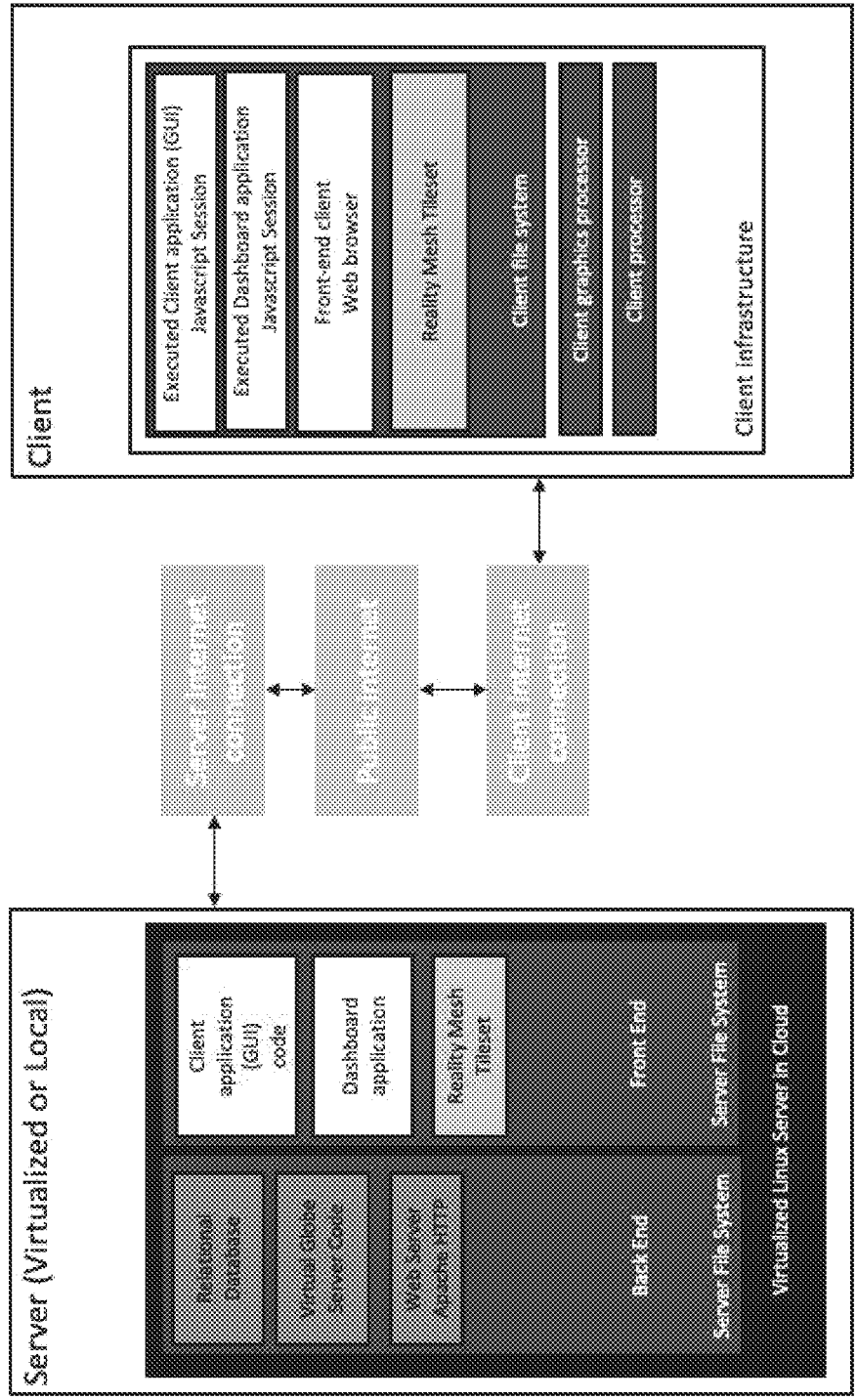
FIG. 4 provides an architectural perspective of the various components of the present invention.

The present invention includes a system as shown in the architecture of FIG. 4. The system of the present invention preferably includes an online, internet-based file storage system, relational database back-end, front-end client application containing a GUI and a front-end client application containing a dashboard to control user access and system data. While shown and discussed herein that the system includes a database, a processor, and applications, each of these may be deployed as a plurality of such elements or devices, and these elements or devices may be distributed across locations and/or arranged in an array configuration. Nothing should be construed herein that an element or a device described in the singular is necessarily a single element or device.

Figure 13:
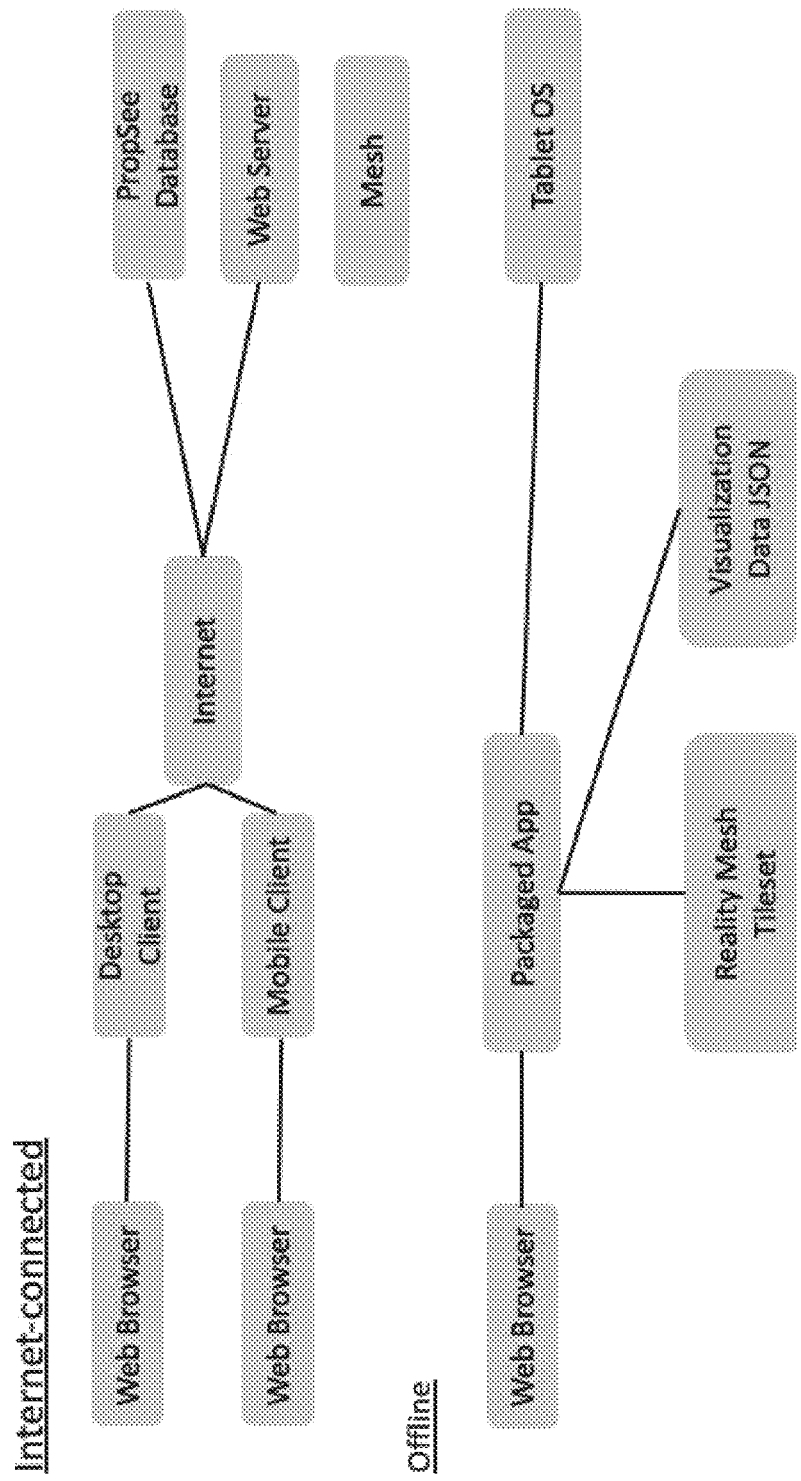

The system has the capability to be deployed in an "offline" manner without the need for an internet connection. This paradigm of system deployment is described in FIG. 13 where the specific need is to run without access to the internet and so the system contains all necessary basemaps (vector ground maps), reality mesh models, single building models, real estate market datasets, building datasets, city, state and federal government datasets, property transaction datasets, user information, user security information, GUI framework and web browser on a stored local disk on a mobile or desktop computing device connected to an external display with sufficiently high resolution (1080p or higher) to operate the GIS and reality mesh with fidelity and interact with the data selectability with the mesh or data selectability with the infoboxes. This same device can also be connected to a head mounted display or optical augmented reality glasses device to project the GIS and reality mesh and infoboxes is directly in front or overtop of the user's view plane or range of vision in a manner that is spatially matched to the geographic context in proximity to the user's current/present or other located area. This implementation of the invention allows the user to stand in front of a building and look up at it and see data attributes about the building, such as property information, available office or residential space for sale or lease, historical property details, city permits, complaints, tax information, utility consumption data or any other data variable relevant to the subject property or nearby properties to the user querying the system. Comparably, this implementation of the invention also allows the user to not be present and remotely examine the data attributes of a building using stored imagery of the real estate submarket, building or floor being examined.

Volumetric mesh highlighting techniques are discussed herein for buildings, floors, and architectural elements, mechanical, or operational elements of a building, which can be visualized within the mesh imagery textures and geometry or any coordinates inside, on the surface or outside of the mesh. The polygon mesh model can be enhanced to articulate elements, including but not limited to, real estate market or submarket performance, changes in real estate market or submarket performance over time, building ceiling heights, amenity space, health safety, health check in stations, window locations, door locations, rooftop water tanks, rooftop HVAC infrastructure, cooling towers, signage, life safety, outdoor terraces, rooftop solar potential, and façade inspection dates.

In order to operate, the system takes into consideration the position of the reality mesh in 3D space, preferably on a cartesian plane. The mesh is aligned within a virtual globe (aligned with a mathematical representation of geopositioning on a real Earth-shaped globe) preferably using a cartesian coordinate system and digital elevation model. The typical presentation of the mesh is drawn, or projected, on top of a two dimensional satellite image map of the exact location, but the system is not limited to this and can present other base maps, such as nighttime satellite imagery, flood maps, or base maps with special stylistic and/or information design functions. Base maps and other vector-based mapping data can also be raised above the reality mesh to depict road names, flooding and evacuation zones, and so on.

Application of the system operating with a reality mesh also exists for video gaming and film production. The system can generate user interface elements for buildings, neighborhoods and cities that can be consumed by video game and cinematic editing software for use in those domains. For example the system can present areas of the reality mesh in a fog that can be contextually consistent with the plot or premise of a video game or cinematic production.

The position of the reality mesh and the system's stored coordinate data from the coordinate trapping process are relative to each other. As updated reality mesh files are added to the system they must be positioned with the same alignment coordinates used with the original mesh used for coordinate trapping. The mesh contains only exterior imagery of a structure. No internal imagery exists within the reality mesh relative to the building structure, internally it is a void. An assumption generally used and made herein is that the position of the reality mesh is always true and accurate to real-world position of real-world cities and building.

The user makes selections within the GUI by using several methods. Chiefly, the GUI presents the user with the ability to select any region of the reality mesh, be it a real estate market, submarket, building, floor, suite or window. The selectability can be indicated by an icon, fogging, style change by means of color, style change by means of lighting projected by the GUI on the reality mesh, style change by means of opacity/transparency of the mesh, style change by means of clipping or removing sections of the mesh to illustrate only one or multiple parcels or properties, style change by means of applying an opaque fog to the mesh and "punching holes" in the mesh to indicate buildings exclusive of those included within the opaque fog. The user can also make selections by means of information boxes (infoboxes) drawn within the GUI that contain lists and tables of information generated from user-queries or standard reporting of information stored in the database. The user can select the names, addresses or unique identifiers of buildings in the infoboxes to open more detailed information that depict metadata or other information related to the infobox report. The infoboxes can also contain imagery that is unit specific, such as pictures of a bedroom or kitchen for residential units or pictures of an office space layout for office units The infoboxes can also contain charts to show data presented in various user selectable chart formats such as historical bar graphs providing information on rental rates or tax changes. The infoboxes can be positioned relative to a building within context to the reality mesh or not, using lines that connect the reality mesh to the infobox, depending on the need for the GUI to relate infoboxes to specific buildings or a real estate submarket or neighborhood to be relevant to the user.

The system's reality mesh is delivered to a user's GUI as a compressed stream of texture imagery files, typically in PNG format, combined with vector geometry data, organized as a tileset for efficient drawing performance by the CPU and GPU. Various compression protocols can be employed that provide differing levels of data size reduction depending on the client system platform. For example, compression protocols for reality mesh files used for Android devices and other devices may require different compression protocols, from those necessary for Apple iOS devices. These compression techniques are important because high resolution reality mesh files are very large and demanding on traditional consumer computing hardware and especially on mobile devices. With high speed wireless technologies like 5G, the issue is somewhat mitigated. Client devices require commonly found consumer videogame 3D graphics processing capability to run the application with fidelity. The CPU and GPU processing power in a current 5G mobile phone is sufficient to power the application. System memory requirements are not high because the system can buffer the necessary imagery textures into and out of memory as the GUI scrolls through the reality mesh and loads and discards imagery textures accordingly based on the contents of the display.

Virtual globe software allows for a multitude of stylization effects exclusive to GIS software. The list of common stylization effects includes, but is not limited to: drawing 2D or 3D geometry, highlighting topography, delineating topographic features including topographic setbacks, inserting other 3D models, inserting 2D images, applying other texture images to building or other shapefiles, tinting the display, realigning loaded elements, colorizing, clipping (deleting, or removing portions of the reality mesh with a horizontal plane), drawing vector lines relative to the mesh and screen elements, measurement, and label or icon placement and positioning relative to the users view of the display. These virtual globe stylizations can also be used during the process of capturing coordinate data that the system creates through the manual coordinate trapping process or through interaction with any other GIS stylization effect. The employment of multiple effects can enhance the system GUI and ameliorate the user's understanding of information from the system's display. For example, colorizing every building with high rates of bedbugs in New York City, while highlighting all the units in the available apartment market, is an efficient method to filter possible options.

Figure 5:
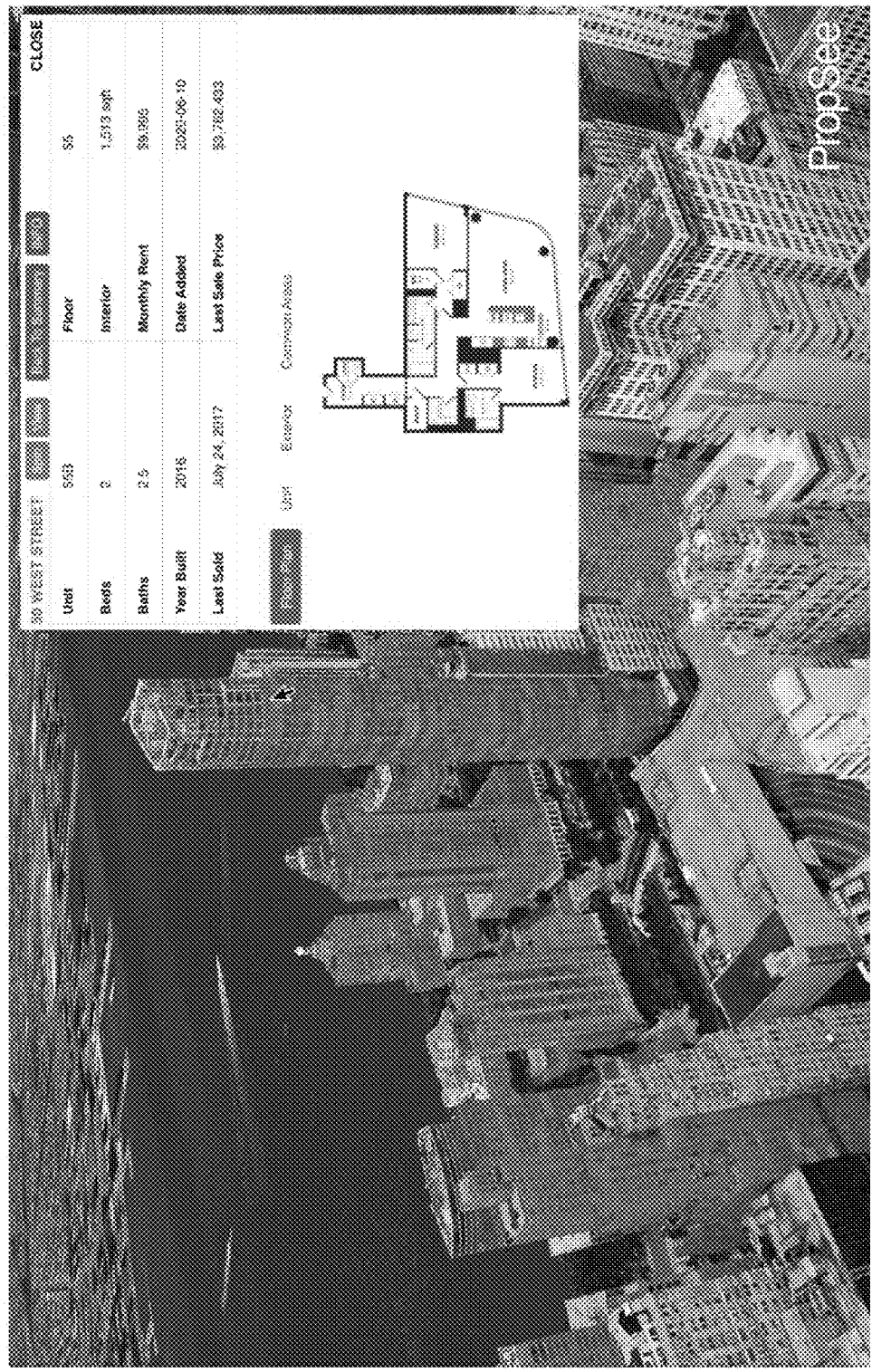
FIG. 5 shows an example of how, in the present invention, one can visualize how market participants can research ownership and history of a unit or building or market prior to renting or purchasing. The infobox in the GUI shows the selected units floorplan.
Figure 6:
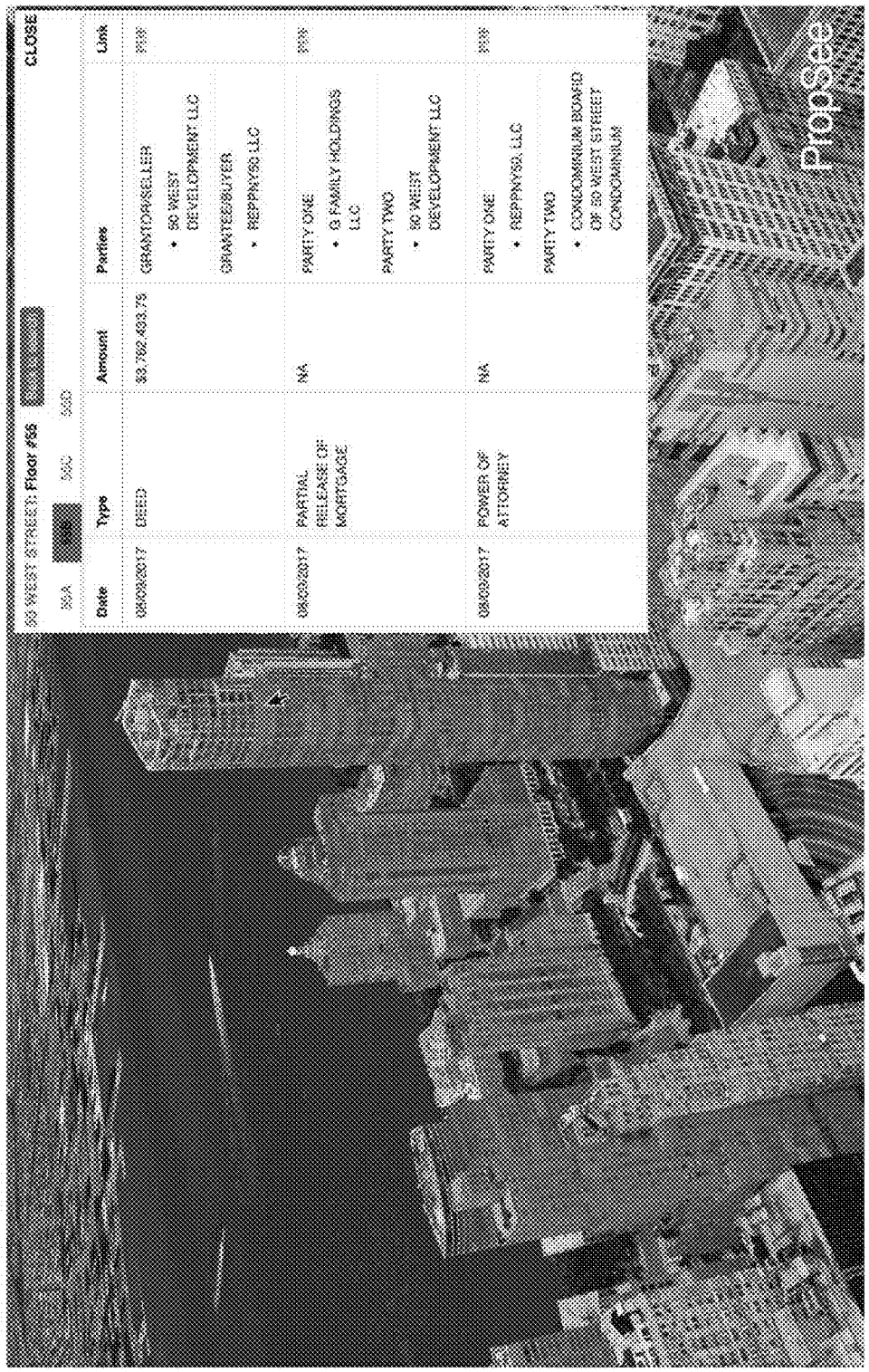
FIG. 6 shows an example of how, in the present invention, one can visualize how market participants can research ownership and history of a unit or building or market prior to renting or purchasing. The infobox in the GUI shows financial information for the selected unit.

Sample insights gained for comparing multiple datasets: the system reveals important insights when two or more government or private property datasets are combined in the same view. This allows market participants to comprehensively research the ownership and history of a residential or office unit or building or neighborhood or submarket prior to renting or purchasing, as well as identifying mortgages on properties with high loan to value ratios that are more likely to default. Also, identifying properties with above average square foot pricing could predict greater challenge in profitability. See FIGS. 5 and 6.

As shown in Example A (in FIG. 5 and FIG. 6), the system can load it's ResiRental (residential rental units available for rent) visualization of the available apartment inventory with the city ACRIS (Automated City Register Information System) data.

Figure 7:
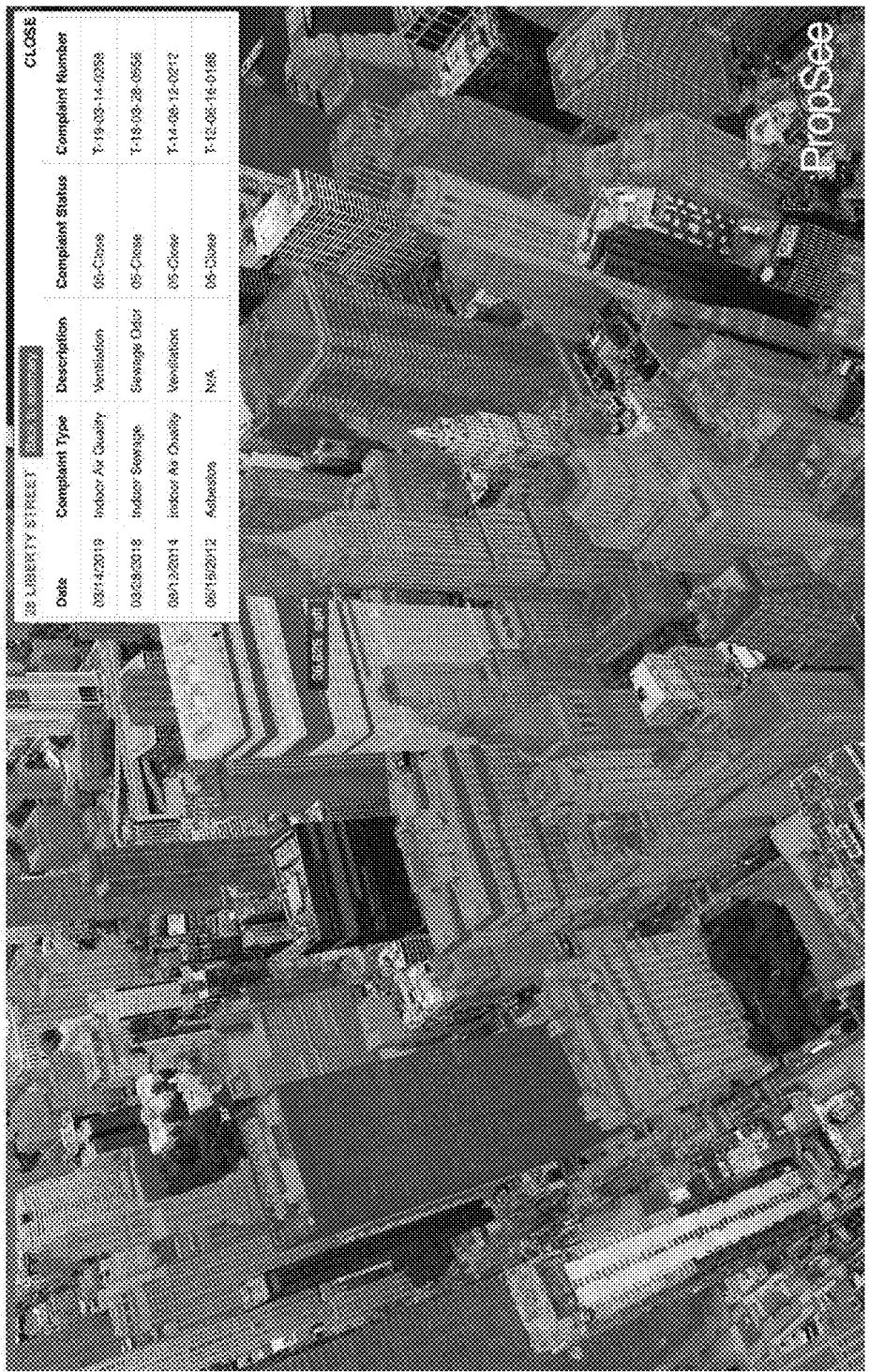
FIG. 7 shows an example of a visualization of shows available office space in the present invention.

Example B (FIG. 7) shows an example of available office space in downtown and NYC Department of Health and Mental Health (DOHMH) Indoor Environmental is Complaints, which reveals space options that are in buildings with reports of problematic indoor air quality, indoor sewage problems, asbestos, or mold.

Figure 8:
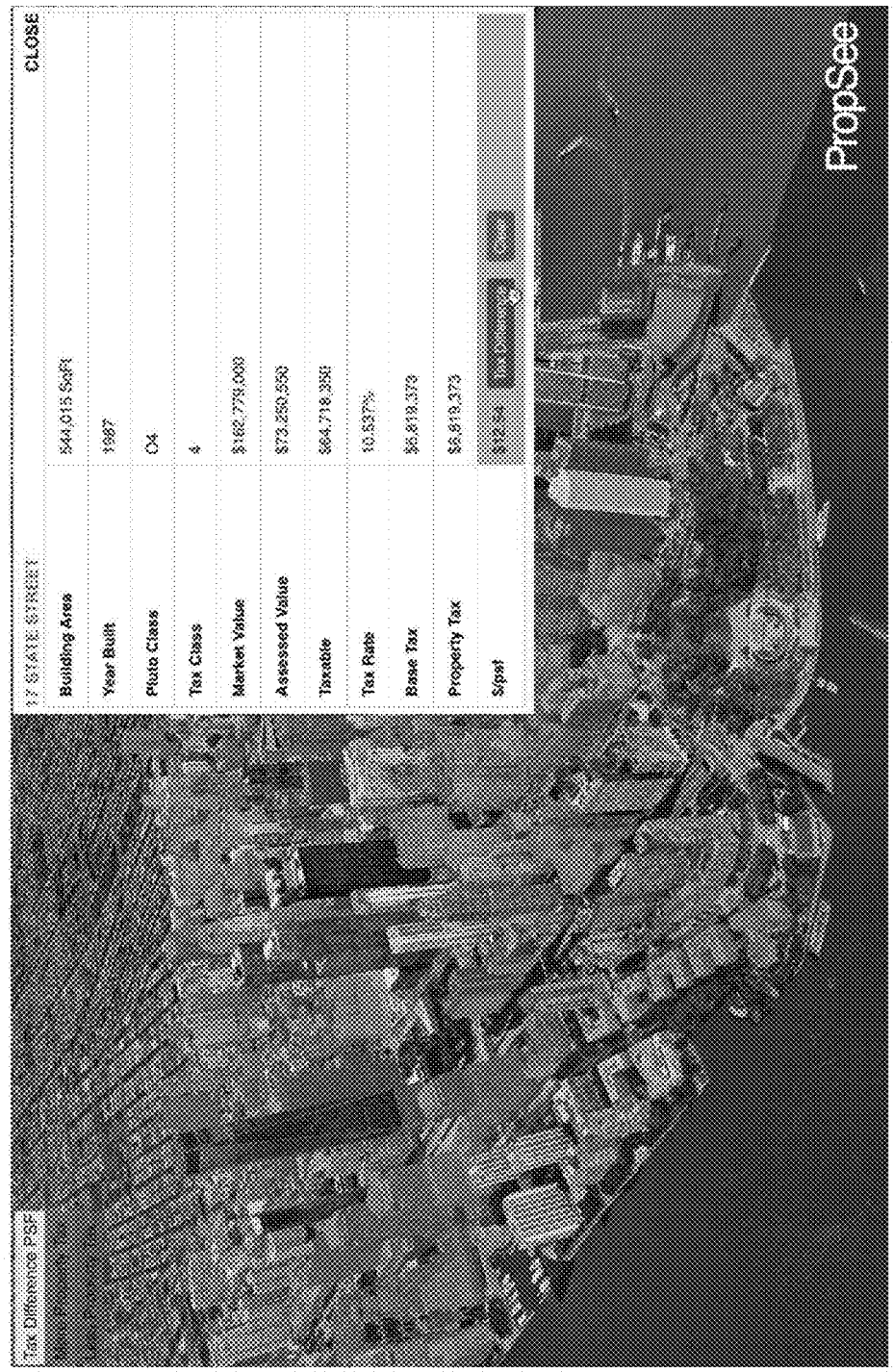
FIG. 8 shows an example of a visualization of NYC property tax by square foot in the present invention.
Figure 9:
FIG. 9 shows an example of a visualization of NYC property tax by square foot for peer properties in the present invention.

Functions within visualizations: When the system loads the data necessary to create a visualization, it presents the capability to apply functions to the retrieved data stored in the database to alter the loaded stylization using other parameters. Example A as shown in FIGS. 8 and 9 shows NYC property tax by square foot for buildings downtown. When the user selects a building, the GUI presents a function in the infobox called Tax Difference which changes the stylization to show an adjusted visualization showing tax per square foot related to the selected building coloring, for example, red or blue highlighting, to indicate more or less real estate taxes on the indicated buildings. This can also be performed for only peer properties, such as similarly classed office buildings. In another example, this visualization function can be applied to office tenants who commonly take on an obligation to pay their pro-rata share of tax increases above the base year, which is the year the lease was signed in. The user interface visualization can be colorized to show this change in percent increase in real estate taxes for space in a single or multiple buildings over time. Using this capability, a tenant can use the system to assess if they will pay more or less tax, which is of benefit to them and, for example, whether the tax structure has been applied in a fair manner.

Figure 10:
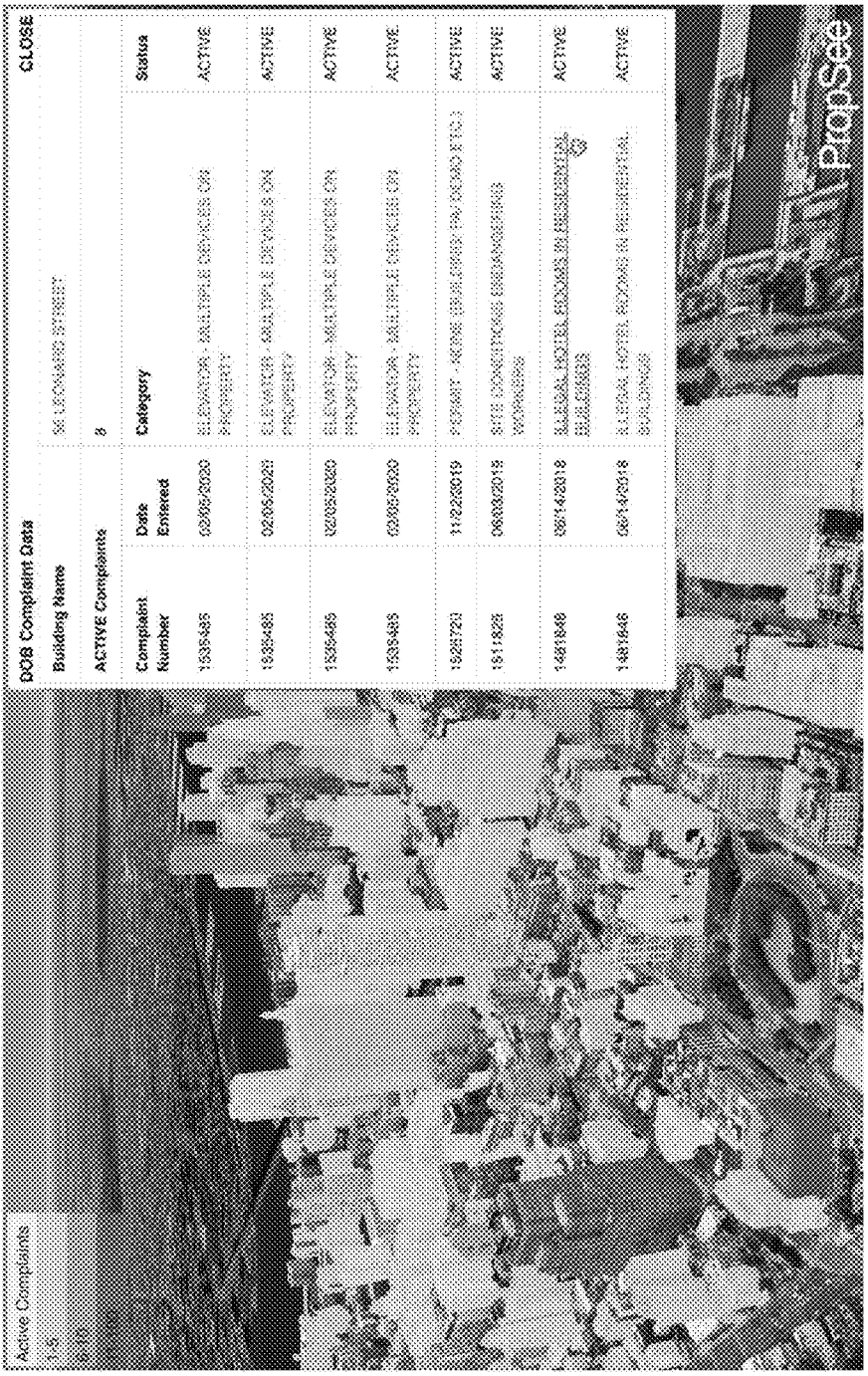
FIG. 10 shows an example of a visualization of complaints as used in the present invention.

Example B, including FIGS. 10 and 11, shows New York City Department of Building (DOB) Complaints over an area of the Tribeca sub-market, with the building 56 Leonard Street highlighted in white in the GUI. The infobox reveals a list of DOB complaints by category. Each different category is also a function and selecting any category will filter the results set by buildings with matching complaint categories. In this example the system shows an example of illegal hotel rooms in residential buildings which is a growing problem in cities with the emergence of online room rental services such as AirBnB and Vacation Rentals By Owner (VRBO).

The system further integrates building footprint data made available from public sources with unique building identifiers to relate all information in the system. The system's geographic hierarchy is by country, state, county, city, market, submarket, neighborhood, building, floor, unit, and equipment/infrastructure item. By leveraging the public and private ecosystems of unique property identifiers, the system can select and visualize all geographic entities at a discrete level and treat each entity uniquely within the system interface to visualize any associated datum. Examples of associated datum, or metadata, include but are not limited to ownership, transaction history, municipal zoning, property tax records, government regulated condominium plans, commercial and residential property rent and vacancy rates, properties under litigation, energy, water and gas utility consumption meter data, health and education department data, fire and life safety data, insurance flood risk, building maintenance and operating data, property financial data, investment market data, restaurant inspections, current and historical hotel booking activity from travel company affiliate data feeds, crime activity, proximity to metro stations and the frequency of a population testing positive for a pathogen such as Covid-19. Each datum can be tracked, such as over time, and the changes visualized in the system using common unique property identifiers from government and private property datasets. Unique identifiers from these external datasets are joined with the system-defined unique identifiers by the order they are either added or matched by a manual or automatic joining process used by the system when a property is added. An example of an automatic joining process is to join building IDs with matching building addresses. An example of a manual joining process is of a user creating a join (stored in a database table) to building identifiers with different legal addresses but comprising the same physical structure.

Concepts such as but not limited to highlighting a region of reality mesh are core to this invention. Highlighting can be visible or invisible and may use high opacity values for reality mesh regions to produce transparency in the reality mesh. One reason to produce transparency in the reality mesh is to mimic the appearance of building windows. An important part of this invention is how the system enables the selection of real-world objects within the mesh, either via a GUI or otherwise within the system of the present invention itself. Without this process the system would be unable to classify or identify legal parcels within the reality mesh beyond indicating single points with latitude and longitude values. Importantly, government-sourced parcel coordinates are typically stored in legacy system formats called cadastral maps, which are recordings of property boundaries collected from many decades of government land management processes using a manual line-of-sight surveying technique that is not exact to the real world urban fabric. Different levels and generations of government also have varying standards of accuracy within their legacy land management systems that make their publicly provided property data more or less accurate. Further, urban areas with histories of buildings being demised (divided into different legal or functional properties) are often not reflected in public data with consistent standards. Additionally, there are few private market sources of property data stored at building or floor-level formats with common standards for cities and counties in the United States, Canada and countries in Europe. Therefore, the system of the present invention compensates for those unknowns by using the government supplied coordinate data only as a starting point and source of unique identifiers, generating the necessary property coordinates using the precision created by the system's human operators using the reality mesh coordinate trapping technique.

The present invention uses its reality mesh selected data sources to amass data, arrange the data in the database of the present invention, and use the processed result to at least formulate visualizations at any or all of these levels, at least in response to demand to do so. Western governments tend to organize property data by structures and taxable lots, so the system of the present invention uses an organizational method based on a similar paradigm that allows for fast and intuitive data queries. If a jurisdiction uses an alternate approach, the system can adjust accordingly with "normalized" data. Using a transparent highlight technique allows the system to create a user interface that supports touching or clicking a building and interacting with it by floor, unit, window or superstructure.

New York City is an excellent choice in the United States for an example here because of an assortment of Local Laws (see LL84) that have been passed that require disclosure of a great number of city data metrics and because New York City has an extensive data tracking program for tracking numerous aspects of properties. This is important because it allows for business models that depend on city disclosed data to provide/facilitate products and services. In general, these data sources are public but different ones may need to be normalized by the system of the present invention to be most useful. In the methods of the present invention, the data from these data sources are pulled directly or indirectly into the database and may be supplemented by other data, such as private data, from these or other sources.

Figure 12:
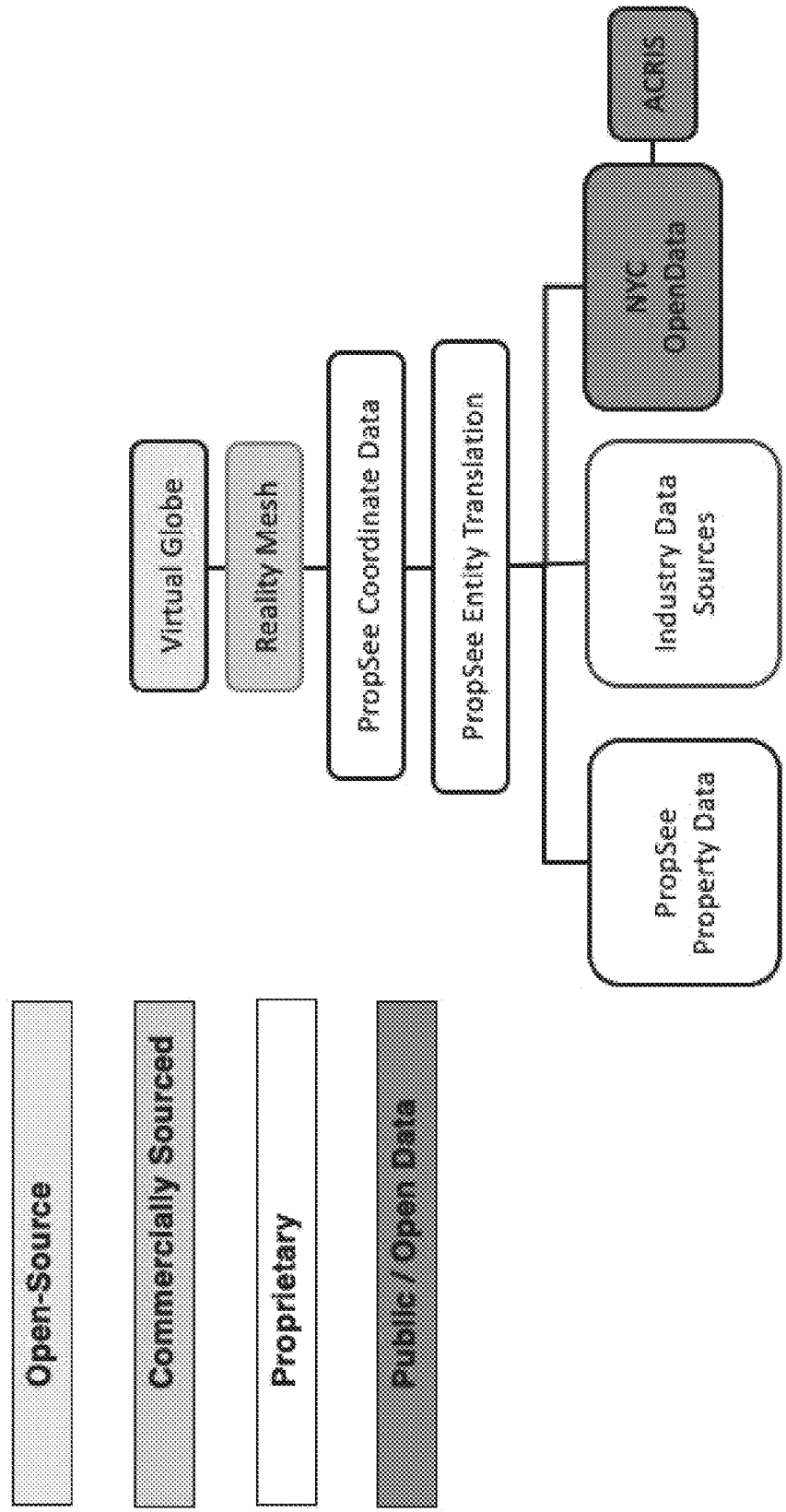
FIG. 12 provides a diagram. the data hierarchy within the system and indicates the nature of the data contained FIG. 13 provides a sample infrastructure diagram of the present invention.

FIG. 12 diagrams the data hierarchy within the system of the present invention and indicates the nature of the data contained. New York City is used as an example in this description but could be substituted with any city, county or other government body that provides public access to tax lot information and/or corresponding unique tax lot identifiers and any relatable or applicable city, county or other government body datasets. Applicable government datasets that are not related to unique properties but only regions, such as climate change and flooding data, are also used by the system to stylize the reality mesh and present information to users.

In the example detailed in FIG. 12, an open-source virtual globe application, such as NASA's WorldWind, CesiumJS, or an open source WebGL viewer such as three.js, can be used to create or simulate a traditional GIS application environment that projects a reality mesh on a cartesian plane in a 3D environment with real world scale and physics. This is an important distinction because the system and methods detailed herein are not limited to any GIS application or web browser and all described functionality herein can be replicated in a 3D environment with sufficient capability to load a reality mesh and perform stylization effects upon said reality mesh. The reality mesh can be drawn at various resolutions and higher resolutions demand more in computing resources. Check infrastructure diagram, FIG. 13, below.

Once the reality mesh is loaded and applied, it can be interacted with using the coordinate data stored in the system's database. This data is constructed as 2D or 3D is polygons of various dimensions and sizes, otherwise described as volumetric regions of the reality mesh. These regions act as GUI contact points for building surfaces and allow the user to accurately and intuitively select any portion of a building that can be inferred from the reality mesh resolution. Because the example mesh uses extremely high-resolution image texture mesh of 2 cm=1 pixel, the detail is very high, and features as small as spray paint on man-hole covers can be discerned, as well as the makes and models of rooftop HVAC equipment and cellular antennas. This is very important to the system because it allows the user to accurately assess all aspects of a building due to the crispness of the image quality in the GUI.

All components of the application are preferably deployed in a client-server relationship across the public internet or in an offline, standalone design where the system and applications can run on a mobile or desktop computer running a local web browser, local web server, local copy of the web application and local copy of the database. A secure HTTPS connection may be required to operate the online implementation of the system over the public internet.

The system provides a user interface deployable on a client device in both online and offline modes through a web browser, web server, web application and database and can be controlled with a mouse, touchscreen enabled device, or voice input. See FIG. 13. The GUI can also be exported by the user as a graphic or rendered into a video format so that the information can be used offline.

Figure 14:
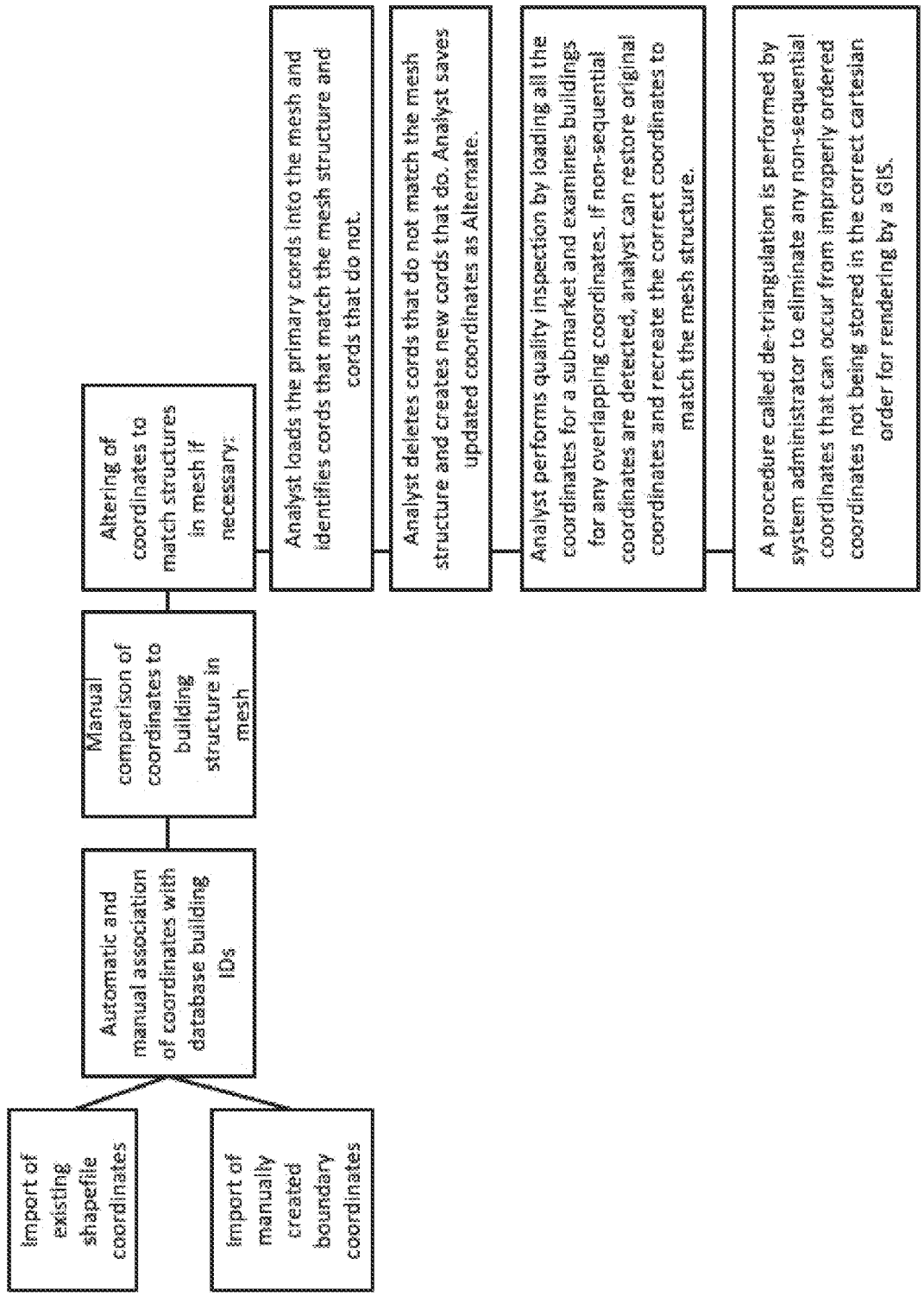
FIG. 14 shows an example of the operational process to inspect, modify or create matching mesh coordinates to match a building envelope.

The operational process to inspect, modify or create matching mesh coordinates to match a building envelope in the reality mesh is detailed in FIG. 14. The method includes an important process for creating and adjusting a two-dimensional coordinate-defined polygon, such as a building footprint. First, the government supplied (legacy) coordinates are associated with a unique building identifier (system, building ID) and any unique identifiers they contain (government IDs) are joined with the new ID in the relational database. The legacy coordinate string is then compared to a building representation in the reality mesh at grade (ground level) so that it can be altered to exclude the sidewalk and any other infrastructure at grade that is not part of the normalized structure or legal (or otherwise) property. Altering to adjust the coordinate string to match the building is performed by removing coordinates that do not conform to the building envelope and adding new coordinates that do match the building representation in the reality mesh. Coordinates matching the building envelope are saved in the system's database. Through this process triangulation errors can occur and they are distortions in the drawing system of a GIS that result from coordinates being drawn when stored in non-sequential strings. For example, to draw a polygon from coordinates a GIS must read all the coordinates as sequential and distortions that appear as acute and obtuse triangles are created when the GIS draws coordinates that are out of linear sequence. Such errors may be created during this process if altered coordinates strings are inputted in a non-linear manner or if coordinates with non-sequential values are parsed into the database such that they overlap along edges, or as non-sequential strings. A de-triangulation procedure is performed to individual buildings or to all buildings in a submarket to eliminate incorrectly placed coordinates. Once cleared of triangulation errors, the coordinate string is stored relative to a building ID and is ready to be used to highlight the building.

An elevation bed of coordinates also needs to be created. This is required because the system needs a set of coordinates near to the subject floor or building to be used to make precise selections for fixing buildings or creating partial coordinates for individual units. Many buildings require adjustments to their base coordinates and this process produces the necessary adjustments to fit the reality mesh, to define the unit boundaries on a divided (demised) floor, or to identify coordinates for building infrastructure such as solar panels, rooftop balconies, water towers, cooling towers, and/or other HVAC or mechanical infrastructure. The method of the present invention includes this adjustment process.

The system's process presents an existing set of real-world coordinates in spatial context with a subject property within the reality mesh. The system does this by presenting it's known coordinates with a semi-transparent polygon surrounding the entire floor of a building. This provides a limited set of real-world coordinates that gives the system precise accuracy when a user selects a dividing point along the building floor because no translations between various global and traditional coordinate set systems needs to be made. To our knowledge, this present invention is the first application of such a process to form such precision and it forms the first known visualization with accuracy for an augmented reality display. Essentially, the coordinate selection process has been simplified with a localized subset and possible options supplied by a known selection of normalized coordinates in the coordinate bed. This allows for precise alignment of units on a floor in context with the real-world imagery of the reality mesh. This is detailed in FIG. 1 using an example of the $8^{th}$ floor in 270 Broadway, New York City. The coordinate bed encompasses the entire floor, and the unit derived from a selection of the coordinates within the elevated coordinate bed results in a unit defined on the north east corner of the building.

The method of the present invention provides for a clean vector change at the points of architectural articulation in a building structure. This is done by joining the first and last coordinate pairs from the known selection set. The resulting effect is a clean highlight of the reality mesh at the corners of a building floor.

Each spatially defined floor or unit (e.g., a living or commercial unit) or portion of a floor representing common areas (e.g., elevator lobbies, hallways, or bathrooms) can be stored as a relational object in the database of the present invention joined with the building table and various other related entities in the database. Obvious examples of such units are rental apartments, residential condominiums, leased office space, office condominiums, lobbies, hotel rooms, mechanical rooms, janitorial storage rooms, utility access rooms, and computer server facilities.

The utility for stored coordinates of a unit or suite in a building are timely with the advent of augmented reality applications and become useful for virtual tours and virtual representations of space for marketing purposes. Further, the present invention includes methods for more advanced visualizations, including three-dimensional floor stacking. Stacking plans of a building are very important because of their ability to apply a colorization range to a building floor or unit and apply highlighting depicting information such as lease termination dates, rental rates, transaction history, tenancies, available spaces, etc.

The application of this tool for examining the sales history of apartment rental markets or condominium sales or building sales is apparent and novel.

The present invention further includes mesh clipping, which can be used to clip (or remove from the GUI) portions of a building in the reality mesh at a selected altitude to allow a floorplan image or computer aided design (CAD) file to be situated in place within the reality mesh so that the floorplan is positioned in the correct location and elevation with accurate spatial orientation. The system's process to create the clipping coordinates necessary to support this capability is as follows:

1. A user or the system of the present invention finds a unique ID for a building to create clipping and loads it using a clipping editing form in the system's administrative tools. The form positions the camera of the virtual globe to the correct building ID in reality mesh.
2. The system checks to see if any existing clipping coordinates exist in the system for selected building and loads these coordinates. If not, the system uses default coordinates based on the building centroid (center point at grade) coordinate and core building coordinates.
3. The selected building is highlighted in the color red with a partial transparency, and 4 horizontal clipping planes are drawn perpendicularly to each other at 90-degree angles around the building centroid, colored yellow, red, green and blue, all with no transparency values.
4. Clicking on each plane, the user can increment or decrement the proximity of the plane to the building façade, property boundary or structural wall as evident in the reality mesh so that the clipping fits the building.
5. Using two step adjustment controls on the clipping editing form for larger or smaller steps, the user has the option of incrementing or decrementing the proximity of the planes to the building facade. Each of the step controls has a positive or negative modifier to move the plane closer or further away from the building.
6. After setting the desired parameters for the horizontal planes, the system presents a slider on the GUI that allows the user to automatically scroll through each floor of the building, top to bottom, to see if the clipped planes show only the desired elements of the building. At the same time, the system displays any stored floorplans for selected buildings at the same elevation as the displayed (clipped) floor in the reality mesh so that user can check and edit (scale or rotate) the floorplan orientation on a two-dimensional axis.
7. A user of the system of the present invention saves the new or updated clipping plane coordinates in the system.

The system of the present invention provides an interface that allows an image of a conventional residential or office floorplan to be displayed at the correct elevation and position of the floor, with all portions of the reality mesh above the floorplan cleared from the GUI, or clipped. This allows for a much improved understanding of the subject space in context with the building, local neighborhood and spatial region making clear the view orientation and location of the unit in the building.

The subject building may be displayed with accurate (real-world) colorization, however for reasons of information presentation, design and emphasis, all of the surrounding urban fabric may be displayed in a "fogged" manner, such as in an opaque white, that mutes background buildings but bolsters emphasis of a building or buildings is being indicated by the GUI.

Buildings with floors of various sizes are managed by creating associations between every image and floor. This allows for buildings such as One World Trade Center (example in FIG. 16) to accommodate a different image file and coordinate layout for every floor. Because the floors of the example building change physical parameters at various elevation ranges this is a critical feature to adapt the system to a multitude of architectural styles and massings.

The system of the present invention allows building improvements such as furniture, HVAC equipment, security systems, security cameras, elevators, boilers, fire suppression equipment, plumbing infrastructure, etc., to be positioned to represent real world accuracy. Metadata such as manufacturer, serial numbers, asset IDs, utility consumption data, equipment models and specifications can be stored and relatable in the database to the precise spatial position of the equipment within the system's reality mesh. By including this data, equipment inspections can occur faster and asset transfers when needed can be accelerated. The example of security cameras is important because of the capability for law enforcement to use the system to quickly identify cameras and camera imaging systems that utilize facial recognition technology, positioned in areas that help with investigating criminal acts or gaps in security camera coverage because of the system's ability to precisely locate and highlight security camera equipment. Additionally, any such metadata associated with data feeds from city, county, state, national or other governmental bodies, or even real estate image archives and the like, can be associated and visualized with mesh coordinate data. For example, a state level of government could regulate that a certain type of air conditioning model or filter be installed in a certain type of retail building (shopping malls) and the system could then visualize the existing or planned air conditioning equipment or air conditioning upgrade in-situ within the retail building in the reality mesh. By matching permits for upgrades and energy consumption a visualization of energy efficient buildings with modern systems is possible. This is a tremendously valuable feature for state governments to monitor compliance with new regulations.

The use of this present invention includes building operations, inventory management, floorplan analysis, emergency services management, property and lease analysis inclusive of various other real estate uses, views, interior design, and machine learning implementations whereby the system can be used to recognize and match photos of a building to assist with law enforcement investigations. This is done in the present invention by comparing the geometry and textures of the mesh with imagery of buildings so that a computer can perform a match. Additionally, building information management (BIM) data, demographic data and traffic count data can also be used as sources of data that can be visualized by the system.

Figure 16:
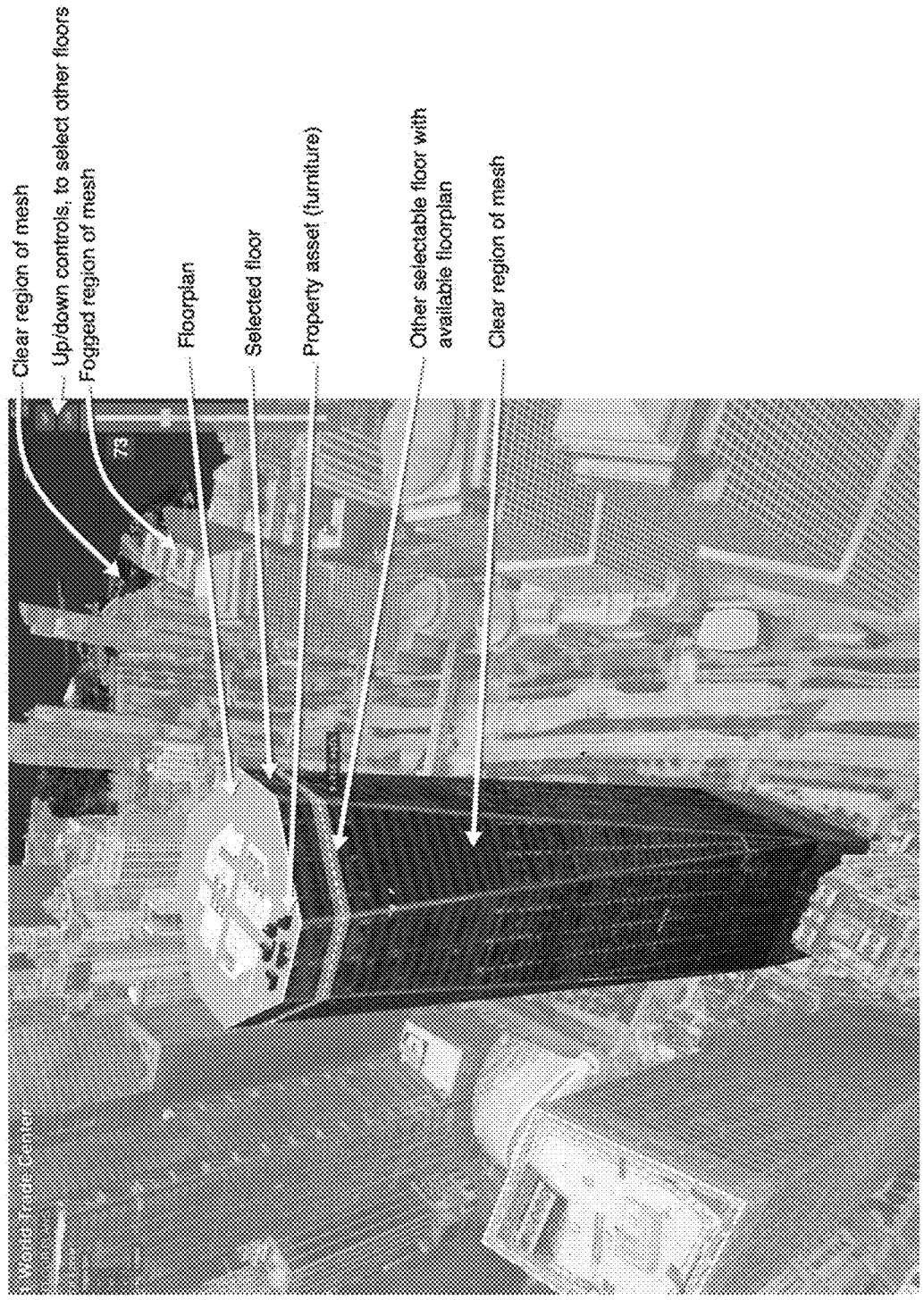
FIG. 16 shows an example of the integration of the core coordinates made by the coordinate bed selection.

When a floor is selected, such as by a user, and a floorplan is displayed, it is possible for the user to interact and receive information about the building, floor, or unit by clicking on other floors that are highlighted (red in FIG. 16) and when clicked upon they may change color, such as to yellow. In the example, a dotted polygon line is visible on the newly select floor. As seen in FIG. 16, both the floor highlight, the dotted line, and the clipped floor coordinates are all enabled and limited by the integration of the core coordinates made by the coordinate bed selection. This process serves to further associate the floorplan image with the data created in the previous processes. The GUI for this process is described in FIG. 16, which is an example of the $73^{rd}$ floor of One World Trade Center, showing the floorplan in situ on the plane of the clipped floor. The example of a furniture or floorplan layout is also visible in the figure along with the "fog" stylization of the mesh. Floorplan layouts are important to commercial and residential tenants because the layouts allow them to better differentiate space that fits their specific requirements. The system's reality mesh clipping capability can also be used to remove a portion of a building or an entire building structure from the reality mesh at grade (ground level) or down to the foundation levels, exposing the structure of the building's foundation. This is obviously very useful for exposing basements, parking structures, underground infrastructure and foundation shoring down to the lowest level of terrain under a building represented within the reality mesh.

This portion of this document details the applications and uses of the methods of the present invention.

Single-click-on-mesh record retrieval technique. The present method uses a relational database to store the system inputs from one or more government or private source Application Programming Interfaces (API) which are automated processes to pull data from web services. An example of a government API is the City of New York's Open Data system. An example of a private API is the hotel booking system operated by the company Expedia. The system can also use exports from government open data services, importing them as Comma Separated Value (CSV) or XML, or JSON data objects, and storing them in prearranged tables organized by levels (city, state, federal) and departments of governments. The same data input processes exist with private data services that can export data with unique identifiers as CSV or XML, or JSON data objects, and storing them in prearranged tables organized by company and/or industry role. Examples of this data include but are not limited to private datasets owned by landlords or other corporations that are normally used by real estate data aggregators or real estate information companies. Other examples include data from government sources such as the City of New York's Department of Buildings (DOB) complaints, Division of Housing and Community Renewal (DHCR) registration forms, DOB violations, DOB permits, Department of the Environment (DEP) asbestos data, Department of Finance (DOF) property tax, DOB façade safety, DOF financial records such as deeds and mortgages stored in ACRIS, DOHMH restaurant inspections, Department of Sanitation (DSNY) graffiti tracking, DOB vacate orders, residential condo plans registered with the New York State Attorney's Office, DOB certificates of occupancy, New York Housing Preservation & Development (HPD) pest complaints (bed bugs, fleas, flies, mice, cockroaches, termites, and the like).

Figure 17:
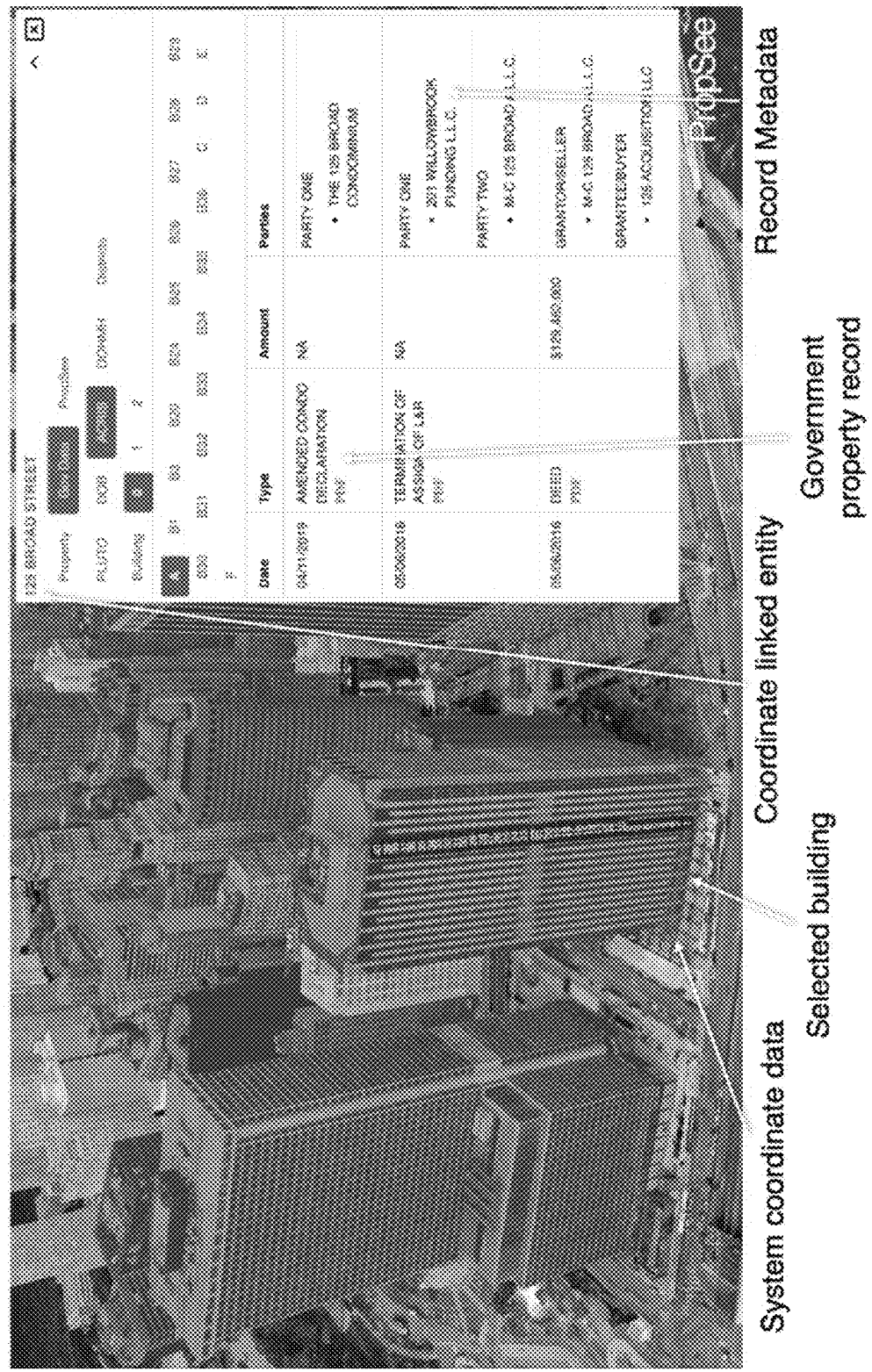
FIG. 17 shows an example of the system whereby coordinate data is used to highlight buildings based on a color coded range of city zoning categories in the present invention.

FIG. 17 details an example of the system whereby coordinate data is used to highlight buildings based on a color coded range of city land use categories. The selected building is indicated in red and linked to an infobox displaying the results of the entity translation which retrieves a selection of building data from the relational database based on the building selected in the reality mesh. The infobox has several tabs with different data sources and, as an example, the ACRIS tab for New York City is displayed. ACRIS is the Automated City Register Information System managed by the Department of Finance in New York City to record and manage property ownership, mortgage, tax, and other transactional financial records. All property financial transaction documents are registered in the system and made available to the public is with the unique identifier of the Borough Block Lot (BBL) code which is one of New York City's building identification methods, another being the Building Information Number (BIN) issued by the Department of Planning. Many cities and counties in the United States have similar ecosystems of unique identifiers managed by municipal departments to manage property data. As a result of selecting a building from the system's reality mesh, the user may be presented immediately with all ACRIS documents produced by the query that originated with the building ID associated with the system inputs. One novel aspect about this method of retrieving ACRIS documents is that the process to retrieve copies of tax documents, deeds, loan agreements, etc., is fast because only a region of the mesh needs to be selected once to produce every property transaction record in the region. The benefit to this is the reduction in the time needed for the system to execute the query in the database because of the very large number of municipal tax and property records stored in the City of New York's ACRIS system, as it is for all other municipal databases containing the legal and transaction documents necessary for local governments to catalogue tax lots and property records.

Any visualization returned by a query on the database to the GUI can be refined by user selected filters (key words) and parameters (date ranges) without a subsequent query to the system, improving performance.

In a first follow up example, if the user submits a query to return all of the City of New York's restaurant inspection data (see DOHMH) provided to the public with relational building IDs, the system could highlight every building that contains a restaurant for which it has data. The data could include metadata associated with every restaurant inspection such as the name of the restaurant, outdoor dining option, cuisine type, inspection date, inspection grade, violation description, etc. The system allows for any metadata field to be used as a filter to select or eliminate matching results from the returned data set. For example, the system could select Mexican or Chinese cuisine types and the visualization will update instantly with the new criteria. This method of visual search analysis is very efficient because an individual's abilities of perception can typically identify real-world buildings more quickly when seeing the actual building highlighted on a map as opposed to identifying a property from a list of addresses.

In a second follow up example, if a user submits a query to return all registered mortgage agreements between all parties, the lender type (such as Bank of America, or Citi Bank) is available as a filter because it was included as metadata in the government data export added as a field in the database and can be used to highlight document results for debtors, mortgagers, assignors, grantors, or lenders. Extending this example, a lender can quickly examine select issues across their loans, by geography.

In a third follow up example, if a user requests a result set that includes all available residential condominiums for sale or rent in a city or submarket, the result set will include all coordinates defining the partial floor highlights in every unit. The result set will also include all of the metadata associated with residential condo markets such as asking price per square foot (PSF), unit size, last sale price, last sale date, or average per square foot pricing in a market, submarket, group of buildings, or specific building. Each of these values can be used to create a spectrum of colorized result highlights throughout the mesh. More specifically, the proximity and line-of-sight views of a selected unit's location of natural areas such as waterways, gardens, forests, parks, and coastlines apply upward pressure on market value.

This method is expandable such that it also has utility when processing government data that includes references to physically unique parts of the building, such as façade inspection scaffolding, water towers, cooling towers, cellular antennas, security cameras, etc., for at least two reasons:

A) All building features can be precisely identified and relationally stored in the database as objects using the present methods.

B) User queries can take into consideration coordinate regions when sorting infrastructure assets. Because the geospatial area of a water tower, emergency generator or water cooler/chiller is known, it can be represented in three-dimensional space, highlighted with attributes or metadata, and communicated to a user on various types of displays, specifically devices which have the native ability to display augmented reality, like an iPad, which can display the representation of building infrastructure on its display using a camera capturing its real world position. The coordinates that have been defined by manual or automatic selection within the reality mesh in the present method are required for this type of augmented reality experience.

The user experience of the present invention is such that specific attributes can be selected for enhanced viewing. The GUI of the present invention may display an augmented reality version of the desired attributes.

Figure 18:
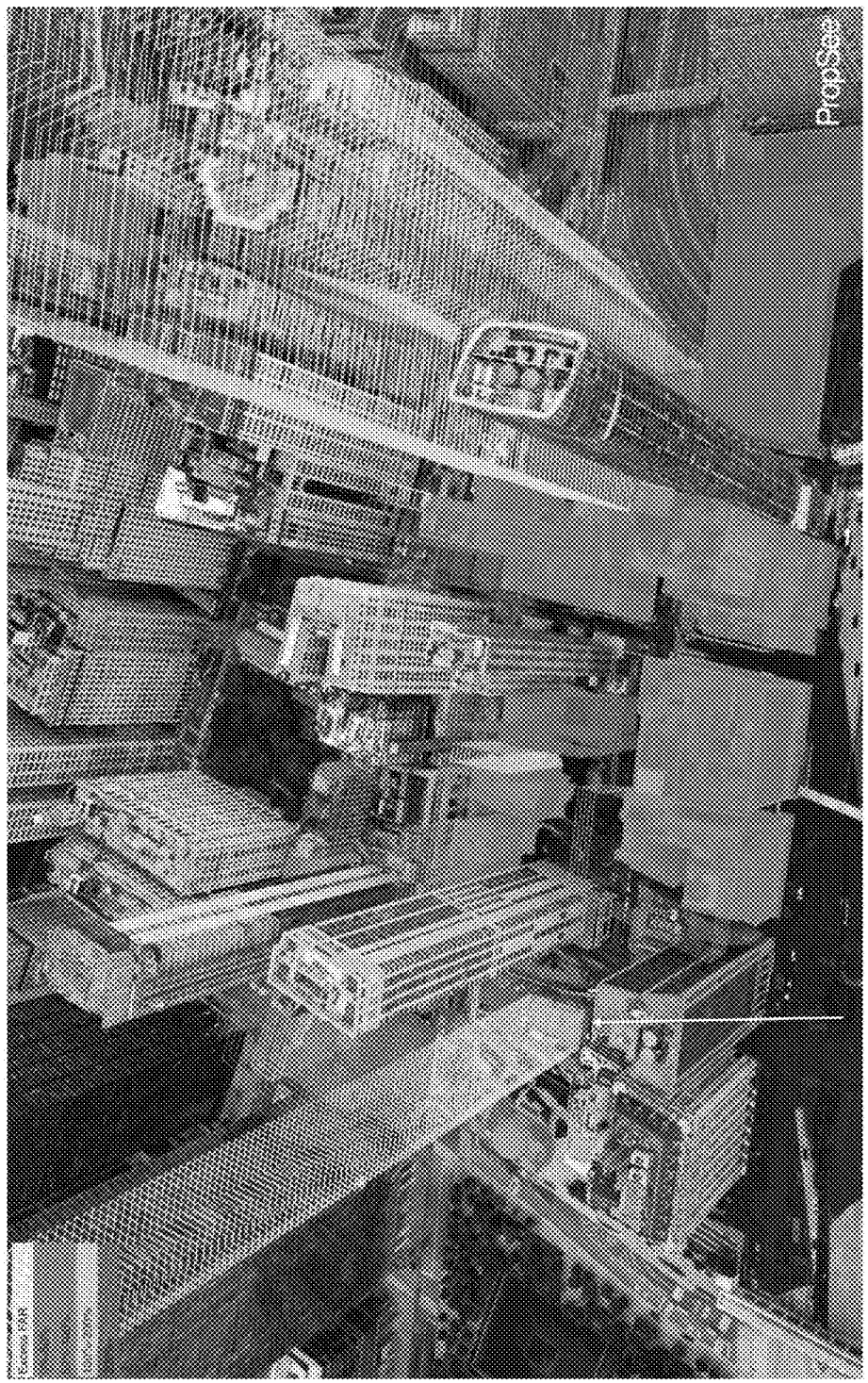
FIG. 18 illustrates how existing and potential Floor to Area Ratio (FAR) differences can be represented in the present invention.

Another application for coordinate data is detailed in FIG. 18 which illustrates how existing and potential Floor to Area Ratio (FAR) differences can be represented. FAR is a measure of the maximum buildable area on a legal lot. There are often differences between the existing floor area and what can be built according to municipal FAR rules. FAR rules are applied to different building envelope size options based on underlying zoning districts where FAR can be used in different ways. FAR calculations must also take into account the city zoning code and be adjusted with the height limitation as of right for the relevant zoning for the selected property parcel or parcels. The system can reference the FAR and zoning allowances of a selected parcel's neighboring lots to take into account "air right" trading potential or density maximization from nearby lots or properties. The present invention can visually project the potential buildable floor area over top of the three-dimensional representation of the building in the reality mesh based in part on the customized building coordinates, which are needed to upwardly project potential floor area in the precise allowable location in context to the reality mesh. The system creates this visualization considering the municipal zoning of the selected property and it's immediately neighboring parcels.

The present invention allows for a stylized returned result technique, such as a city accented with white "fog" or "fogginess" over the streets and buildings with some buildings or floors normalized with no fog.

Figure 15:
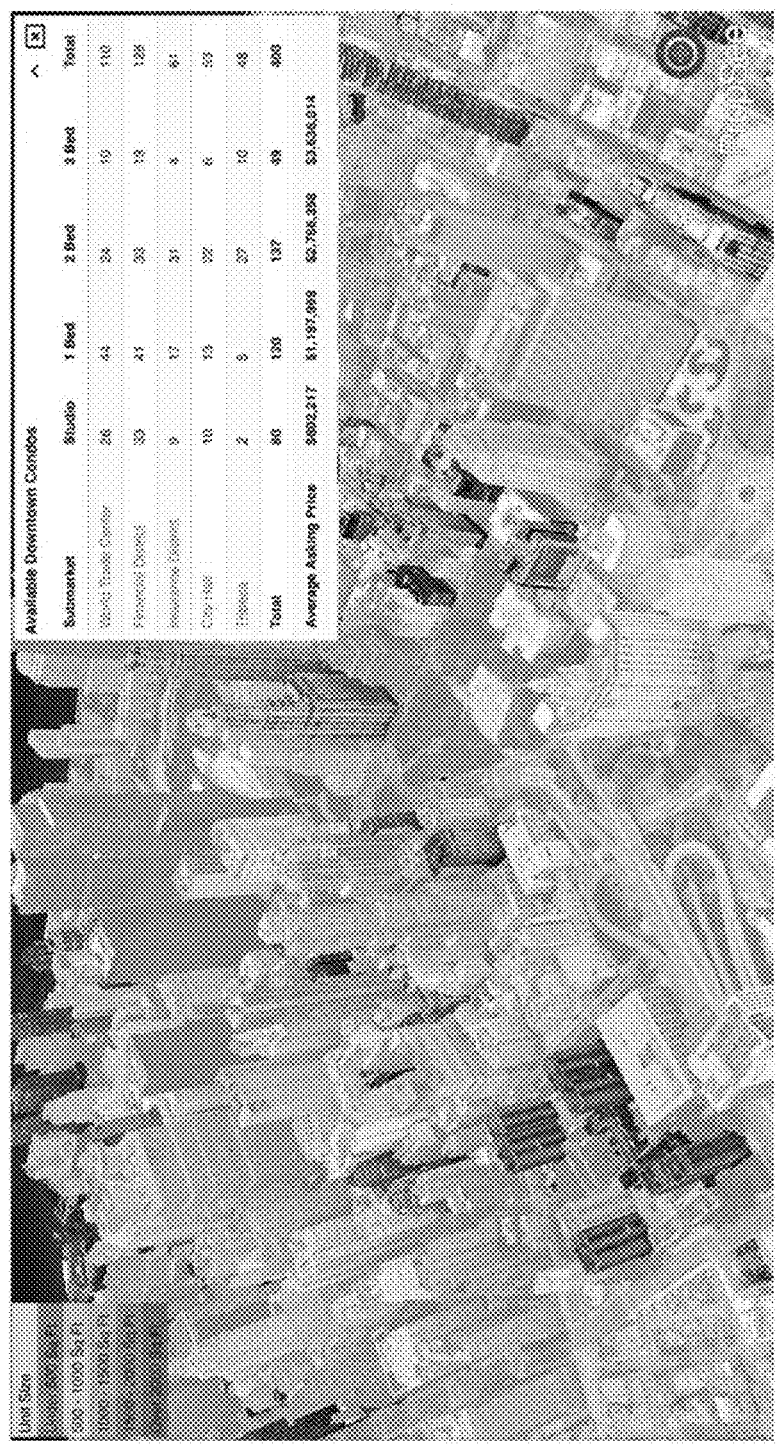
FIG. 15 shows an example of the fog effect where buildings containing query results are shown without the fog effect so that they are usable in the present invention.

FIG. 15 provided an example of the stylistic fog applied over a city to emphasize a single building, floor or unit containing no stylistic fog treatment. This technique provides for an emphasis on the subject building(s) or floor(s) returned in the result set. This assists the application user or audience in understanding the spaces or properties returned by a query.

Similarly, the results of GUI visualizations can be projected within the reality mesh so that only buildings with results returned by the query appear with normalized real-world colors and all other regions of the urban area represented in three-dimensions by the reality mesh are draped with a stylistic white fog.

This technique is only possible from the manipulation of the data collected. Although it would be conceivably possible for anyone to apply a colorization effect to a reality mesh, the ability to "punch holes in it" at the same real world locations as buildings or floors requires a sophisticated processing system, such as one of the present invention that contains all the coordinate data related to buildings within the reality mesh.

Speech Control. Sending the system commands using customized text strings is particularly useful. On both mobile and desktop platforms, the system can accept speech commands to operate the application, interact with the reality mesh, and query stored real estate or government data. Customized speech macros are stored by the system to recognize application functions to control the GUI and a camera on the user device. These macros may include terms such as "spin" and "show office market" and "hide office market" and "show residential rental market" and "show rents" and "hide rents" and "show available apartments" and "hide available apartments" and "available condominiums" and "recent sales prices" and "recent sales prices on an average per square foot basis in a certain submarket" and all relevant real estate database fields and their variables and control modifiers (show, hide or none) within the system. These customized speech commands can be combined into a macro command to build more complex queries.

Figure 19:
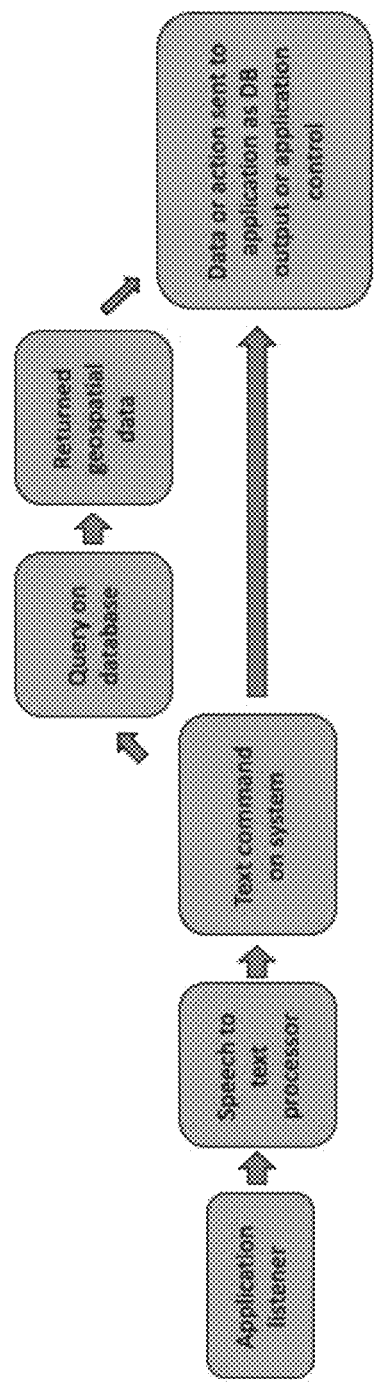
FIG. 19 details speech commands precisely being accepted by the present invention, processed by a speech-to-text processor and converted to a text command in the present invention.

FIG. 19 details speech commands precisely being accepted by the application, processed by a speech-to-text processor and converted to a text command. Of course, it is possible to program others. The command can be a simple action request on the application such as "spin the map" where the application orbits the camera around the reality mesh in the GUI, or a more complicated request whereby a command+database query is parsed by the speech converter. Example of such a query would be "show the 20th floor of 61 Broadway" and the user interface flies through the virtual globe to the stored camera position for 61 Broadway, the mesh is clipped at the 20th floor using the necessary stored data and exposing the floor plan. Further, the user could say "Deed for 61 Broadway" and the user interface would fly to the subject building in the reality mesh and display the property deed in question, retrieving it from the system's association with the unique building ID.

The speech functionality also allows for the ad hoc highlighting of any building or building floor with the spoken command "highlight 61 Broadway" and the result is a call on the database to fetch the building's base coordinates and encompassing the volumetric region of the buildings projection in the mesh with a colorized highlight.

Aggregated speech commands can be submitted in a string, for example "fly to 61 Broadway, One World Trade Centre and 28 Liberty" and the processed text command would result in the application GUI moving the virtual globe's camera, giving the sensation of flight, to the mentioned buildings, pausing at a specific angle for a short period before continuing on to the next building. This can be further expanded by adding conditions such as "show the deeds for 61 Broadway and One World Trade Centre" where the GUI would fly to each building, display the property deed briefly at the predetermined camera position and continue through the sequence.

This can all be performed with the user speaking to the application after enabling the application listener with a single click. In a similar way, facial recognition can be is used.

Costs Comparison. The system includes a mechanism for comparing various costs such as but not limited to operating expenses and real estate tax expenses in a subject building such as showing 1) expenses averaged across a submarket, and/or 2) expenses averaged across similar class commercial buildings (class A, B, C). These comparisons can also be made for similar property types such as office, multifamily, residential condominiums, hotels, and leasehold positions on ground leases.

Examples of real estate operating expenses include but are not limited to property insurance, repairs and maintenance, cleaning and janitorial services, payroll, security, heating fuel, electricity, water and sewer, management fees, administrative fees. Real estate taxes are also stored in the database but organized independently of operating expenses. Each of these is stored in the system and associated with each building record and its relational coordinate data.

The system can additionally produce a visual output of this analysis such as in the GUI on any building represented in three-dimensions within the reality mesh.

Mark to Market Analysis. The system contains a mechanism for comparing the existing rents in a building to what the market rents could achieve today by calculating the differences and applying a capitalization rate (cap rate) to the difference, through this analysis the reasonable value of a property can be estimated. FIG. 20 provides an example of this analysis. The system can produce a visual output of this analysis for any building represented in three-dimensions within the reality mesh. The mark to market analysis requires user assumptions of office rental rates and varying cap rates to output a visualization of the value difference that can be achieved at a future point in time using projected market rents. The system can automate these calculations by ascribing the average CAP rates that are being paid for comparable properties in the subject property submarket.

Value Change. The method can calculate the difference between purchase price of a building and the sales price of a building.

This calculation is conducted algorithmically using relevant data on sale transactions, such as but not limited to: 1) occupancy at the time of purchase, 2) occupancy at the time of sale, 3) available Net Operating Income (NOI) at the time of purchase, which is utilized in the CAP rate calculation, 4) the NOI at the time of sale, which is the CAP rate on a sale, 5) all financing information that can be gathered for financing placed on the property at the time of purchase, 6) all financing information that can be gathered for financing placed on the property at the time of sale, although this data point is more important to the system's historical record keeping used for future analytics of the property investment sales marketplace, and 7) additional financing placed on the property during the term of ownership, such as mezzanine loans or refinancings. The algorithm is regularly adjusted based on the regular collection of data and may be adjusted via machine learning.

Any of the seven itemized information types can be visualized uniquely or in a group and compared to peer buildings using, for example, a color scale range applied to the reality mesh, facilitated by the stored coordinate data.

Determining the equity in a property transaction may be conducted by calculating the purchase price minus the debt placed at time of purchase. This equals the equity invested in a transaction. At the time of sale, the sales price minus the debt balance retired upon sale equals the profit or loss. By calculating the difference between original equity invested and the net profit after repayment of existing debt at the time of sale, calculations can be made to determine the equity multiple and internal rate of return (IRR) which are important metrics to investors.

This value change can be visualized by the system for any individual building or multiple buildings represented within the reality mesh.

Real Estate Industry Outputs. The physical and financial attribute data of a building are very important to real estate transactions. Building parameters such as ceiling heights, floor-to-ceiling windows, column spacing, loss factor, curtain wall type, floorplate size, etc., all of which come into play when determining fair market value.

These attributes, all or some of which are organized and staged for specific visualizations, can be outputs via overlay in a display to convey specific information to various consumers of the information. Possible outputs include development, finance, residential, and office space. An example of a financial output would be a visualization of existing loan size, terms, date of origination and maturity, and lender type (debt fund, sovereign wealth fund, regional or national bank). This can be used to visualize buildings that have high debt to value ratios that have a higher probability of mortgage defaults. This is a tool in the system of the present invention that users can use to sort through the marketplace and highlight a set of buildings that meet the criteria of being leveraged beyond a particular point set by the user. Users can use this tool to identify buildings that are under financial stress by their loan to value ratio. Buildings that carry mortgages in amounts that are close to exceeding the ability of the properties rental yield to pay the monthly mortgage payments are financially stressed. This visualization would utilize the coordinates created to stylize the reality mesh to present the output values for a single building or multiple buildings using, as an example, a comparative color range. The system also considers the passing of time and can change the output visualization based on a user inputted time range or future date.

Similarly, anticipated growth (or decline) in value, based on the data in the database, is determinable and may be visualized as well.

Over time this data will become a predictor of financial performance as the correlation of physical attributes and asset performance data become more robust. Certain physical attributes such as column spacing and curtain wall (e.g., floor to ceiling glass, masonry, punchout) can be highlighted directly on the buildings in the reality mesh with great precision because those attributes are represented across the surface of the building and are visible in the textures of the mesh. This allows a user to query the system to return, for example, a representation of all buildings in a submarket with highlighting applied to buildings with column spacings of a specific range and to see those results returned with the precise columns at accurate spacings projected on the actual buildings in the mesh that meet the search criteria. Additionally, once this data is returned and available in the user interface, the attribute metadata becomes available, such as the type of glass in windows, insulation factors, installation costs, replacement costs and combination queries with government data also become possible such as façade inspection dates (enforced by law in NYC), HVAC equipment inspection dates (testing for bacteria in water coolers/chillers in NYC is a legal requirement), and water tower testing, which is mandated in New York City. Additionally, the system can also allow users to sort and highlight buildings that contain mechanical equipment such as HVAC systems, elevator and escalator systems, rooftop chillers, etc., that were installed or serviced since a date set by the user. This allows the user to identify buildings with end of life mechanical, life safety, air handling, electrical, internet connectivity and utility systems, the state of which impact a property's valuation.

Example users of this functionality would include building owners and vendors of mechanical, life safety, air handling, electrical and utility systems. Visualizing data in this manner provides immediate evidence of non-compliance, inspection irregularities and safety risks.

Telecommunications or wireless radio signal strength (including television signals) surveys are usable by and greatly assisted by the system of the present invention because the stored coordinate data containing information on building materials allows the three-dimensional modelling of signal propagation throughout a dense urban area consisting of concrete, steel, and glass structures, and illustrates areas of weak signal strength in dense areas or areas without line-of-site to cellular transmission infrastructure.

Available building power (watts per square foot), backup power generators, green roofs, rooftop solar panels, and rooftop solar potential are also examples of unique infrastructure in a building that can be visualized by the system. City governments are contemporaneously legislating to reduce C02 and C02 equivalent emissions, minimize the impact of emissions, and maximize alternative energy generation. Determining the coordinates of these building features and storing the data relationally is facilitated through the process.

Because the system contains a reality mesh that has captured the state of the building infrastructure at a single point in time, it can detect changes to the urban fabric when a refresh of the reality mesh is performed with more recently captured photogrammetry. This type of detection is enabled at least in part by the stored coordinate data. For example, new buildings and expansions will become obvious because they will exist beyond the system's core coordinate domain and become very evident, allowing for automatic identification, and updating within the system.

Predictive Analytics. The methods of the present invention stores transactional data on the purchase, sale and leasing of properties of various types, such as office buildings, apartment buildings, retail buildings, office and residential condominium as well as co-op units, hotels, land-lease buildings, parking and industrial buildings. Each transaction record contains attributes such as, but not limited to, purchaser, seller, cap rate, submarket, broker of either party, sale price, sale date, building class, building area, property dimensions, year built, years renovated, tenant information, vacancy information, hotel occupancy information, operating income, operating costs, last sale price, length of ownership, flood plain risk, curtain wall type, existing debt, existing loan-terms, loan size, lender, and lender type.

The system can aggregate the per square foot pricing for individual transactions or average per square foot pricing for specific types of properties in the general market, any specific submarket, or a competitive set of properties.

By examining the transactional data and by organizing it by attribute, the system of the present invention can identify patterns, correlations, and anomalies, but only if the data is first visualized using the system's core reality mesh coordinate data. That is, the is system of the present invention can analyze the visualization and achieve conclusions. The methods of the present invention include an interface that allows the user to selectively choose different transactional attributes and cycle through various combinations to produce visualizations that reveal import factors in determining market valuation. Here are several examples of these economic questions:

Example 1: of three office buildings purchased in the same year and then sold in 2011, why did building X increase in value by a multiple of 3 when property Y increased in value only by a multiple of 2? The system of the present invention presents a user interface allowing the attributes of these transactions to be highlighted independently. The system can also draw a colorized (or otherwise distinguishable) wireframe polygon around a three-dimensional representation of the building in the reality mesh to show a second information graphic variable in context upon the highlighted mesh. By iterating visualizations of the various transactional attributes, the user (or the system of the present invention) can algorithmically identify which attribute is responsible for the difference in valuation between building X and Y. Again, these algorithms can automatedly be adjusted based on on-going data collection (e.g., implementing machine learning toward revising one or more algorithms).

Importantly, when colorization is discussed, it is important to recognize that the color selections preferably could be based on spectrum ranges, for example, reflecting expected minimum and maximum values or another stylistic treatment could be used such as opacity or area tinting, similar to the previously described "fog" effect. Color selections by range might involve use of multiple colors where, for example, red is a "high" range and blue is a "low" range, with other colors used in between.

Example 2: from a selection of residential condominium transactions in the same year, the properties with the highest per square foot sale prices can be identified and the concentrations identified in a specific building or submarkets or within a city. The system uses building IDs and unit numbers of condominiums transacted and color codes (or otherwise distinguishes) the sale prices on a gradient. The coordinates associated with the selected IDs are projected on the mesh and highlighted units reveal the pattern.

Although color gradients are generally used as the primary indicator to reveal information, buildings and units that are returned in query results can also be indicated with other screen drawing elements such as lines, labels, or graphs, such as meters and gauges, that are drawn exterior to the building in the mesh but in context to the subject sub-market, unit, floor, or building. For example the system can float a dollar symbol in space beside a unit and colorize the dollar symbol as an indication of value change, green for an increase in value or red for a loss.

Example 3: by analyzing the operating costs of various buildings transacted during the same year the user or system can breakdown this collection of costs to specific line items such as real estate taxes, property insurance, repairs and maintenance, cleaning and janitorial, payroll and security, heating fuel, electric, water and sewer, management fees and administrative fees. Values for each of these variables can be charted and displayed, such as on a color spectrum, and projected using the coordinates throughout the reality mesh to reveal insights and act as an efficient business intelligence module within the system. Users can create subsets of buildings to compare operating expense costs to determine average costs and identify where expenses could be reduced or reasons for the differences in cost.

Example 4: analyzing attributes of property transactions with different types of curtain walls is an important comparative physical building feature that can be visualized in the context of the present invention. The present invention maintains records of the type of non-structural outer covering such as glass panels, metal panels, floor to ceiling windows, masonry, or punchout style walls. This is an important factor in the valuation of a property. Because the system's database contains records of property transactions attributed with masonry curtain walls transacting at price X, the system of the present invention can be used to predict valuation change of the property if the curtain walls are replaced with floor to ceiling windows by using the comparative value difference of the transactions for similar buildings with floor to ceiling windows. By extension, a similar valuation change analysis can be performed using other physical attributes such as HVAC equipment upgrades or additions and/or renovations to unique infrastructure such as life safety, telecom, pools, health clubs, porte-cocheres, parking, roof deck, or a change to the elevator ratio per square foot of space. Effectively, each property type has different attributes that correlate to value.

The predictive analytics of the present invention can also leverage the system's archive of historical leasing, rental, hotel room rates and building mechanical systems such as generators, HVAC equipment, boilers, elevator systems, and shared conference facilities. This includes office and retail leasing, residential apartment rentals, and hotel room booking. Hotel booking data can be analyzed by date and presented with a time-based animation to identify the months of the year that fetch the highest hotel booking rates per door, or room. Hotel booking data can also be presented in real-time with a feed from a private hotel booking API such as Expedia's to show the current asking rates per room for a user selected date or date range. Residential apartment rental data and condominium per square foot sales pricing can be similarly analyzed to find seasonal changes in rental rates. To do this, the system presents the user with a GUI that allows, for example, hotel booking data in one or more submarket of a city, to be colorized on a gradient scale, by specific hotel room with precise room (or unit) coordinates, used by the GUI to highlight the reality mesh. The interface allows a user to control a time-based animation where building, floor, and unit highlighting turns on and off by playing and pausing the presentation over time based on any of the date values in the database, such as commercial rents, leasing activity, tenant data, residential rentals, hotel booking records or any of the attributes listed in the paragraph below.

The system analyzes historical rents achieved at all buildings and by comparing the rents achieve against physical and operational attributes a correlation will be apparent. The following list comprises some of the variable that influence the rents buildings achieve: views, floor to ceiling windows vs punch out windows, ceiling heights, building amenities (shared conference rooms, cafeterias, building gym, bicycle storage, meeting facilities, parking), building measurement standards, column spacing, proximity to public transportation, building age, date of last renovation, back-up power, rental concession package, tenant improvement allowance, lease terms (length, options to expand, contract or break the lease), large contiguous blocks of space leases vs small spaces, operating expenses, real estate taxes, general real estate market performance, and specific submarket real estate performance, to name a few. Certain buildings outperform the market and their competitive set. It is often a combination of some of the is key variables listed above that result in a property being to achieve premium rents. By tracking the multiple physical and operational variables the system will identify the ones that result in higher rents and allow for greater predictability.

The analytics module can also use the coordinate highlighting system to future project property valuations based on changes in cap rate. A capitalization rate is defined as a comparative valuation metric for properties with income and is measured as the net operating income divided by purchase price which effectively is the return an investor will receive on the purchase price. The system interface allows the user to adjust the capitalization rate for a property at a point in the future and project the valuation and valuation change from the previous sale date using the coordinate highlighting system as a visual indicator. A user can select types of properties by class in certain submarkets to refine the results and provide an explanatory narrative for an audience using these analytics to study cap rate compression or expansion trends in a commercial real estate market.

The system can present all or a pre-selection of the application data visualizations, including all of the analytics visualizations, as automated presentations that are "canned" based on the user role and play these slides to a user at regular intervals with current data. For example, as a user on the system, an office leasing agent can play the slides relevant to changes in the office leasing market in a submarket or across the entire city and quickly become knowledgeable about any major market changes. Similarly, a residential rental agent can play the relevant slides in the graphical user interface that address current residential rental activity and see the data that is impacting current rental rates, vacancy levels and current market inventory. These visualizations, presented in slide format, can be distributed by users of the system as unique URLs, sent in emails or text message, to show their clients or colleagues to communicate market conditions in a time efficient manner.

Data Sources. The system consumes data from three primary sources (A, B, C below), it preferably does not utilize any traditional GIS data such as shapefiles, cadastral maps, street maps, available from government or private sources in an unaltered form. The present invention synchronizes received data for storage. Municipally sourced property and building footprint files containing unique identifiers are the only external data source used to identify properties, however the process works independently of any government or third party supplied property boundary data.

The process of synchronization begins by importing a table of spatial and physical property attributes from a city, county, state, or federal government source and uses it to relate volumetric regions of the reality mesh with a government common identifying number (ID). This ID is used to structure database queries against the public record set. For example, once a government's unique property identifier code is associated with a volumetric region within the reality mesh, that region can be stylized, manipulated, hidden, emphasized, used to show data in context and/or related to spatially, or thematically like charts and graphs. Further, character symbols can be used to be drawn in proximity to the relevant region of the mesh creating the impression of meters that can be static or animated displaying data with time variables such as energy or water consumption, emissions and exhausts, or financial information such as mortgage details, debt, net operating income, or tenancy. See FIG. 21 for example. This technique improves the system's capacity to convey information quickly.

Figure 21:
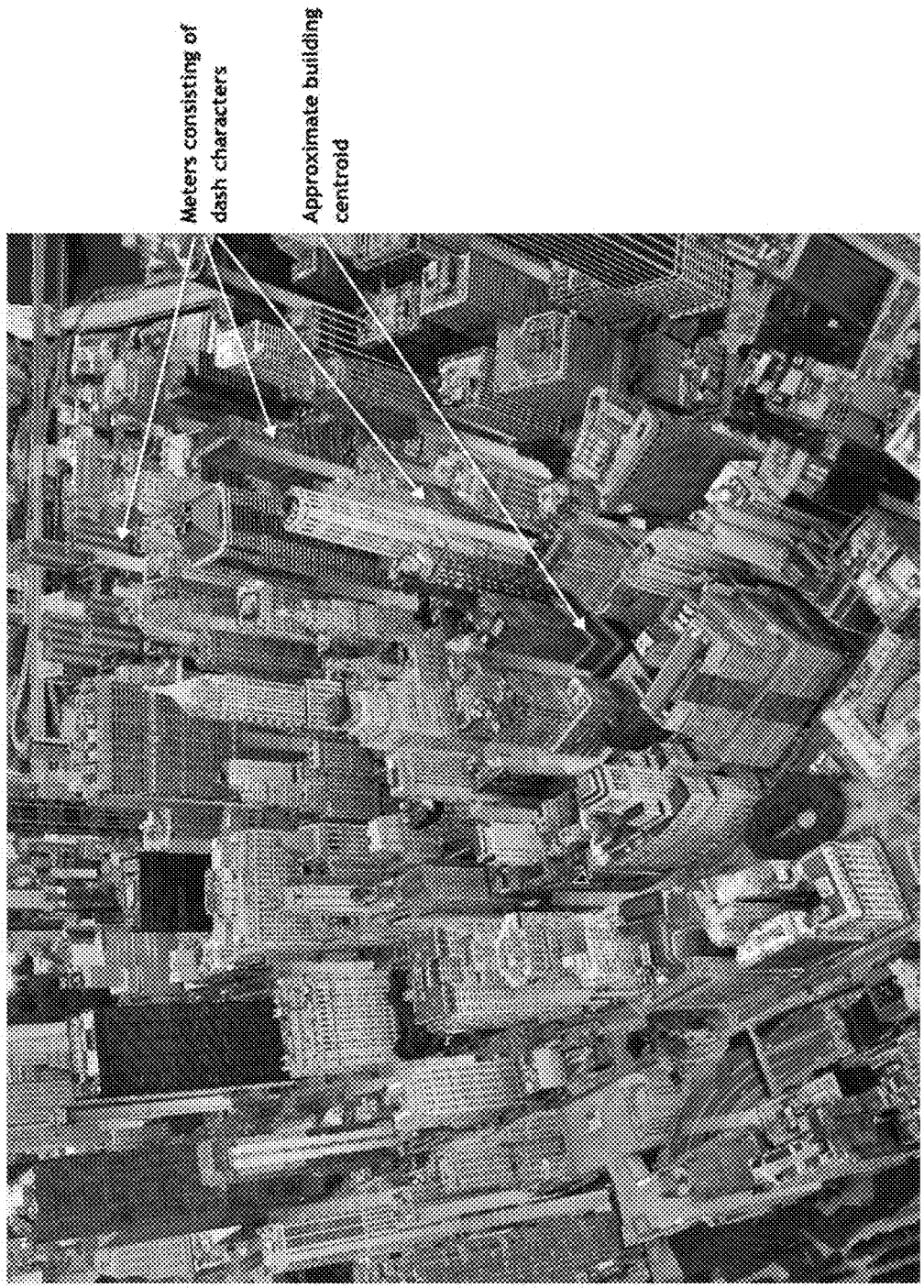
FIG. 21 shows further attributes available for analysis in the present invention.

There is a reference in FIG. 21 to a building centroid; this is defined as the coordinate point at the approximate center of a building floor. This coordinate point is derivable from either an adjusted building footprints or a coordinate selection from the coordinate bed in FIG. 1. The meters that are illustrated in FIG. 21 can therefore be drawn relationally to the building centroid allowing for the correct visual context for meters that reveal property information. Meters can represent a scale of data such as energy, water or carbon dioxide equivalent emissions, debt levels or any property variable that is best understood depicted with a color spectrum range.

A) Manually Adjusted, Traditional GIS Files

Figure 22:
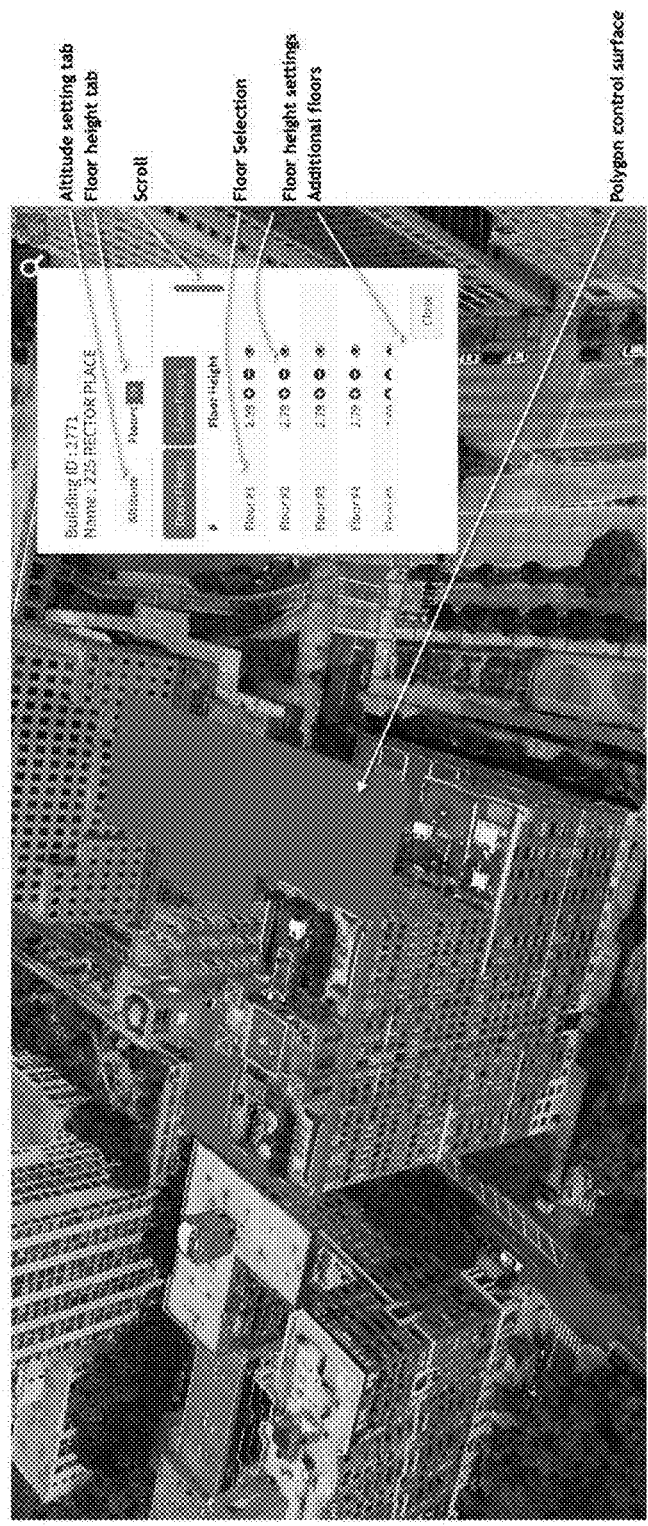
FIG. 22 displays updated altitude of the polygon control surface of the present invention.

Every unique building footprint has its vertices (coordinate points) adjusted to match the mesh. This is performed by adjusting source coordinates to match the visual representation of the property, including land boundaries, within the reality mesh. This is accomplished by seeing the updated altitude of the polygon control surface, as illustrated in FIG. 22, change as user alters position parameters and then traps the updated coordinates.

It is important to note that government footprint GIS datums are typically sourced from cadastral maps that are not precise, real world coordinate representations of reality. The system's photogrammetry models, when calibrated on the cartesian map, are precise, real world datasets that can have coordinates extracted that will be accurate in the real world. This difference requires every government GIS footprint to be slightly adjusted at the vertices to match the photogrammetric mesh. This process is performed manually using various software tools that allow a user to select a vertex or is edge and adjust its latitude, longitude, altitude or any combination of those parameters. This process is necessary at the floor level, allowing the system to support buildings with different floor to ceiling heights throughout different floor ranges. This manual process is necessary for every floor in every building in the system, an example of one of the software tools used in the process is represented in FIG. 22.

B) Manually Selected Mesh Coordinates

The system of the present invention consumes coordinates that are directly selected from the reality mesh to create property coordinates for new properties and new or renovated buildings that have been constructed and do not yet exist in government records. The system can trap any coordinates from a picked selection anywhere on the mesh and associate the selection with a new system building ID. A minimum of three unique coordinate pairs is necessary to properly assemble a two-dimensional polygon that will match a property representation in the reality mesh. This same technique is used to classify building mechanical equipment such as rooftop drinking water tanks, cooling towers, HVAC and air handling equipment, cellular and radio transmission infrastructure, security cameras, solar panels and solar panel locations, air venting and exhaust systems, and elevator systems. Architectural and landscape features such as building entry and egress areas, security zones, parking areas, rooftop gardens, façade safety and property landscaping can also be identified by the selected mesh coordinates and be associated with the unique identifier for the property.

C) Real Estate Information

The system of the present invention consumes various types of documents and associates them with the system's unique property identifies. Examples of document types: structured tables, Microsoft Excel files, CSV files, Argus models, text documents, PDF files, JPEG images, PNG images, floorplan layout files and other metadata necessary and or related to property transactions and building management.

Examples of document content include: commercial and residential lease and sub-lease agreements, property budgets and operating costs, property ownership legal structures (i.e., condominium, cooperative, joint ownership, freehold), building covenants, condominium plans, rent rolls, mortgage documents, financial records and agreements, deeds, tax records, development or air rights, market real estate transactions, certificates of occupancy, insurance documents, municipal assessments, environmental assessment reports, flood and other natural risk data collected for insurance purposes, planning laws, planning policies, city laws, city policies, public health surveys, air quality surveys, and any other publicly or privately available documents containing information relevant to real estate properties in the system.

The system of the present invention can create associated documents, which may be displayed as well. Each document is associated with a property using various software tools. These documents are assimilated into the system as tables of data or stored as binary large objects in the database, associated with unique property identifiers. Also, some documents are stored on the file system, or database, of the present invention in folder names containing the unique property identifiers from the system.

The system also needs to know the elevation of the top floor of occupiable space in a building to correctly highlight floors. This is done with the system's Building Altitude is form which allows us to set unique floor heights for every floor to properly match the building. Various sources of information can be used to accomplish this, as well as examining the façade and window spacings obtained from some combination of overhead and public and private sources.

This information is refined as the system obtains slab height measurements from owners.

Residential and commercial units are created in the system's augmented reality approach from the floor coordinates using the "Create Partials" creation process. These are forms that allow us to select the exterior points on a façade where units are divided along a floor. This form is also used to map a rasterized floorplan drawing to a full or partial floor so that the system can show the floorplan in-situ, with regions of the mesh above the subject unit clipped to reveal the floorplan.

These coordinates may need to undergo manual calibration to fit the buildings in a reality mesh because they come from traditional cadastral maps, which are recordings of the dimensions and location of land parcels. However, when these coordinates do not precisely match reality and they need to have the vertices adjusted by a user to perfectly match the photogrammetric reality mesh.

The system contains the necessary logic to allow a user to select the coordinates of rooftop infrastructure (cooling towers, water tanks, cellular equipment, solar panels, etc.) from the system's core footprints dataset and create an association in the system's database, which may alternatively be done automatically. Because the system already has a database relationship with the building IDs and the unique property ID issued by the city, it can stylize the highlight applied to the subject infrastructure with available city is open data. For example, water tanks that have failed health inspections can be highlighted in red.

In order for a user to select a parameter (or more than one) for display, there are several available approaches. In addition to clickable entries as part of a graphical user interface, clickable menus can appear on an associated portion of the graphical user interface, where the menus can vary based on previous selections or can be customized to the type of user (e.g., real estate professional vs. average consumer). Further, such selection can be voice activated to speed the process. Positive responses to selections can be color coded or otherwise displayed based on attributes of the selection (such as price range or greenhouse gas emission ranges).

Additionally, the GUI information display boxes (information boxes) that are presented to the user when they click on any highlighted security camera or rooftop infrastructure are connected by a thin red line, drawn on screen in context with the application interface, connecting the centroid (central spatial coordinate) of the selected infrastructure and the corner of the infobox of the GUI. This line remains affixed to the on-screen infobox, while the virtual globe (which is a conventional satellite or rasterized city or road map, also known as a basemap, projected on a spherical user interface) camera moves, maintaining a direct indicator between the infobox and the location of the reality mesh containing the selected infrastructure. This is useful because it creates an immediately clear description of equipment information, condition and geolocation with current government data.

Coding approach to the present invention: The system uses a traditional LAMP-stack (Linux, Apache, MySQL, PHP) web service that uses opensource code for the operating system (Linux, GPL), web server (Apache, Apache 2.0 license), database (MySQL, GPL) and virtual globe (CesiumJS, Apache 2.0). There are various open source virtual globes available, such as NASA World Wind, osgEarth, ossim Planet, CesiumJS, gvSIG 3D and KDE Marble. The system presently uses the open source CesiumJS because of its versatility with different reality mesh tileset formats.

All of the middle ware or application-level code used is proprietary. Open source code has been used for some graphical user interface components and the virtual globe which is licensed under Apache 2.0. There are no proprietary modifications made to the generic hosting service, filesystem or Linux OS, however the system's database schema contains many proprietary designs and information.

Figure 23:
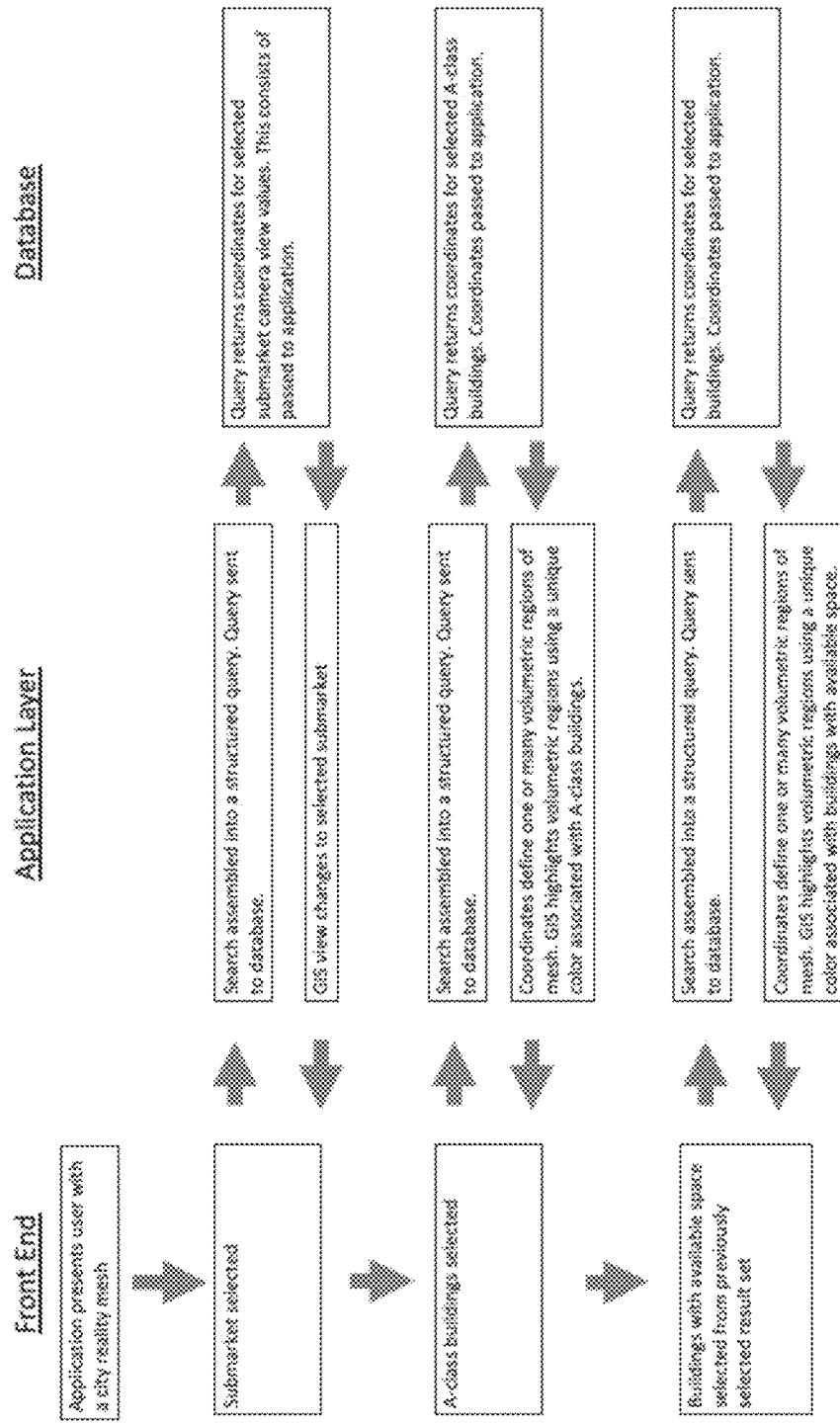
FIG. 23 shows an example workflow of data during a typical user session.

FIG. 23 describes an example workflow of data during a typical user session. On the front-end client side of the application, the user is presented with a graphical user interface that is a reality mesh of an urban area. Typically, the first filter of interest is to narrow geography, so Submarket is presented to the user and they make selection. Query is sent to the database to select values needed to position the camera in the GIS or virtual globe. These values include longitude, latitude, altitude, heading, tilt, pitch and roll. Once returned to the GUI from the DB the values move the camera to be positioned over the correct submarket. For example, Financial District, and the camera is focused on the area North East of Battery Park in Manhattan.

The next step in the diagram is a selection of A-class buildings. This search is structured as a query and sent to the database to return coordinates for all A-class buildings. The returned data will consist of a large quantity of coordinate strings representing the spatial boundaries of the properties in the reality mesh. The user will see the A-class buildings all highlight to a preselected color.

Another selection is made to request the available space for lease or rent in the buildings from the previous result set of A-class buildings. This query returns floor level coordinates which are stylized to precisely highlight full floors or partial floors or units with the mesh using volumetric highlighting technique.

Figure 24:
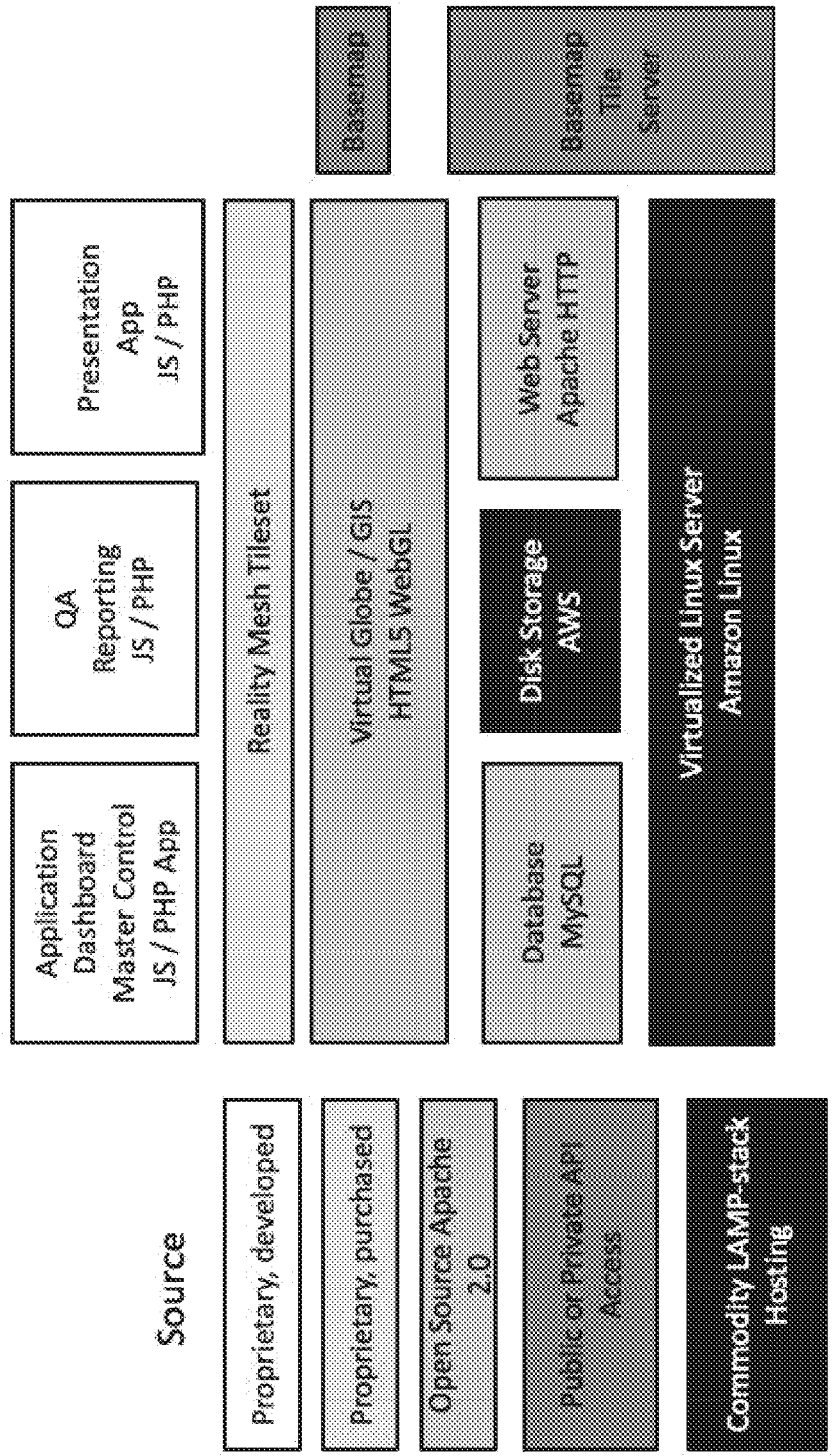
FIG. 24 depicts the PropSee Application Infrastructure Customization of the present invention.

FIG. 24 depicts the Application Infrastructure Customization of the present invention.

This figure describes the level of customization required for each infrastructure component of the application. Complete indicates the component has been entirely created for the system and the various other patterns indicate reduced level of customization effort required to setup the system.

The basemap (the conventional satellite or city or road map overlaid on the virtual sphere in a GIS) contains public and private sources of terrain imagery exclusive of the mesh. They are not used by the application but provide location context for the mesh from high elevation. For example, the system's reality mesh example covers downtown Manhattan from Canal Street to the Battery. The area North of Canal Street is represented by the basemap which the reality mesh is positioned within spatially. Public imagery providers for basemaps include NASA and OpenStreetMap. Private imagery providers, accessible with application programming interface (API) keys, include Esri, Bing and Mapbox.

Figure 25:
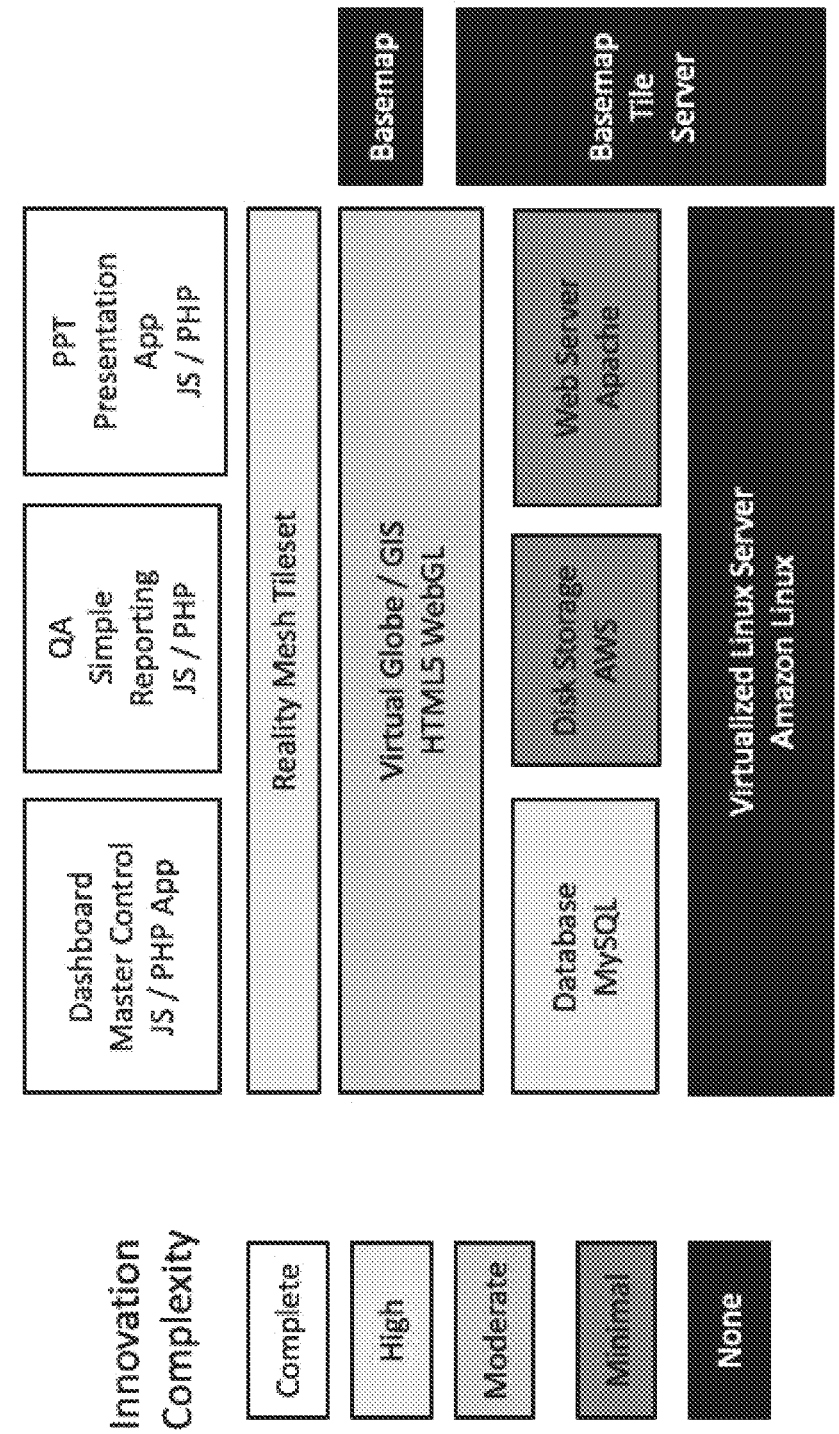
FIG. 25 depicts PropSee Application Infrastructure for Web.

FIG. 25 depicts Application Infrastructure for Web. This figure shows how the application is configured to run in a standard web hosting design with a remote webserver located in a virtualized cloud environment (e.g., AWS) accessible over the public internet. The virtualized server runs on Linux and has a file system, database and webserver, each a component necessary for the application to run. The file system contains the reality mesh tileset files, virtual globe mapping software, customized JavaScript and php files to run the client application from a web browser. Supported web browsers are all that support the HTML5 WebGL standard, which is common. The virtualized server also contains the open source MySQL database, and opensource web server software Apache.

Figure 26:
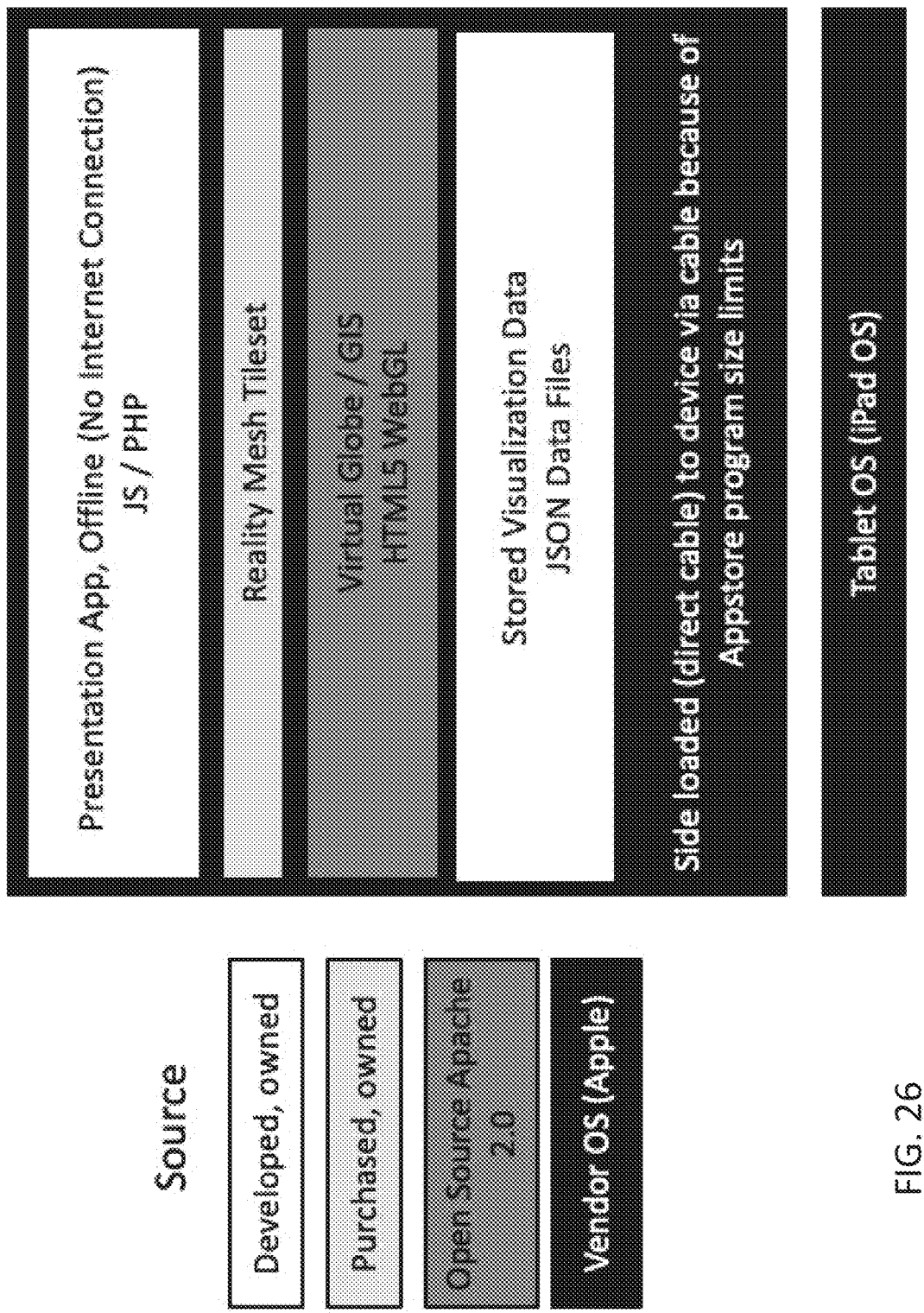
FIG. 26 depicts PropSee Application Infrastructure iPad Standalone.

FIG. 26 depicts Application Infrastructure iPad Standalone. This figure shows the application configured to run on an iPad as a packaged application with no direct internet connection. This involves using Apple's XCode programming application to create a package of the web-delivered version of the system's graphical user interface, reality mesh and data. This figure illustrates how that standalone application is configured, not how the package is built in XCode. The package is described by the items in the largest box. The application must be side loaded (transferred directly to the tablet via cable from a PC instead of distributed through a cloud-based application store) to the tablet because of the large file size of the mesh, which encounters limits created by online application delivery methods such as Google Play or Apple's Appstore.

The standalone application uses the same JavaScript/PHP front end client, as well as CesiumJS opensource virtual globe and web server. However instead of a local connection to a database the application uses client-side JSON data files containing all possible coordinate data necessary to generate visualizations within the reality mesh. The reality mesh tileset files are also stored as part of the package. This results in faster mesh loading times because the mesh is not bottlenecked by potentially slow internet connections.

Figure 27:
FIG. 27 illustrates a submarket selected in lower Manhattan by applying a fog effect to unselected area.

FIG. 27, Fog effect. This figure illustrates a submarket selected in lower Manhattan by applying a fog effect to unselected area. This makes the highlighted buildings in the selected market (World Trade Centre) more prominent and aids in comprehending the visualization. The visual "fog" effect is created by using the system's volumetric highlighting capability applied to the boundaries of each submarket within the reality mesh.

Fog Grouping Distortion Solution. To solve a visual distortion problem encountered by GIS software that would confuse multiple holes punches in the fog highlighting (used to emphasize search results) and produce polygon distortions represented as stray vectors drawn to the horizon, the system includes a solution. The problem occurred when two or more buildings are beside each other in real space and share boundary coordinates. The solution is to create a set of matrices that join all the combinations of the building coordinates involved in the distortion. For example, if there are 3 buildings (A, B, C) overlapping each other, a matrix is created with coordinate combinations for each (Aft BC, CA, ABC). Those are the only four possible combinations of buildings requiring holes in the fog highlight for 3 buildings. Using the matrix, the system can join building A's and building B's boundaries to use for defining the hole. Using this approach, the GIS eliminates any distortions. This technique is used manually in code when distortions are seen in the GIS. If combination matrix AB and BA are the same, even if the keys (Aft BA, AC, CA, BC, CB) are different, their outcome is the same. So those combinations are not used again. The system contains additional ordering logic to avoid duplicates in a combination matrix. For example, if buildings with unique identifiers 12, 13 and 14 are used for fog highlighting, the system always sorts buildings with unique identifiers in ascending order, and then checks the available matrix. This overlapping matrix data stored in the database also has buildings organized in this manner. This logic makes it easy for matching.

Figure 28:
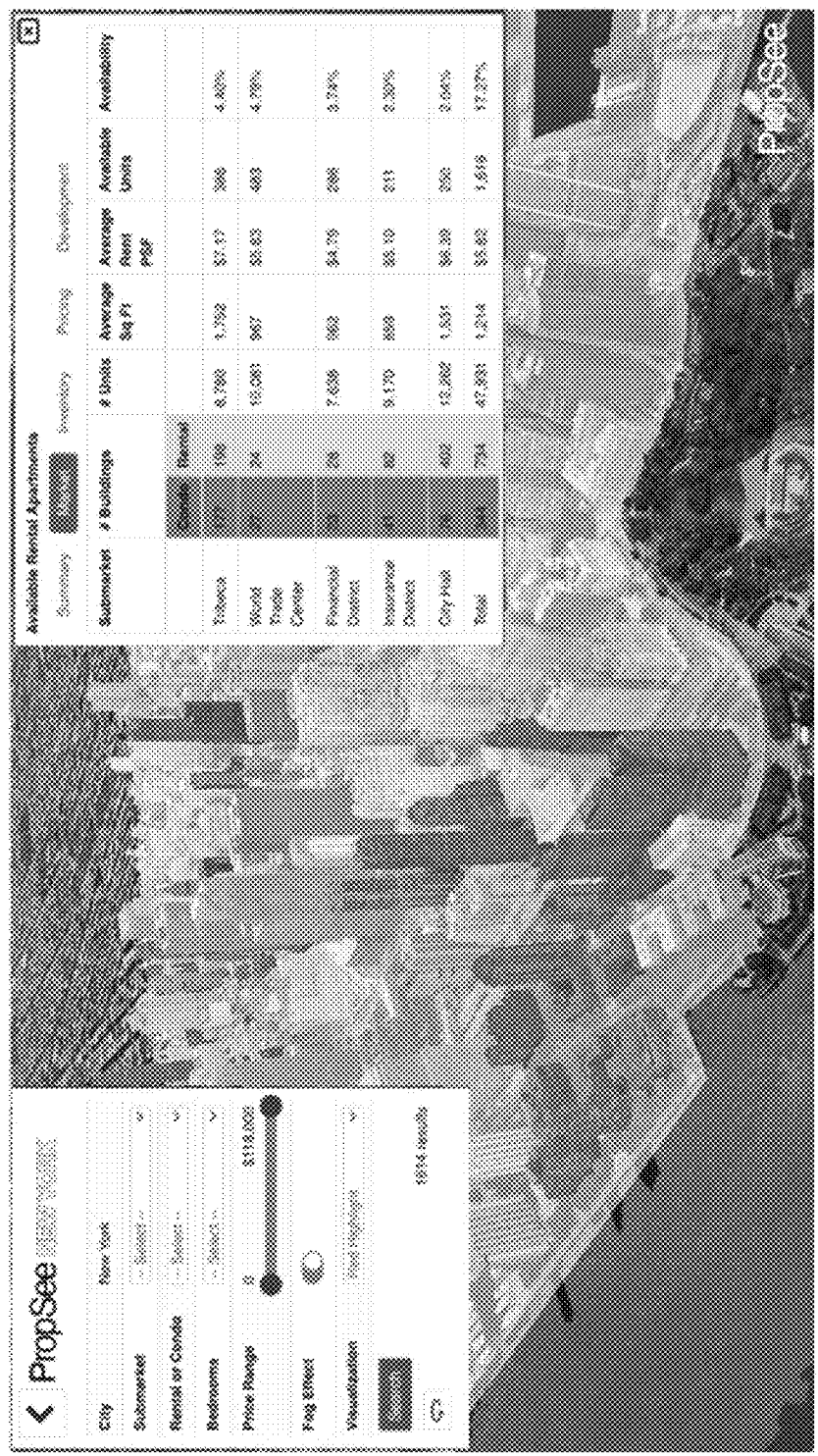
FIG. 28 depicts a solution for fog solution grouping for residential buildings.

This functionality is important because it allows the system to visualize data relative to multiple buildings while draping the remainder of the reality mesh in fog. FIG. 28 illustrates an example of how this feature is used by the user interface. Orange and yellow buildings that represent Condo and Rental type buildings have been punched through the fog to provide emphasis.

Inverse Clipping Logic. Using a defined coordinate plane the system reverses direction of the plane and then switch the view to opposite planes to clip all portions of the mesh exclusive of the subject building. This allows the system to extricate a single building or block from the entire mesh of a city. In doing so the GIS changes position values for the mesh, which requires manual settings for every building to achieve this visualization.

Figure 29:
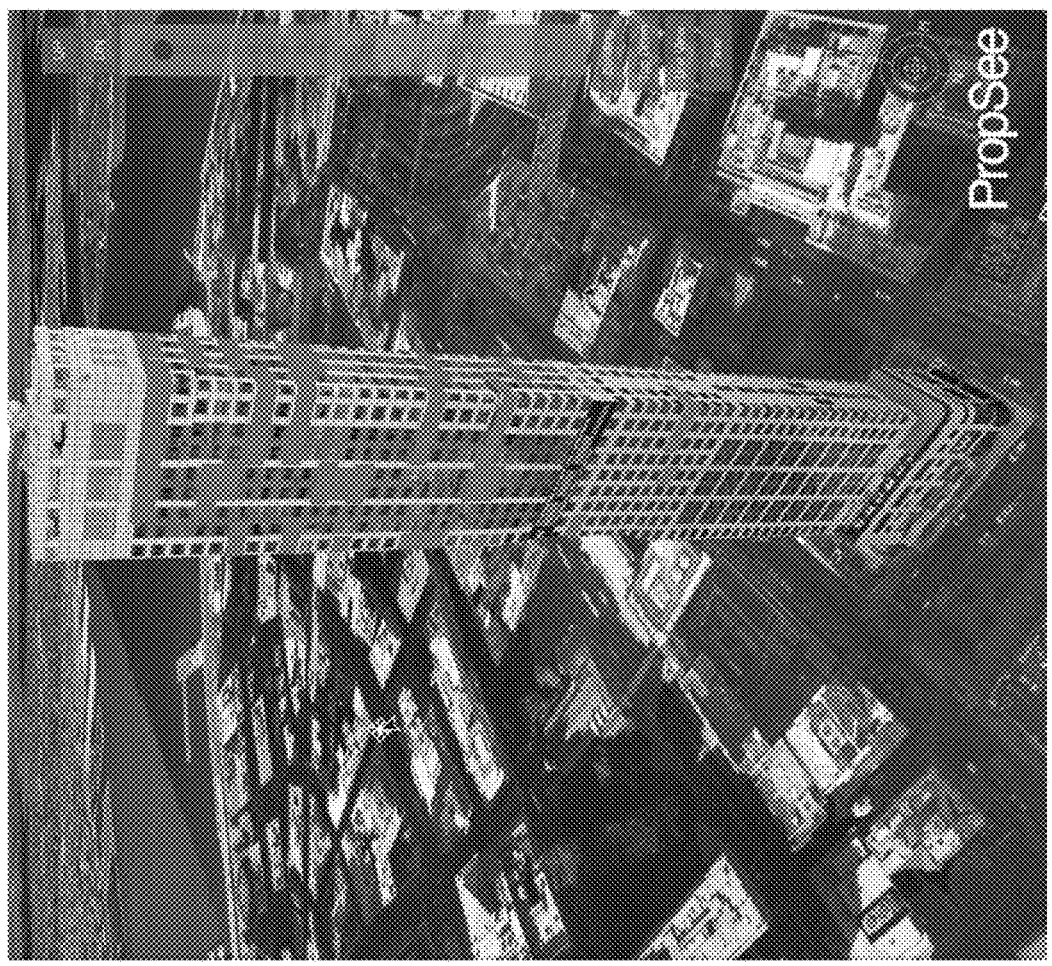
FIG. 29 shows an example of inverse mesh clipping logic.

This functionality is important because it allows the system to generate building-specific 3D stacking plans without neighboring buildings interfering with the view of the subject property. FIG. 29 depicts how this functionality is used by the user interface to show available rental units in a single building in Lower Manhattan.

Setting Partials to Match Floorplans. The partial suite coordinates created manually by the system to highlight the suite position externally on the building in the reality mesh also needs to align with the dimensions of a floorplan image file (PDF or rasterized image) when the mesh is clipped to the specific floor and the image file drawn within the bounds of the partial suite coordinates. Using only the initial set of externally (external to the building in the mesh) captured partial coordinates, the GIS can show an alignment problem with the rendered floorplan image file when drawn in this manner. For example, the image file can be drawn beyond the boundaries of the partial coordinates and can extend into space from the building in the mesh. The solution requires a manual process to select a different set of mesh coordinates from inside of the mesh at the clipped floor position to precisely match the floorplan. The system solves this problem by providing a tool for a user to select (or selected semi or wholly automatedly) a building clipped to a selected floor thereby allowing a user to align the floorplan file to "anchor" coordinates that run along an external perimeter of the building in the mesh and then select new interior coordinates that match the dimensions of the floorplan. This is a laborious process (more so for partial floorplans than full floor floorplans) that requires resizing and rotating an image file to match the building floor parameters as well as the parameters of neighboring floorplans on the same floor that are either beside the unit or on other sides of the same floor. Once these coordinates are trapped and stored in the system they provide the user interface with the necessary data to draw floors in-situ on a clipped (aka sliced) floor as well as the Floating Lines and Polygon Fences (later portions of this document) in context with the floors and suites within the buildings of the reality mesh.

Figure 30:
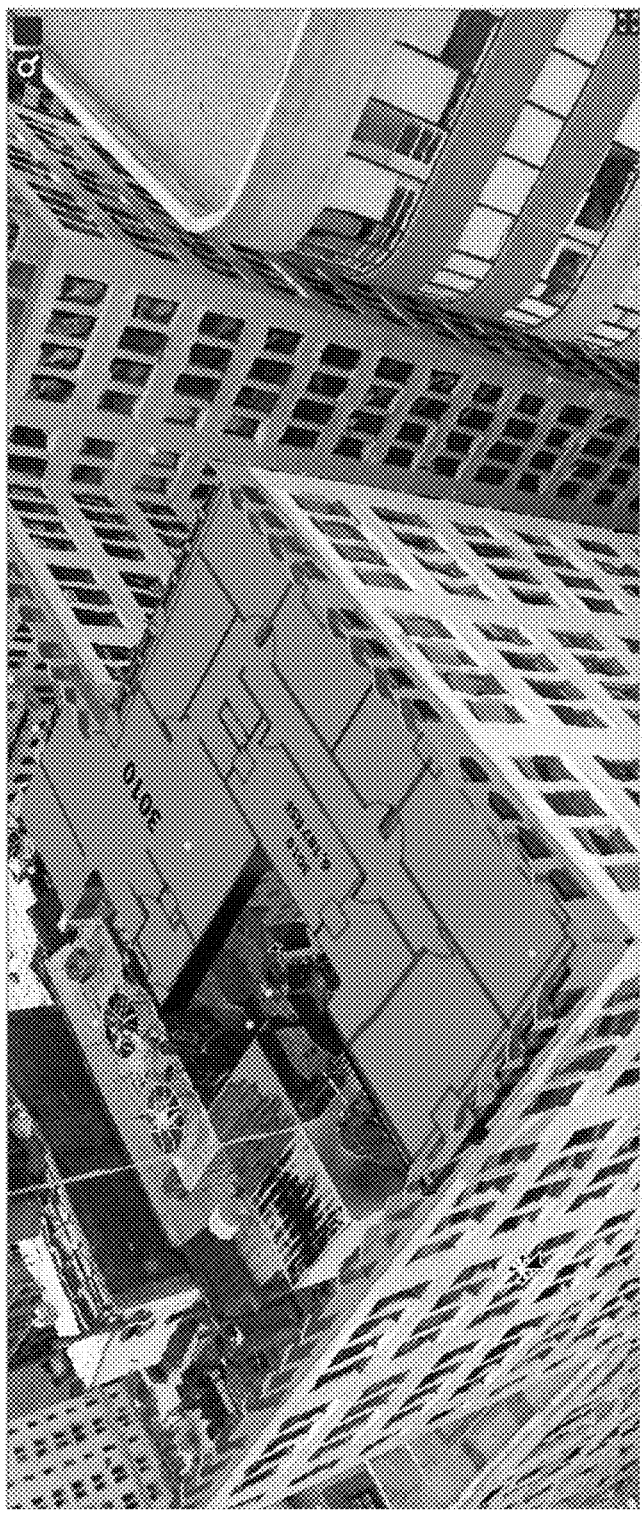
FIG. 30 depicts the GUI used to manually position the floorplan in the mesh.

FIG. 30 depicts the tool used by the system to position floorplans on a clipped floor within a building in the reality mesh. Small yellow dots act as control points to adjust the image.

Automatic Views Logic. The system can generate views from a specific suite or unit by calculating the building centroid and partial suite centroid. The directional vector is determined by the position of the partial suite centroid in relation to the building centroid on a cartesian plane.

The reference to camera is used many times in this document. It refers to how the end user looks at the object (building, reality mesh, sliced floor, etc.) from an angle, height, distance and rotation. The "direction of camera" reference in the below paragraph can be understood as a vector representation of a line, from point A to B that defines the direction when a person standing at point A looks at Point B.

Figure 31:
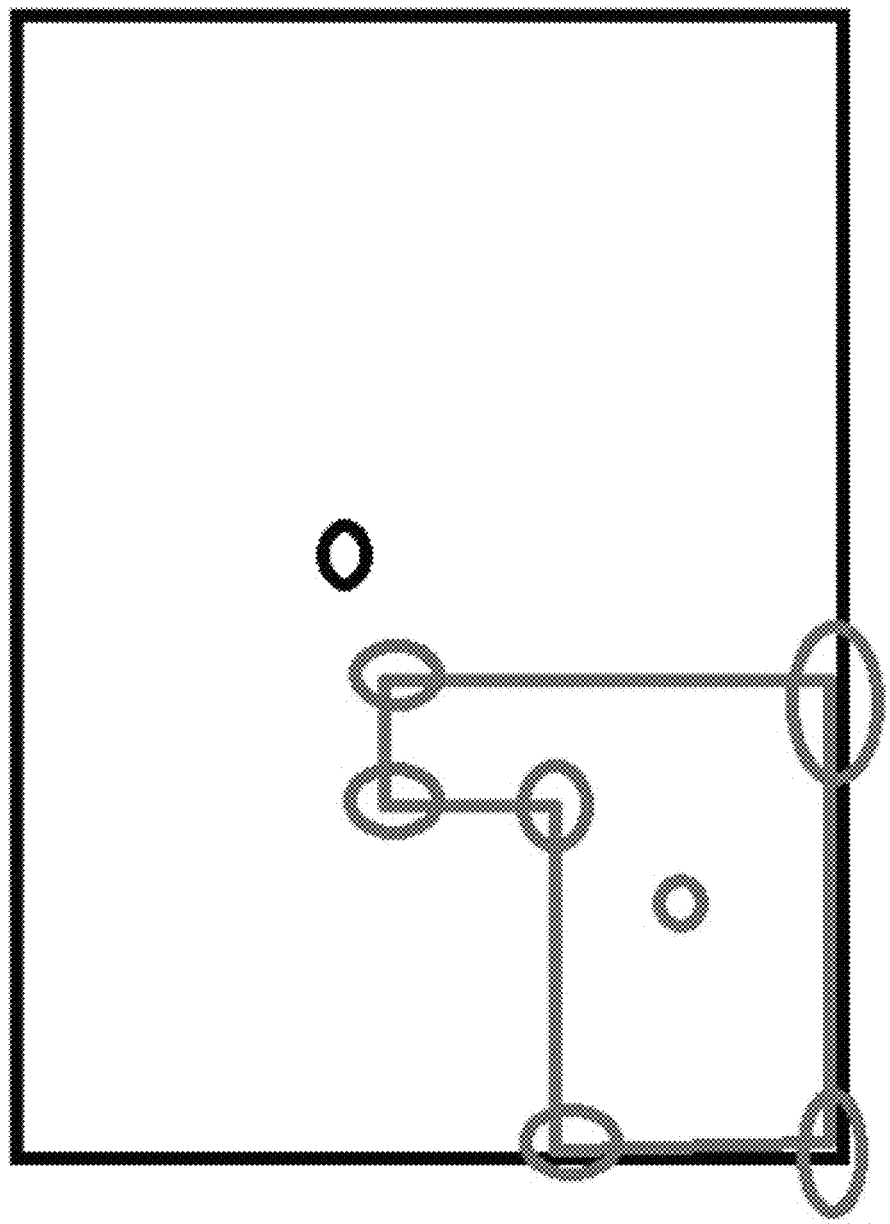
FIG. 31 explains the logic used by the system to choose the viewing direction from partial suite coordinates.

Panoramic views are also generated by the system in a similar manner to suite or unit views. The system calculates the direction of the camera using the building centroid and partial centroid. To achieve a panoramic camera motion a path is required along which the camera will travel. The stored coordinates for the partial unit are used to create this path, and using the GIS's clock, the system defines clock tick events that travel the camera from point to point giving the panoramic view. To calculate the points, the distance between building centroid and partial suite centroid is defined as a threshold distance and any other partial coordinate having a distance from the building centroid greater than the threshold is utilized for a panoramic view point. As described in FIG. 31, the black square outline represents a building footprint and the blue lines represent the partial unit coordinates. The green coordinates indicate points having distance greater than the threshold value calculated earlier.

This functionality is very important because it gives the user the visual experience of seeing the real world view through the reality mesh of the cityscape from the floor or unit. It also allows the user interface to quickly travel to the view without the user having to navigate using the controls of the GIS. Because the views from a unit in a building impact the commercial rents that a unit can fetch on the market, this is an important feature to understand the economic potential of a commercial or residential space for sale or rent.

Figure 32:
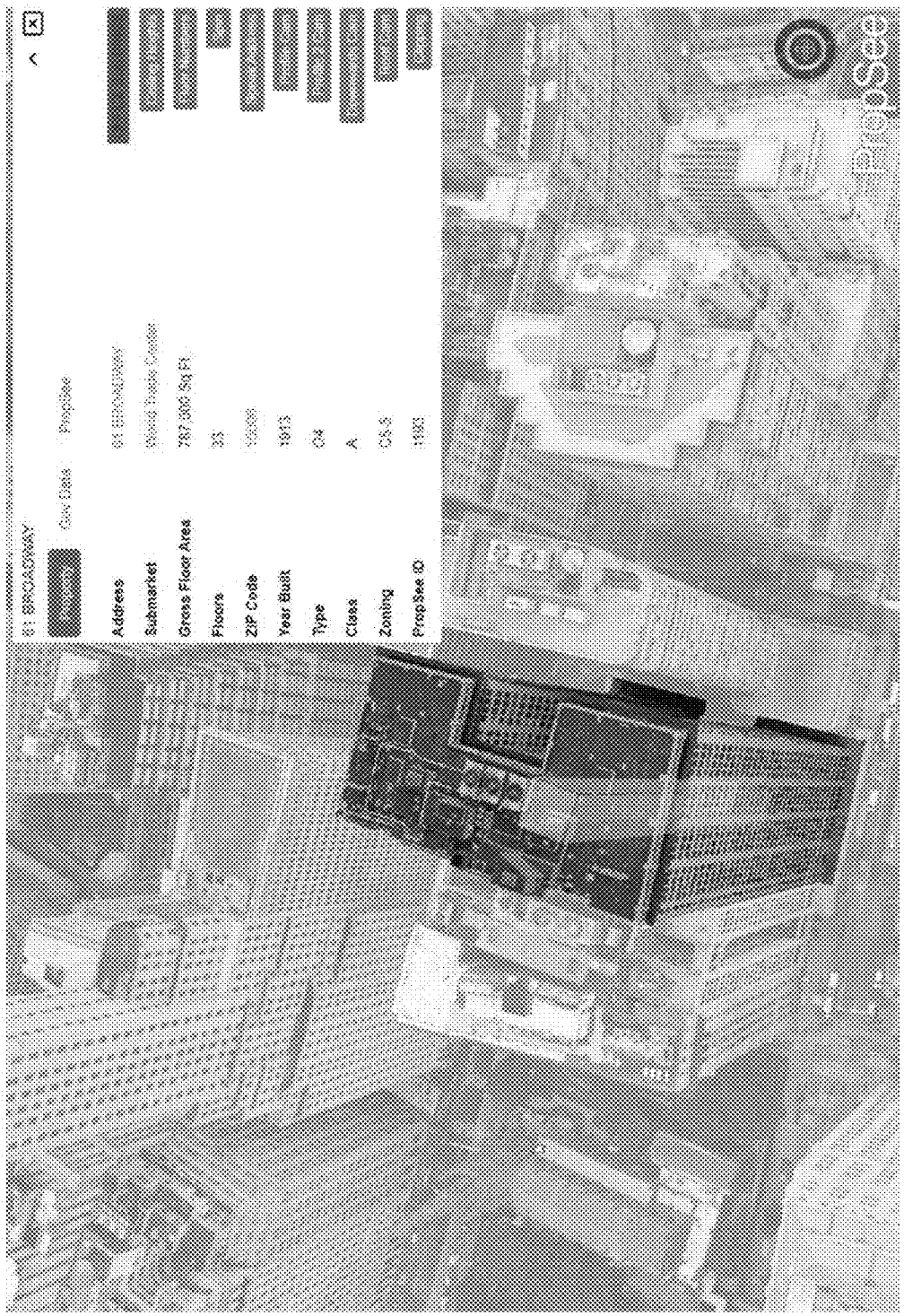
FIG. 32 is an example of visualized elevator cores inside a building in the reality mesh using the system's building coordinate data.

Elevator Cores. Using the stored coordinates of each floor and the height of the building, the system of the present invention has the necessary parameters to create a polygon shape that approximates the dimensions of the building elevator core and elevator cars. This visualization can be presented in the user interface with an opacity value cast over the reality mesh so that the elevator core appears through the transparent buildings in the mesh. FIG. 32 illustrates this concept with a white, opaque polygon drawn inside a building in Lower Manhattan.

Because city data can include maintenance, permit and safety information related to elevator equipment this visualization can be useful to identify upkeep problems or browse through large amounts of specific hardware types and manufacturers of elevator equipment to find particular information.

Figure 33:
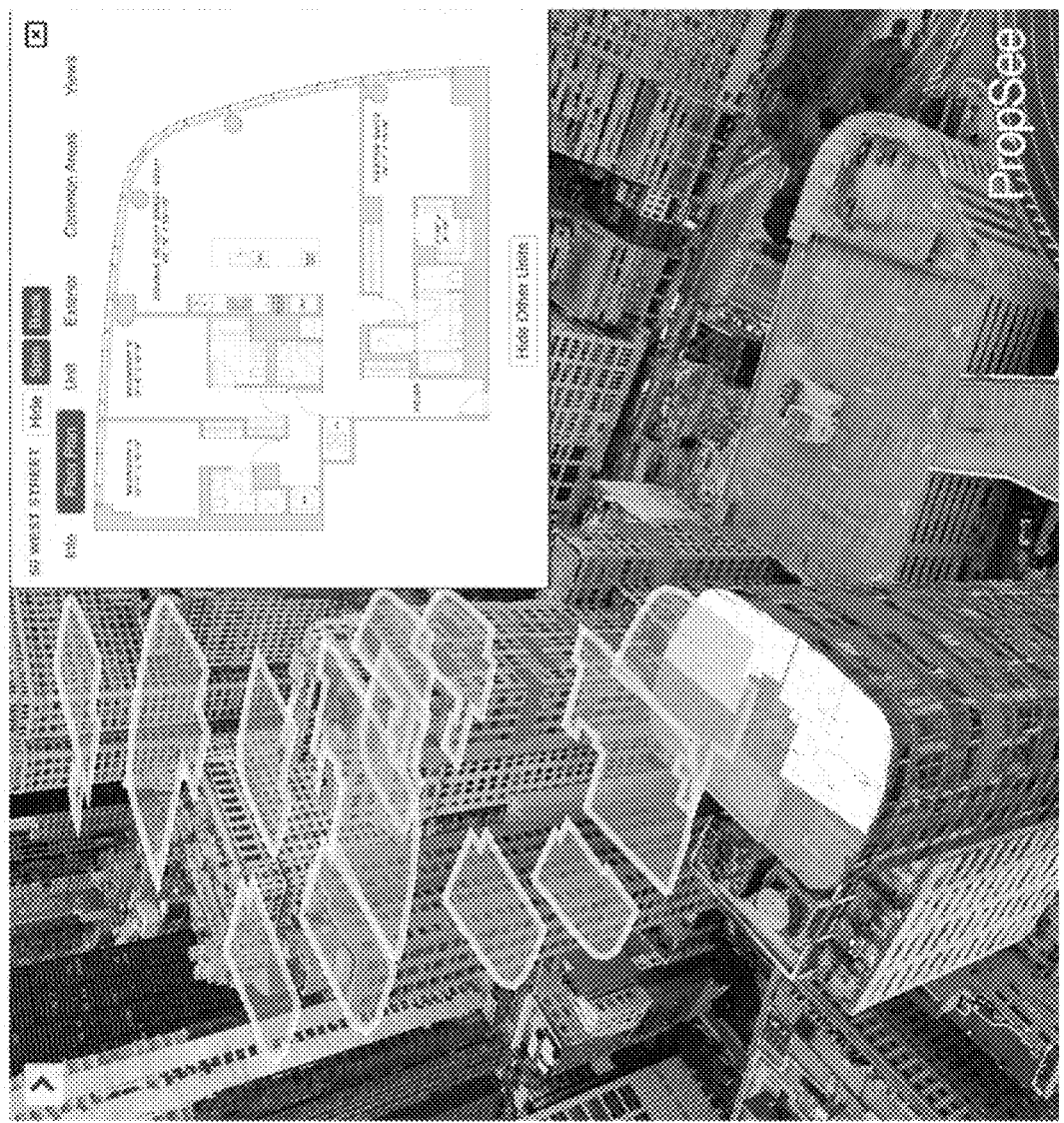
FIG. 33 depicts the systems use of floating lines in the GUI.

Floating Lines. Because the system can manually set partial unit coordinates it can be used to draw polygons in the space above where a floor has been clipped (cleared) from the reality mesh. By displaying units in this manner, it allows the user to understand building unit information while examining a selected unit's floorplan or other details in a residential or commercial building. The user can then select another unit based on the shape or altitude of another unit's floorplan without having to redraw the mesh and possibly lose spatial context. This improves the awareness of the types of units returned or drawn in a search query because the user can visually filter the smaller or larger units that are or are not of interest. FIG. 33 illustrates how these "floating lines" are used by the user interface to present this information.

Floating lines can be stylized using colorized solid or transparent polygons and include the floorplan imagery files (PDFs or rasterized images) within their bounds.

Polygon Fencing Around Partial Units. Similar to the logic for floating lines, a polygon fence can use the partial unit coordinates (stored in the system through the process of defining partial units on a floor) to drawn upwards from the plane or surface of a clipped building floor in the mesh. This polygon fence would show the demarcations of a floor by units and appear as a vertical filled or outlined wireframe colorized by any multitude of user selected variable, such as the number of bedrooms, rental rate or amount of time available on the market. The polygon fence could also indicate internal wall materials of abutting suites, the type of external windows (punchout, floor-to-ceiling).

Adding Rooftop Infrastructure. The system features a manual coordinate selection tool used to identify, describe and store types of rooftop building equipment. For example, the user can select the coordinate bounds around the perimeter on a roof of the cooling tower, add a description, and then store that real-world infrastructure item in the system's database with a unique ID. That ID can then be joined with a query between the government permit and maintenance records for the selected cooling tower in the relevant building and the user interface can then visualize the cooling tower in the reality mesh using any of the available parameters (i.e., registration date, capacity, make, model, intended use) as style-setting variables. Types of supported infrastructure include air handling units, cellular antennas, chillers, cooling towers, green roofs, roof top units, solar panels, water towers, cranes, and HVAC equipment. Styles include highlight colorization or polygon lines. When clicked on, the user interface draws a line that connects an infobox displaying equipment fields and descriptions to the precise location of the infrastructure using the centroid point of the stored coordinates.

Figure 34:
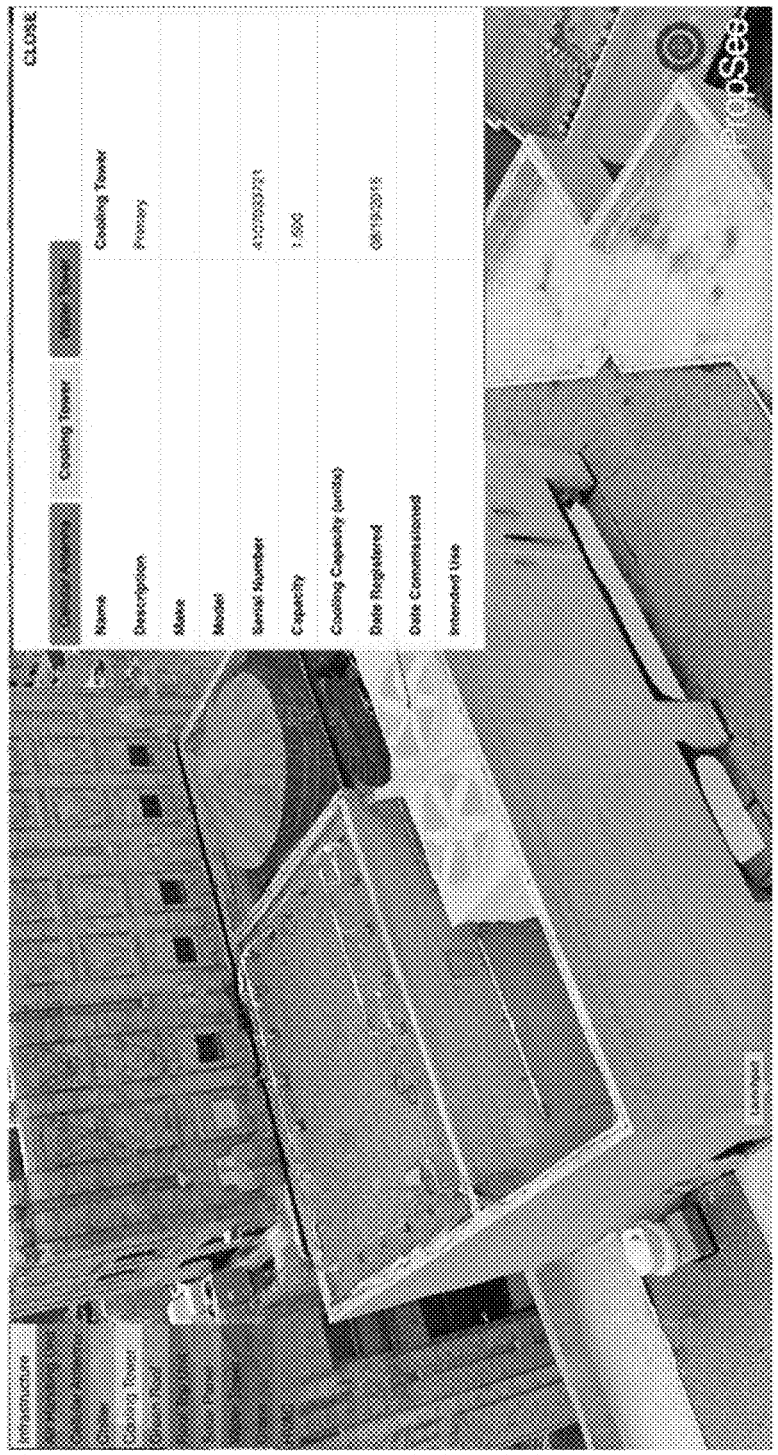
FIG. 34 shows rooftop infrastructure highlighted in the reality mesh that is part of the system.

FIG. 34 illustrates three defined pieces of rooftop infrastructure and the infobox that details them; cellular antennae, cooling tower and water tower.

Figure 35:
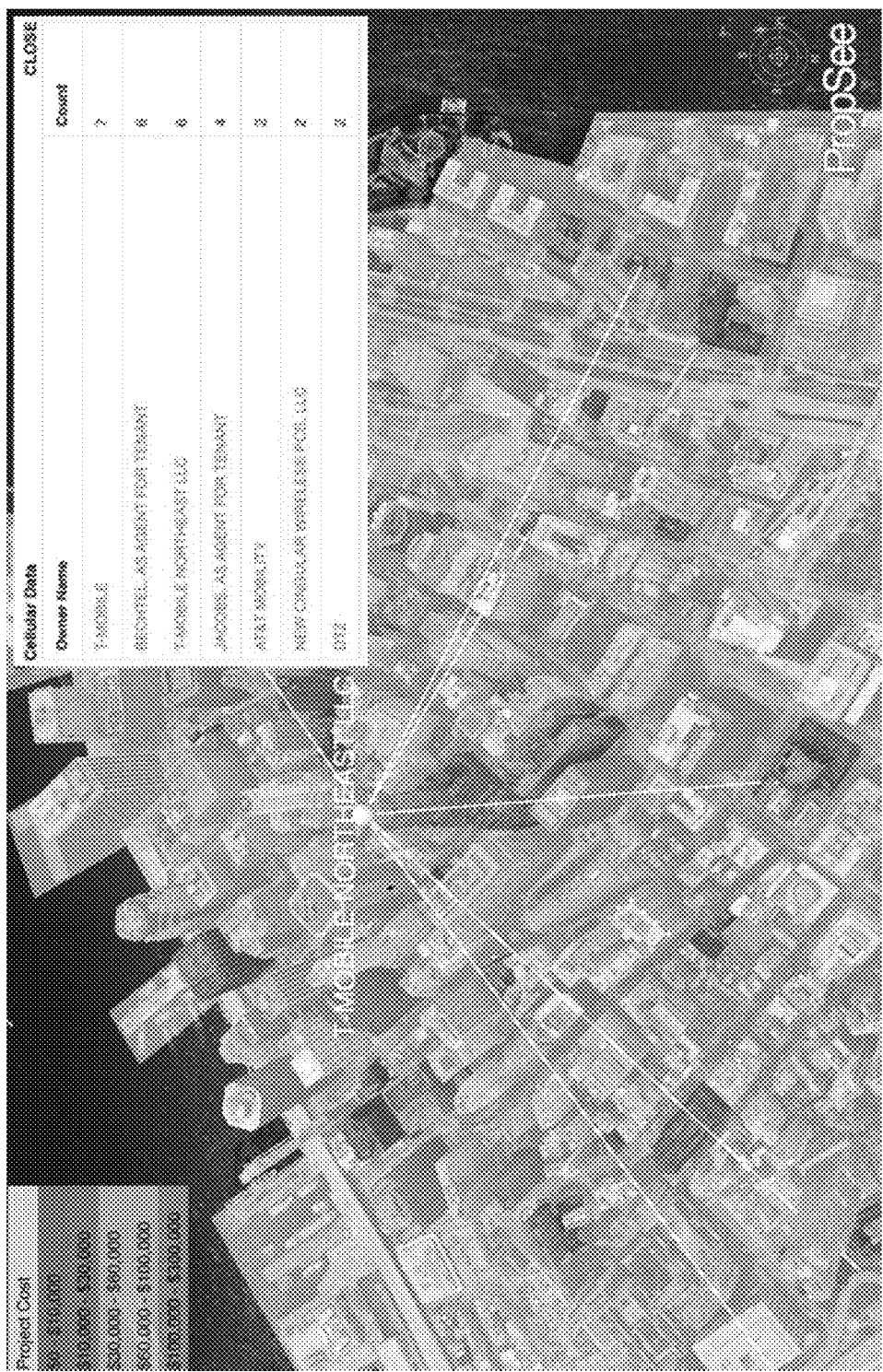
FIG. 35 is an example of building centroid lines connected to indicate shared infrastructure ownership.

Automated Presentation Outputs. The system has preselected slides that play a series of visualizations that present overviews and analytics of the office leasing and sales market, residential rental and sales market, development market, city government open data and tenant industry concentrations. These automated presentations can be selected from the user interface from a menu of options or sent (emailed) to a user as compartmentalized URLs that play immediately upon opening in the web browser. The data in the presentation slides reflect the current government, commercial, real estate and user data stored in the system database. Each slide plays at a user-set interval and includes a timer that is displayed before the next slide is played. Each slide can be paused and interacted with if it includes nested functionality is such as building camera controls, line indicators (as seen in cellular tower maintenance example in FIG. 35 which depicts line connecting all buildings with recent cellular maintenance filings from T-Mobile Northeast LLC) or building information boxes (windows in the user interface).

While the invention has been described in detail in connection with only a limited number of embodiments, it should be readily understood that the invention is not limited to the foregoing description.

APPENDIX 1

Appendix 1

| Source | Agency | Category | Dataset | Description | Formats |
|---|---|---|---|---|---|
| PropSee | Internal | Proprietary | Lease Expiration | | CSV, XML, JSON |
| PropSee | Internal | Proprietary | In Place Rent | | CSV, XML, JSON |
| PropSee | Internal | Proprietary | Vacancy | | CSV, XML, JSON |
| PropSee | Internal | Proprietary | Floor Plans | | CSV, XML, JSON |
| PropSee | Internal | Proprietary | Tenants | | CSV, XML, JSON |
| PropSee | Internal | Proprietary | Portfolios | | CSV, XML, JSON |
| PropSee | Internal | Proprietary | Available Office Space | | CSV, XML, JSON |
| PropSee | Internal | Proprietary | Expense Comparables | | CSV, XML, JSON |
| PropSee | Internal | Proprietary | Residential Sale Listings | | CSV, XML, JSON |
| PropSee | Internal | Proprietary | Residential Rental Listings | | CSV, XML, JSON |
| PropSee | Internal | Proprietary | Residential Rental Yield | | CSV, XML, JSON |
| PropSee | Internal | Proprietary | Residential Investment Sale Yield | | CSV, XML, JSON |
| PropSee | Internal | Proprietary | Investor Profiles | REIT, Institution, Private, User, Foreign | CSV, XML, JSON |
| PropSee | Internal | Proprietary | Current Investment Sales | By PSF | CSV, XML, JSON |
| PropSee | Internal | Proprietary | Historical Investment Sales | By PSF | CSV, XML, JSON |
| PropSee | Internal | Proprietary | Investment Sale Buyer | | CSV, XML, JSON |
| PropSee | Internal | Proprietary | Investment Sale Vendor | | CSV, XML, JSON |
| PropSee | Internal | Proprietary | Buyers Broker | | CSV, XML, JSON |
| PropSee | Internal | Proprietary | Common lender | | CSV, XML, JSON |
| PropSee | Internal | Proprietary | Percent increase in value | | CSV, XML, JSON |
| PropSee | Internal | Proprietary | Length of ownership | | CSV, XML, JSON |
| PropSee | Internal | Proprietary | Loss factor | | CSV, XML, JSON |
| PropSee | Internal | Proprietary | Curtain wall | Glass, Floor to ceiling, Masonry, Punchout | CSV, XML, JSON |
| PropSee | Internal | Proprietary | Ceiling heights | | CSV, XML, JSON |
| PropSee | Internal | Proprietary | Partial Interest/Partnerships | | CSV, XML, JSON |
| PropSee | Internal | Proprietary | Sale Comps | | CSV, XML, JSON |
| PropSee | Internal | Proprietary | Lease Comps | | CSV, XML, JSON |
| PropSee | Internal | Proprietary | Average rent | Submarket, Class, Floorplate Size, Building Age, Tower vs Base | CSV, XML, JSON |
| PropSee | Internal | Proprietary | Under development | Total, Submarket, Delivery, Preleased | CSV, XML, JSON |
| PropSee | Internal | Proprietary | Floorplate size | From X to Y | CSV, XML, JSON |
| PropSee | Internal | Proprietary | Desired vacancy | | CSV, XML, JSON |
| PropSee | Internal | Proprietary | Year of purchase | | CSV, XML, JSON |
| PropSee | Internal | Proprietary | Availability | Blocks of space, asking rent/each space, term | CSV, XML, JSON |
| PropSee | Internal | Proprietary | Leasehold | | CSV, XML, JSON |
| PropSee | Internal | Proprietary | Fee simple | | CSV, XML, JSON |
| PropSee | Internal | Proprietary | Number of tenants | | CSV, XML, JSON |
| PropSee | Internal | Proprietary | Unique infrastructure | | CSV, XML, JSON |
| PropSee | Internal | Proprietary | Co-working tenancy | | CSV, XML, JSON |
| PropSee | Internal | Proprietary | Non-sellers | | CSV, XML, JSON |
| PropSee | Internal | Proprietary | Virtual tours | | CSV, XML, JSON |
| PropSee | Internal | Proprietary | View orientation | | CSV, XML, JSON |
| PropSee | Internal | Proprietary | Retail | High-value, current available, leased but dark | CSV, XML, JSON |
| PropSee | Internal | Proprietary | On the market & how long | | CSV, XML, JSON |
| PropSee | Internal | Proprietary | Selling agent | | CSV, XML, JSON |
| PropSee | Internal | Proprietary | Leasing agent | | CSV, XML, JSON |
| PropSee | Internal | Proprietary | Managing agent | | CSV, XML, JSON |
| PropSee | Internal | Proprietary | Building Class | | CSV, XML, JSON |
| PropSee | Internal | Proprietary | Building Size | | CSV, XML, JSON |
| PropSee | Internal | Proprietary | Building Grossup Rate | | CSV, XML, JSON |
| PropSee | Internal | Proprietary | Asking Rent | | CSV, XML, JSON |
| PropSee | Internal | Proprietary | Loan Size | | CSV, XML, JSON |
| PropSee | Internal | Proprietary | Loan by borrower | | CSV, XML, JSON |

APPENDIX 1-continued

Appendix 1

| | | | | | |
|---|---|---|---|---|---|
| PropSee | Internal | Proprietary | Cross collateralization | | CSV, XML, JSON |
| PropSee | Internal | Proprietary | CMBS | | CSV, XML, JSON |
| PropSee | Internal | Proprietary | Mezzanine loan(s) | | CSV, XML, JSON |
| PropSee | Internal | Proprietary | Preferred equity | | CSV, XML, JSON |
| PropSee | Internal | Proprietary | Mortgage broker | | CSV, XML, JSON |
| PropSee | Internal | Proprietary | Lender | | CSV, XML, JSON |
| PropSee | Internal | Proprietary | Lender type | Debt fund, Foreign, Regional bank, National bank | CSV, XML, JSON |
| PropSee | Internal | Proprietary | Existing loan-terms | | CSV, XML, JSON |
| PropSee | Internal | Proprietary | Borrower entity | History, credit score | CSV, XML, JSON |
| PropSee | Internal | Proprietary | Loan by date of origination | | CSV, XML, JSON |
| PropSee | Internal | Proprietary | Loan by date of maturity | | CSV, XML, JSON |
| PropSee | Internal | Proprietary | Loan ratios | LTV or LTC | CSV, XML, JSON |
| PropSee | Internal | Proprietary | Debt maturity | | CSV, XML, JSON |
| PropSee | Internal | Proprietary | Appraised value | | CSV, XML, JSON |
| PropSee | Internal | Proprietary | Proximity to subway | | CSV, XML, JSON |
| PropSee | Internal | Proprietary | Number of units | | CSV, XML, JSON |
| PropSee | Internal | Proprietary | Existance of 13th Floor | | CSV, XML, JSON |
| PropSee | Internal | Proprietary | Missing floors | | CSV, XML, JSON |
| PropSee | Internal | CORE | Floor height | | CSV, XML, JSON |
| PropSee | Internal | CORE | Spatial coords for floors | | CSV, XML, JSON |
| PropSee | Internal | CORE | Spatial coords for building centroid | | CSV, XML, JSON |
| PropSee | Internal | CORE | Spatial coords for units | | CSV, XML, JSON |
| PropSee | Internal | CORE | Spatial coords for unit view | | CSV, XML, JSON |
| PropSee | Internal | CORE | Spatial coords for unit view panorama | | CSV, XML, JSON |
| PropSee | Internal | CORE | Spatial coords for entrance | | CSV, XML, JSON |
| PropSee | Internal | CORE | Spatial coords for egress | | CSV, XML, JSON |
| Expedia | Expedia API | Hotels | Hotel vacancy | | CSV, XML, JSON |
| Expedia | Expedia API | Hotels | Hotel room asking price | | CSV, XML, JSON |
| Expedia | Expedia API | Hotels | Hotel room availability | | CSV, XML, JSON |
| City | DOF | City Government | Year of renovation | As found in Property Land Use Tax lot Output (PLUTO) | CSV, XML, JSON |
| City | DOF | City Government | Cooperatives | | CSV, XML, JSON |
| City | DOB | City Government | Building Age | | CSV, XML, JSON |
| City | DOITT | Social Services | 311 | | CSV, XML, JSON |
| City | DOB | Housing & Development | Footprints | | CSV, XML, JSON |
| City | DOB | Housing & Development | Cellular Antenna Filing | | CSV, XML, JSON |
| City | DCAS | Housing & Development | Integrated Property Information System | Owned and leased by City of New York | CSV, XML, JSON |
| City | DOE | Education | K-12 Schools | | CSV, XML, JSON |
| City | DOB | Health | Hospitals and clinics | | CSV, XML, JSON |
| City | DCP | City Government | Facilities by department | | CSV, XML, JSON |
| City | DOB | Housing & Development | Complaints | | CSV, XML, JSON |
| City | MOS | Mayor's Office of Sustainability | Energy and Water Consumption | | CSV, XML, JSON |
| City | LPC | Housing & Development | Landmarks | | CSV, XML, JSON |
| City | DEP | Environment | Asbestos Abatement Jobs | | CSV, XML, JSON |
| City | DOB | Housing & Development | Permit Issuance | | CSV, XML, JSON |
| City | DOB | Housing & Development | Job Application Filing | | CSV, XML, JSON |
| City | DOB | Housing & Development | Facade Compliance Safety | | CSV, XML, JSON |
| City | DOB | Housing & Development | Violations | | CSV, XML, JSON |

APPENDIX 1-continued

Appendix 1

| | | | | |
|---|---|---|---|---|
| City | DSNY | Department of Sanitation | Graffiti Tracking | CSV, XML, JSON |
| City | MOS | Mayor's Office of Sustainability | Occupancy | CSV, XML, JSON |
| City | DOI | City Government | Evictions | CSV, XML, JSON |
| City | DOB | Housing & Development | Stalled Construction Sites | CSV, XML, JSON |
| City | DOB | Housing & Development | Certificates of Occupancy | CSV, XML, JSON |
| City | DCP | City Government | Foreign Government Ownership | CSV, XML, JSON |
| City | DCP | City Government | Floor Area Ratio | CSV, XML, JSON |
| City | DOF | City Government | ACRIS Real Property | CSV, XML, JSON |
| City | DOF | City Government | ACRIS Parties | CSV, XML, JSON |
| City | DOF | City Government | ACRIS Personal | CSV, XML, JSON |
| City | DOHMH | Health | Restaurant Inspections | CSV, XML, JSON |
| City | DOHMH | Health | Indoor Environmental Complaints | CSV, XML, JSON |
| City | DOHMH | Health | Rooftop Water Tank Inspections | CSV, XML, JSON |
| City | DOHMH | Health | Rodent Inspections | CSV, XML, JSON |
| City | HPD | Housing & Development | Maintenance Code Complaints | CSV, XML, JSON |
| City | HPD | Housing & Development | Maintenance Code Violations | CSV, XML, JSON |
| City | HPD | Health | Bedbugs | CSV, XML, JSON |
| City | HPD | Health | Flease | CSV, XML, JSON |
| City | HPD | Health | Flies | CSV, XML, JSON |
| City | HPD | Health | Mice | CSV, XML, JSON |
| City | HPD | Health | Roaches | CSV, XML, JSON |
| City | HPD | Health | Termites | CSV, XML, JSON |
| City | HPD | Health | Pests (other) | CSV, XML, JSON |
| City | NYPD | Police | NYPD Arrests (Historic) | CSV, XML, JSON |
| City | NYPD | Police | NYPD Complaints (Historic) | CSV, XML, JSON |
| City | NYPD | Police | NYPD Open Cases | CSV, XML, JSON |
| City | FDNY | Fire Dept | FDNY Company Coverage | CSV, XML, JSON |
| City | FDNY | Fire Dept | Certificates of Fitness | CSV, XML, JSON |
| City | FDNY | Fire Dept | Violation Orders | CSV, XML, JSON |
| City | FDNY | Fire Dept | Notice of Violations | CSV, XML, JSON |
| City | FDNY | Fire Dept | Permit Accounts | CSV, XML, JSON |
| City | FDNY | Fire Dept | Letters of Approval | CSV, XML, JSON |
| City | DOF | Housing & Development | Condo Tax Lots | CSV, XML, JSON |
| City | DOF | Housing & Development | Property Tax | CSV, XML, JSON |
| City | DOF | Housing & Development | Property Tax (Historic) | CSV, XML, JSON |
| City | DOF | Housing & Development | Assessment | CSV, XML, JSON |
| City | DOF | Housing & Development | Hotels | CSV, XML, JSON |
| City | DOF | Housing & Development | Sales (Historic) | CSV, XML, JSON |
| City | DOF | Housing & Development | Tax Lien Sale Lists | CSV, XML, JSON |
| City | DOF | Housing & Development | Tax Exemptions | CSV, XML, JSON |
| City | DOF | Housing & Development | Tax Abatements | CSV, XML, JSON |
| City | DOF | Housing & Development | Condo Income Comparable | CSV, XML, JSON |
| City | SBS | Environment | Hurricane Sandy Inundation | CSV, XML, JSON |
| City | DCP | Public Safety | Hurricane Evacuation Zones | CSV, XML, JSON |
| City | DOB | Housing & Development | Elevator Device Details | CSV, XML, JSON |
| City | DOB | Housing & Development | Elevator Permit Applications | CSV, XML, JSON |
| City | DOB | Housing & Development | Boiler Data | CSV, XML, JSON |
| City | DCAS | Environment | Con Edison Steam Network | CSV, XML, JSON |
| City | DOHMH | Health | Rooftop Cooling Tower | CSV, XML, JSON |
| City | DCP | City Government | School District | CSV, XML, JSON |
| City | DCP | City Government | Fire Company | CSV, XML, JSON |

APPENDIX 1-continued

Appendix 1

| | | | | | |
|---|---|---|---|---|---|
| City | DCP | City Government | Police Precinct | | CSV, XML, JSON |
| City | DCP | City Government | Health Area | | CSV, XML, JSON |
| City | DCP | City Government | Sanitation Subsection | | CSV, XML, JSON |
| City | DCP | City Government | Council | | CSV, XML, JSON |
| City | MTA | Metropolitan Transit Authority | MTA Network | i.e. New York City Transit, Long Island Rail Road, Metro-North Railroad | CSV, XML, JSON |
| City | MTA | Metropolitan Transit Authority | MTA Bridges and Tunnels. | | Collada |
| State | DHCR | Division Housing and Community Renewal | Rent Regulation Data | | CSV, XML, JSON |
| State | Attorney General | Real Estate Finance Bureau | Condo Plans | | CSV, XML, JSON |
| PropSee | Internal | Proprietary | Subway Station Models | | Collada |
| PropSee | Internal | Proprietary | New Development Models | | Collada |
| PropSee | Internal | CORE | Spatial camera setting | i.e. Longitude, Latitude, Altitude, Heading, Tilt, Pitch, Roll | CSV, XML, JSON |
| PropSee | Internal | CORE | Highest elevation of marketable space | Altitude | CSV, XML, JSON |
| Private | Corporate | Landlord, or other real estate industry company | Enterprise dataset | Similar to PropSee data parameters or other property data | CSV, XML, JSON |
| Private | Corporate | Landlord, or other real estate industry company | Enterprise dataset | Similar to PropSee data parameters or other property data | Collada |
| Public | Public Domain | Commonly known areas of geographic importance | Submarket Names and Boundaries | i.e. Tribeca, FiDi, Plaza District, Hudson Yards, Murray Hill | Terms |
| Public | Public Domain | Commonly known areas of geographic importance | Submarket Names and Boundaries | i.e. Tribeca, FiDi, Plaza District, Hudson Yards, Murray Hill | Terms |

| Source | Parent Export | Rows | Fields | Uses System and Method | Highest Visualization Level | Typical Vis Level |
|---|---|---|---|---|---|---|
| PropSee | | | | Yes | Floor | Floor |
| PropSee | | | | Yes | Floor | Floor |
| PropSee | | | | Yes | Floor | Building |
| PropSee | | | | Yes | Floor | Floor |
| PropSee | | | | Yes | Floor | Floor |
| PropSee | | | | Yes | Building | Building |
| PropSee | | | | Yes | Floor | Floor |
| PropSee | | | | Yes | Floor | Building |
| PropSee | | | | Yes | Unit | Unit |
| PropSee | | | | Yes | Unit | Unit |
| PropSee | | | | Yes | Unit | Unit |
| PropSee | | | | Yes | Unit | Unit |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Building | Building |
| PropSee | | | | Yes | Floor | Building |
| PropSee | | | | Yes | Building | Building |

APPENDIX 1-continued

| Appendix 1 | | | | | | |
|---|---|---|---|---|---|---|
| PropSee | | | | Yes | Unit | Building |
| PropSee | | | | Yes | Unit | Floor |
| PropSee | | | | Yes | Unit | Building |
| PropSee | | | | Yes | Building | Building |
| PropSee | | | | Yes | Building | Building |
| PropSee | | | | Yes | Building | Building |
| PropSee | | | | Yes | Building | Building |
| PropSee | | | | Yes | Unit | Unit |
| PropSee | | | | Ye | Unit | Unit |
| PropSee | | | | Yes | Unit | Unit |
| PropSee | | | | Yes | Unit | Unit |
| PropSee | | | | Yes | Unit | Building |
| PropSee | | | | Yes | Unit | Building |
| PropSee | | | | Yes | Unit | Building |
| PropSee | | | | Yes | Building | Building |
| PropSee | | | | Yes | Building | Building |
| PropSee | | | | Yes | Building | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Unit | Building |
| PropSee | | | | Yes | Floor | Building |
| PropSee | | | | Yes | Floor | Floor |
| PropSee | | | | Yes | Building | Building |
| PropSee | | | | Yes | Building | Building |
| PropSee | | | | Yes | Floor | Floor |
| PropSee | | | | Yes | Floor | Floor |
| PropSee | | | | Yes | Building | Building |
| PropSee | | | | Yes | Unit | Unit |
| PropSee | | | | Yes | Unit | Unit |
| PropSee | | | | Yes | Unit | Unit |
| PropSee | | | | Yes | Unit | Unit |
| PropSee | | | | Yes | Unit | Unit |
| Expedia | | | | Yes | Building | Building |
| Expedia | | | | Yes | Building | Building |
| Expedia | | | | Yes | Building | Building |
| City | PLUTO | | | Yes | Unit | Building |
| City | | | | Yes | Building | Building |
| City | PLUTO | | | Yes | Building | Building |
| City | | 24.5M | 41 | Yes | Building | Building |
| City | | | | No | Building | Building |
| City | | 6084 | 55 | Yes | Building | Discrete Rooftop Area |
| City | | 15.9K | 39 | Yes | Building | Building |
| City | | — | — | Yes | Building | Building |
| City | | — | — | Yes | Building | Building |
| City | | 34.3K | 37 | Yes | Building | Building |
| City | | 2.76M | 15 | Yes | Floor | Floor |
| City | | 28.8K | 67 | Yes | Building | Building |
| City | | 38.2K | 25 | Yes | Building | Building |
| City | | 28.7K | 35 | Yes | Floor | Floor |
| City | | 3.71M | 60 | Yes | Floor | Floor |
| City | | 1.76M | 96 | Yes | Floor | Floor |
| City | | 53.4K | 36 | Yes | Building | Building |
| City | | 2.18M | 18 | Yes | Floor | Floor |
| City | | 22.1K | 19 | Yes | Building | Building |
| City | | — | — | Yes | Building | Building |
| City | | 66.3K | 10 | Yes | Unit | Building |
| City | | 1.03M | 8 | Yes | Building | Building |
| City | | 127K | 25 | Yes | Building | Building |
| City | PLUTO | | | Yes | Building | Building |
| City | PLUTO | | | Yes | Building | Building |
| City | | 15.2M | 14 | Yes | Unit | Floor |
| City | | 41.1M | 11 | Yes | Unit | Floor |

APPENDIX 1-continued

| Appendix 1 | | | | | | |
|---|---|---|---|---|---|---|
| City | | 3.44M | 14 | Yes | Unit | Building |
| City | | 400K | 26 | Yes | Building | Building |
| City | | 61.7K | 19 | Yes | Floor | Building |
| City | | 29.3K | 49 | Yes | Discrete | Discrete Rooftop Area |
| City | | 1.9M | 20 | Yes | Building | Building |
| City | | 2.22M | 15 | Yes | Building | Building |
| City | | 6.17M | 41 | Yes | Building | Building |
| City | | 77.8K | 21 | Yes | Floor | Floor |
| City | | | | Yes | Floor | Floor |
| City | | | | Yes | Floor | Floor |
| City | | | | Yes | Floor | Floor |
| City | | | | Yes | Floor | Floor |
| City | | | | Yes | Floor | Floor |
| City | | | | Yes | Floor | Floor |
| City | | 5.01M | 19 | No | Geographic Region | Geographic Region |
| City | | 6.98M | 35 | Yes | Building | Building |
| City | | | | Yes | Building | Building |
| City | PLUTO | | | Yes | Building | Building |
| City | | | | Yes | Building | Building |
| City | | | | Yes | Building | Building |
| City | | | | Yes | Building | Building |
| City | | | | Yes | Building | Building |
| City | | | | Yes | Building | Building |
| City | | | | Yes | Unit | Floor |
| City | | 9.85M | 40 | Yes | Building | Building |
| City | | | | Yes | Building | Building |
| City | | | | Yes | Building | Building |
| City | | 2731 | 20 | Yes | Building | Building |
| City | | | | Yes | Unit | Floor |
| City | | 123K | 13 | Yes | Building | Building |
| City | | | | Yes | Unit | Building |
| City | | | | Yes | Unit | Building |
| City | | 22.1K | 61 | Yes | Building | Building |
| City | | | | No | Geographic Region | Geographic Region |
| City | | | | No | Geographic Region | Geographic Region |
| City | | 63.9K | 167 | Yes | Building | Discrete Floor Level |
| City | | 37.8K | 80 | Yes | Building | Discrete Floor Level |
| City | | 323K | 21 | Yes | Building | Discrete Floor Level |
| City | | | | Yes | Building | Building |
| City | | 6241 | 22 | Yes | Building | Discrete Rooftop Area |
| City | PLUTO | | | Yes | Building | Geographic Region |
| City | PLUTO | | | Yes | Building | Geographic Region |
| City | PLUTO | | | Yes | Building | Geographic Region |
| City | PLUTO | | | Yes | Building | Geographic Region |
| City | PLUTO | | | Yes | Building | Geographic Region |
| City | PLUTO | | | Yes | Building | Geographic Region |
| City | | | | No | Line Vector | Line Vector |
| City | | | | No | Geolocated Model | Geolocated Model |
| State | | | | Yes | Floor | Building |
| State | | | | Yes | Floor | Building |
| PropSee | | | | No | Geolocated Model | Geolocated Model |
| PropSee | | | | No | Geolocated Model | Geolocated Model |
| PropSee | | | | Yes | Unit | Unit |
| PropSee | | | | Yes | Floor | Floor |
| Private | | | | Yes | Unit | Unit |
| Private | | | | No | Geolocated Model | Geolocated Model |
| Public | | | | Yes | Building | Building |
| Public | | | | No | Geographic Region | Geographic Region |

APPENDIX 2

| Roles | Example Use Case |
| --- | --- |
| Aerial Photographer | Creating property marketing material using mesh instead of hiring aircraft |
| Appraiser | Market research, analytics |
| Architect | New development presentation |
| Bank Analyst | Find assessment comparables |
| Building Mechanical Contractors | Customer prospecting |
| Building Operations Contractors | Customer prospecting |
| City Permit Officer | Look for violations |
| CMBS Analyst | Asset Information, portfolio analysis, risk analysis |
| Developer | Investor presentations, compettivie product analysis |
| EMS | Floorplan data |
| Exterior Curtain Wall Contractors | Façade inspection |
| Filmmakers | Using mesh and data for cinematic scenes |
| Foreign Buyer | Understand local neighbourhood, market analysis, target prospect |
| Hotellier | Competitive survey |
| HVAC Industry | Asset tracking, create target list of likely purchase |
| Institutional Investor Analyst | Market research, rollup of common ownership, risk analysis |
| Institutional Investor Principal | Corporate communications, assessment of concentration risk |
| Insurance Adjuster | Risk analysis |
| Insurance Inspector | FDNY data |
| Mezz Lender | Asset Information, compare asset performance |
| Mortgage Broker | Find mortgage documents, track loan maturities |
| Office Investment Sales Broker | Explain market trends, illustrate sales history, value comparison |
| Office Leasing Broker | Virtually tour space for lease, review alternatives |
| Office Tenant | Space options in the market |
| Parking/Health Club/Café Operators | Comparing operating costs, compare pedestrian traffic counts |
| Private Equity Analyst | RE portfolio analysis, review concentration risk |
| Private Security | NYPD data |
| Property Assessor | Find property data, comparative analytics |
| Property Manager | Business data, charting lease exirations |
| Property Tax Analyst | Comparative analytics |
| Public Equity Analyst | Research |
| Public Investor | REIT analysis |
| Real Estate Brokeaage Marketing | Presentations, creation of target prospecting lists |
| Real Estate Brokerage Research | Presentations, rollup of submarket statistics |
| Resi Buyer | Research property history, review market pricing averages |
| Resi Renter | View orientation, survey available inventory |
| Residential Condo Broker | Examine transaction data |
| Residential Rental Broker | Mass market exposure |
| Retail Tenant | Demographic site selection |
| Surveyor | Confirm information |
| Telecom Operators | Roof radio antennae positions |
| User Buyer | Comply with business needs |
| Utility Operator | Con Ed network data |
| Video Game Developer | Using customized reality mesh and highlighting system for video game |

The invention claimed is:

1. A system to create and display a user controllable three dimensional interactive reality-based geospatial coordinate-based reality mesh visualization of a geographic area with buildings and other structures, said visualization further including depictions based on calculated financial determinations related to said buildings overlaid over said geographic area with a processor driven system; said system comprising:
- a server-based processor;
- at least one repository with at least text and metadata corresponding to at least some images;
- at least one database comprising financial property data;
- a graphical user interface (GUI); and
- a control technology engine for controlling visualization appearing on said GUI;
- said processor configured to:
- recognize selection of a selected geographic area for visualization;
- identify in said at least one repository text and associated metadata representing the selected geographic area and its environs, as well as representing buildings in said selected geographic area and its environs, including three-dimensional building internal infrastructure, separate living areas, contents, and external structures of each building in said geographic area, including their spatial locations within said geographic area as well as financial property data associated with one or more buildings in said geographic area and its environs;
- curate said text and associated metadata so as to formulate said reality mesh visualization;
- curate said financial property data at least for associating with individual properties in said reality mesh;
- populate a data file with said curated text and associated metadata, together with said financial property data, wherein said metadata characterizes specific building structural elements beyond aesthetics, and arranged in fields;
- populate a pick list in said GUI with at least a plurality of said fields for selection, said fields including at least financial parameters based on said financial property data;
- upon receipt of selection of one or more fields and a selected geographic area, in said GUI, using the text and associated metadata associated with said selection of one or more fields, formulate a selectable and scalable virtual display as a visualized reality mesh of said selected geographic area, visualized through rendering of geospatial coordinates using a Geographic Information System (GIS), and including one or more overlays for selected fields, said overlays organized based on calculated ranges of values for financial parameters and adjusting said overlays based on said organization; and afford a user in control of said GUI the opportunity to adjust said visualized reality mesh for geography or fields;

wherein said financial parameters are calculated on a per living unit basis and are based on at least one of recent sales or rentals; a determined adjustment for internal infrastructure, contents, and external structures; tax data; calculated adjustments in value based on dimensional differences; and structural comparisons with similar units in the same and other buildings within and outside of said geographic area.

2. The system of claim 1, wherein the resolution of said reality mesh is at 2 cm or better.

3. The system of claim 1, wherein said overlays include at least one of shading or shadowing with intensity based on determined ranges.

4. The system of claim 1 wherein said overlays are color coded based on determined ranges.

5. The system of claim 1, wherein said at least one database is on-goingly populated with data from a plurality of sources in communication with said processor.

6. The system of claim 5, wherein said processor analyzes said source data, compares said source data to existing data in said at least one database, performs an error correction function, and populates said at least one database to correct identified errors.

7. The system of claim 1, wherein said processor regularly polls data sources and correspondingly updates said database with newly available financial data.

8. The system of claim 7, wherein the step of curating financial property data is repeated upon receipt of said newly available financial data and said visualizations are updated accordingly.

9. The system of claim 1, wherein said financial parameters are further calculated based on a comparison to other properties in other nearby geographic areas and adjusted based on precise locations in a building and in a geographic area.

10. A method for a processor to formulate an executable data file, executable for formulating a multi-dimensional, interactive, visualization on a graphical user interface (GUI) said visualization including overlays coded based on financial ranges, said visualization formed using curated geospatial coordinates, with orientation and content adjustable based upon user input, with a processor driven system; said system comprising a data repository comprising at least text and metadata corresponding to images, at least one database comprising financial property data, a GUI, and a control technology engine for controlling said GUI; comprising the steps of:

identifying in said at least one database text and related metadata representing a selected three-dimensional geographic area including properties with one or more units for display as well as buildings and environs, including the three-dimensional building internal infrastructure, contents, and external structures of each building in said geographic area, including said buildings' spatial locations within said geographic area, as well as financial data associated with one or more buildings in said geographic area and its environs, where said financial data includes recent sales and rental data;

curating said text and related metadata so as to formulate said reality mesh visualization;

curating said financial property data at least for associating with properties in said reality mesh;

populating a data file with said curated text and related metadata regarding legal properties, where said text and related metadata corresponding to specific detail regarding structural and content elements beyond aesthetics, and arranged in fields;

selecting all fields in said at least one database related to said geographic area and its environs for delivery to an executable file;

forming an executable file structured to provide a display to a user based upon said user device;

wherein upon execution of said executable file a user may select one or more fields in said GUI and said file is configured to present a visualized augmented reality mesh in the GUI display visualized through rendering of geospatial coordinates using a Geographic Information System (GIS) of the selected geography with one or more overlays for selected fields including at least one field related to a calculated anticipated value for one or more properties in said geographic area and environs, said overlays coded based on numerical values in said fields;

wherein said anticipated value is calculated based on a combination of recent sales or rentals; tax data; dimensional differences; structural comparisons with similar units in the same and other buildings within and outside of said geographic area; and wherein said one or more overlays include visualizations based on said calculated anticipated values.

11. The method of claim 10, wherein said at least one database is on-goingly populated with data from a plurality of sources in communication with said processor.

12. The method of claim 11, wherein said processor is configured to analyze source data, compares said source data to existing data in said at least one database, to preform an error correction function, and repopulate and reconfigure said at least one database based on error correction.

13. The method of claim 10, wherein said coding results in differences in at least one of shading, shadowing, or color.

14. The method of claim 10, wherein said at least one database includes one or more fields detailing fixtures by property unit.

15. A method for a processor to form a color-coded visualization of a geographic location including one or more calculated values for one or more properties in said geographic location, said color coding based on received data stored in at least one database and calculations based on said stored data, said data collected on-goingly from at least public sources; said received data being limited to text and metadata; said processor being a part of a system comprising at least one database, a graphical user interface (GUI), and a control technology engine for controlling said GUI;

comprising the steps of:

selecting a geographic area for display;

identifying in said at least one database fields and content representing a geographic location and its environs as well as buildings and their environs, including the three-dimensional building internal infrastructure, contents, and external structures of each building in said geographic area, including their spatial locations within said geographic area, as well as financial data associated with one or more buildings in said geographic area and its environs, including recent sales and rental data;

curating said text and associated metadata so as to formulate said reality mesh visualization;

curating said financial property data at least for associating with properties in said reality mesh;

forming a data file using said curated text and associated metadata for populating a GUI display, said GUI display including said buildings and environs;

populating a pick list in said GUI with fields of identified content for selection;

upon selection of one or more fields, determining ranges within each field of data for color-coded display;

displaying in said GUI a selectable and scalable geospatial coordinate rendering in a reality mesh of the selected geographic location with one or more overlays for selected fields, said overlays color coded based on calculated numerical values in said fields; and affording a user in control of said GUI the opportunity to adjust said visualized reality mesh for geography and fields;

wherein said numerical values are calculated based on a combination of recent sales or rentals; tax data; dimensional differences; structural comparisons with similar units in the same and other buildings within and outside of said geographic area with a determined adjustment for at least one of location, unit views, unit height, altitude, internal infrastructure, contents, or external structures, and calculated adjustments in value based on dimensional differences; and wherein said one or more overlays include visualization based on said calculated anticipated values.

16. The method of claim 15, wherein said color-coding is configured to potentially include shading, translucency, and fogginess based on identified property interest.

17. The method of claim 15, wherein said color coding includes shading, translucency, and fogginess based on value and highlighting one or more particular areas of interest.

18. The method of claim 15, wherein said visualization includes one or more charts, where said one or more charts displays data based on at least one of size or a function of calculated value.

19. The method of claim 15, further including the steps of accepting a dynamic search parameter from said GUI, analyzing said parameter relative to stored text and metadata, and altering said visualization based on said analysis.

20. The method of claim 15, wherein said visualization is altered based on at least one of size of unit or internal infrastructure.

* * * * *